(12) United States Patent
Benson et al.

(10) Patent No.: US 12,297,736 B2
(45) Date of Patent: *May 13, 2025

(54) SYSTEMS AND METHODS FOR CONTROLLING A DRILLING PATH BASED ON DRIFT ESTIMATES

(71) Applicants: Motive Drilling Technologies, Inc., Dallas, TX (US); BOARD OF REGENTS, THE UNIVERSITY OF TEXAS SYSTEM, Austin, TX (US)

(72) Inventors: Todd W. Benson, Dallas, TX (US); Teddy Chen, Austin, TX (US); Sashmit Bhaduri, Austin, TX (US)

(73) Assignees: MOTIVE DRILLING TECHNOLOGIES, INC., Dallas, TX (US); BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 118 days.

This patent is subject to a terminal disclaimer.

(21) Appl. No.: 17/651,750

(22) Filed: Feb. 18, 2022

(65) Prior Publication Data
US 2022/0170324 A1 Jun. 2, 2022

Related U.S. Application Data

(63) Continuation of application No. 16/592,226, filed on Oct. 3, 2019, now Pat. No. 11,286,719, which is a
(Continued)

(51) Int. Cl.
*E21B 7/06* (2006.01)
*E21B 7/04* (2006.01)
(Continued)

(52) U.S. Cl.
CPC .................. *E21B 7/06* (2013.01); *E21B 7/04* (2013.01); *E21B 7/10* (2013.01); *E21B 44/00* (2013.01);
(Continued)

(58) Field of Classification Search
CPC .......... E21B 47/004; E21B 7/046; E21B 7/06; E21B 7/068; E21B 7/10
See application file for complete search history.

(56) References Cited

U.S. PATENT DOCUMENTS

| 2,476,136 A | 7/1949 | Doll |
| 2,742,265 A | 4/1956 | Snyder |

(Continued)

FOREIGN PATENT DOCUMENTS

| CA | 2771036 A1 | 8/2007 |
| GB | 2236782 A | 4/1991 |

(Continued)

OTHER PUBLICATIONS

"Definition of Failure by Merriam-Webster", Failure, Available Online At: https://www.merriam-webster.com/dictionary/failure, 1828, pp. 1-11.
(Continued)

*Primary Examiner* — Blake Michener
(74) *Attorney, Agent, or Firm* — Kilpatrick Townsend & Stockton LLP

(57) ABSTRACT

In a drilling system, a control system coupled to a drilling rig controls a bottom hole assembly (BHA) to drill a borehole through a geological formation along a drilling path. The control system determines a present position of the BHA and calculates a toolface vector to create a convergence path from the present position of the BHA to a desired target path. The control system also receives geological information and compensates the toolface vector to account for an estimated
(Continued)

geologic formation drift. The control system causes at least one control parameter to be modified in order to alter a drilling direction of the BHA based on the calculated toolface vector and transmits the at least one control parameter to the drilling rig to target the BHA in accordance with the calculated toolface vector. The control system iteratively performs this process until convergence with the desired target path is achieved.

18 Claims, 24 Drawing Sheets

Related U.S. Application Data continuation of application No. 15/068,222, filed on Mar. 11, 2016, now Pat. No. 10,472,893, which is a continuation of application No. 14/677,648, filed on Apr. 2, 2015, now Pat. No. 9,297,205, which is a continuation-in-part of application No. 14/095,073, filed on Dec. 3, 2013, now Pat. No. 9,347,308, which is a continuation of application No. 13/530,298, filed on Jun. 22, 2012, now Pat. No. 8,596,385, which is a continuation-in-part of application No. 13/334,370, filed on Dec. 22, 2011, now Pat. No. 8,210,283.

(51) Int. Cl.
| | | |
|---|---|---|
| E21B 7/10 | (2006.01) | |
| E21B 44/00 | (2006.01) | |
| E21B 45/00 | (2006.01) | |
| E21B 47/022 | (2012.01) | |
| E21B 47/024 | (2006.01) | |
| E21B 47/026 | (2006.01) | |
| E21B 47/06 | (2012.01) | |
| E21B 47/09 | (2012.01) | |
| E21B 47/12 | (2012.01) | |
| E21B 47/18 | (2012.01) | |
| G05B 13/04 | (2006.01) | |
| G05B 15/02 | (2006.01) | |

(52) U.S. Cl.
CPC ............ *E21B 45/00* (2013.01); *E21B 47/022* (2013.01); *E21B 47/024* (2013.01); *E21B 47/026* (2013.01); *E21B 47/06* (2013.01); *E21B 47/09* (2013.01); *E21B 47/12* (2013.01); *E21B 47/18* (2013.01); *G05B 13/042* (2013.01); *G05B 15/02* (2013.01)

(56) References Cited

U.S. PATENT DOCUMENTS

| | | |
|---|---|---|
| 2,947,971 A | 8/1960 | Glauberman et al. |
| 3,137,077 A | 6/1964 | Rosenthal |
| 3,202,761 A | 8/1965 | Bibbero |
| RE26,104 E | 11/1966 | Glauberman et al. |
| 3,291,208 A | 12/1966 | Kenneday |
| 3,396,786 A | 8/1968 | Schuster et al. |
| 3,396,788 A | 8/1968 | Bell |
| 4,794,534 A | 12/1988 | Millheim |
| 4,845,628 A | 7/1989 | Gray et al. |
| 4,854,397 A | 8/1989 | Warren et al. |
| 4,976,143 A | 12/1990 | Casso |
| 5,193,628 A | 3/1993 | Hill, III et al. |
| 5,218,301 A | 6/1993 | Kuckes |
| 5,220,963 A | 6/1993 | Patton |
| 5,251,144 A | 10/1993 | Ramamurthi |
| 5,265,682 A | 11/1993 | Russell et al. |
| 5,305,212 A | 4/1994 | Kuckes |
| 5,390,748 A | 2/1995 | Goldman |
| 5,465,799 A | 11/1995 | Ho |
| 5,469,916 A | 11/1995 | Sas-Jaworsky et al. |
| 5,520,255 A | 5/1996 | Barr et al. |
| 5,553,678 A | 9/1996 | Barr et al. |
| 5,553,679 A | 9/1996 | Thorp |
| 5,582,259 A | 12/1996 | Barr |
| 5,603,385 A | 2/1997 | Colebrook |
| 5,673,763 A | 10/1997 | Thorp |
| 5,685,379 A | 11/1997 | Barr et al. |
| 5,695,015 A | 12/1997 | Barr et al. |
| 5,704,436 A | 1/1998 | Smith et al. |
| 5,706,905 A | 1/1998 | Barr |
| 5,778,992 A | 7/1998 | Fuller |
| 5,803,185 A | 9/1998 | Barr et al. |
| 5,812,068 A | 9/1998 | Wisler et al. |
| 5,857,531 A | 1/1999 | Estep et al. |
| 5,901,795 A | 5/1999 | Tsao et al. |
| 5,971,085 A | 10/1999 | Colebrook |
| 6,088,294 A | 7/2000 | Leggett, III et al. |
| 6,089,332 A | 7/2000 | Barr et al. |
| 6,233,524 B1 | 5/2001 | Harrell et al. |
| 6,257,356 B1 | 7/2001 | Wassell |
| 6,272,434 B1 | 8/2001 | Wisler et al. |
| 6,279,702 B1 | 8/2001 | Koh |
| 6,321,456 B1 | 11/2001 | McElhinney |
| 6,349,595 B1 | 2/2002 | Civolani et al. |
| 6,389,360 B1 | 5/2002 | Alft et al. |
| 6,405,808 B1 | 6/2002 | Edwards et al. |
| 6,408,953 B1 | 6/2002 | Goldman et al. |
| 6,424,919 B1 | 7/2002 | Moran et al. |
| 6,470,977 B1 | 10/2002 | Chen et al. |
| 6,523,623 B1 | 2/2003 | Schuh |
| 6,577,954 B2 | 6/2003 | Alft et al. |
| 6,581,699 B1 | 6/2003 | Chen et al. |
| 6,601,658 B1 | 8/2003 | Downton |
| 6,612,382 B2 | 9/2003 | King |
| 6,732,052 B2 | 5/2004 | MacDonald et al. |
| 6,736,221 B2 | 5/2004 | Chia et al. |
| 6,749,029 B2 | 6/2004 | Alft et al. |
| 6,892,812 B2 | 5/2005 | Niedermayr et al. |
| 6,929,075 B2 | 8/2005 | Alft et al. |
| 6,968,909 B2 | 11/2005 | Aldred et al. |
| 7,000,710 B1 | 2/2006 | Umbach |
| 7,003,439 B2 | 2/2006 | Aldred et al. |
| 7,011,156 B2 | 3/2006 | Von Gynz-Rekowski |
| 7,032,689 B2 | 4/2006 | Goldman et al. |
| 7,035,778 B2 | 4/2006 | Goldman et al. |
| 7,054,750 B2 | 5/2006 | Rodney et al. |
| 7,059,427 B2 | 6/2006 | Power et al. |
| 7,085,696 B2 | 8/2006 | King |
| 7,096,979 B2 | 8/2006 | Haci et al. |
| 7,128,167 B2 | 10/2006 | Dunlop et al. |
| 7,136,795 B2 | 11/2006 | Downton |
| 7,142,986 B2 | 11/2006 | Moran |
| 7,172,037 B2 | 2/2007 | Dashevskiy et al. |
| 7,243,719 B2 | 7/2007 | Baron et al. |
| 7,254,750 B1 | 8/2007 | Okun et al. |
| 7,261,167 B2 | 8/2007 | Goldman et al. |
| 7,264,050 B2 | 9/2007 | Koithan et al. |
| 7,286,959 B2 | 10/2007 | Steinke |
| 7,342,504 B2 | 3/2008 | Crane et al. |
| 7,460,957 B2 | 12/2008 | Prange et al. |
| 7,548,873 B2 | 6/2009 | Veeningen et al. |
| 7,606,666 B2 | 10/2009 | Repin et al. |
| 7,617,049 B2 | 11/2009 | McElhinney et al. |
| 7,653,563 B2 | 1/2010 | Veeningen et al. |
| 7,684,929 B2 | 3/2010 | Prange et al. |
| 7,725,263 B2 | 5/2010 | Sugiura |
| 7,757,781 B2 | 7/2010 | Hay et al. |
| 7,775,297 B2 | 8/2010 | Hopwood et al. |
| 7,802,634 B2 | 9/2010 | Boone |
| 7,810,583 B2 | 10/2010 | Ruggier et al. |
| 7,810,584 B2 | 10/2010 | Haci et al. |
| 7,814,989 B2 | 10/2010 | Nikolakis-Mouchas et al. |
| 7,823,655 B2 | 11/2010 | Boone et al. |
| 7,857,047 B2 | 12/2010 | Remmert et al. |
| 7,860,593 B2 | 12/2010 | Boone |
| 7,938,197 B2 | 5/2011 | Boone et al. |
| 7,945,488 B2 | 5/2011 | Karr et al. |
| 7,957,946 B2 | 6/2011 | Pirovolou |

(56) References Cited

U.S. PATENT DOCUMENTS

| | | |
|---|---|---|
| 8,010,290 B2 | 8/2011 | Illfelder |
| 8,121,971 B2 | 2/2012 | Edwards et al. |
| 8,145,465 B2 | 3/2012 | Chen |
| 8,170,800 B2 | 5/2012 | Aamodt et al. |
| 8,210,283 B1 | 7/2012 | Benson et al. |
| 8,274,399 B2 | 9/2012 | Strachan et al. |
| 8,360,171 B2 | 1/2013 | Boone et al. |
| 8,381,838 B2 | 2/2013 | Hutniak et al. |
| 8,462,012 B2 | 6/2013 | Clark et al. |
| 8,463,550 B1 | 6/2013 | Selman et al. |
| 8,510,081 B2 | 8/2013 | Boone et al. |
| 8,528,663 B2 | 9/2013 | Boone |
| 8,596,382 B2 | 12/2013 | Clark et al. |
| 8,596,385 B2 | 12/2013 | Benson et al. |
| 8,602,126 B2 | 12/2013 | Boone et al. |
| 8,672,055 B2 | 3/2014 | Boone et al. |
| 8,672,056 B2 | 3/2014 | Clark et al. |
| 8,794,353 B2 | 8/2014 | Benson et al. |
| 8,818,729 B1 | 8/2014 | Stokeld et al. |
| 8,996,396 B2 | 3/2015 | Benson et al. |
| 9,022,140 B2 | 5/2015 | Marx et al. |
| 9,043,152 B2 | 5/2015 | Schuberth et al. |
| 9,151,150 B2 | 10/2015 | Fang et al. |
| 9,157,309 B1 | 10/2015 | Benson et al. |
| 9,249,655 B1 | 2/2016 | Keast et al. |
| 9,291,739 B2 | 3/2016 | Clark |
| 9,297,205 B2 | 3/2016 | Benson et al. |
| 9,347,308 B2 | 5/2016 | Benson et al. |
| 9,404,354 B2 | 8/2016 | Sugiura |
| 9,404,356 B2 | 8/2016 | Benson et al. |
| 9,428,961 B2 | 8/2016 | Benson et al. |
| 9,494,030 B2 | 11/2016 | Benson et al. |
| 9,540,879 B2 | 1/2017 | Kolpack et al. |
| 9,581,718 B2 | 2/2017 | Rodney |
| 9,631,477 B2 | 4/2017 | Harmer et al. |
| 9,678,241 B2 | 6/2017 | Zhang |
| 9,745,843 B1 | 8/2017 | Close et al. |
| 9,784,035 B2 | 10/2017 | Boone et al. |
| 9,784,089 B2 | 10/2017 | Boone et al. |
| 9,850,712 B2 | 12/2017 | Sugiura |
| 10,018,028 B2 | 7/2018 | Benson et al. |
| 10,036,678 B2 | 7/2018 | Fisher, Jr. et al. |
| 10,054,917 B2 | 8/2018 | Penn et al. |
| 10,094,209 B2 | 10/2018 | Gillan et al. |
| 10,113,414 B2 | 10/2018 | Clark et al. |
| 10,119,385 B2 | 11/2018 | Williams |
| 10,138,721 B2 | 11/2018 | Veltman |
| 10,151,192 B2 | 12/2018 | Burress et al. |
| 10,196,889 B2 | 2/2019 | Benson et al. |
| 10,208,580 B2 | 2/2019 | Benson et al. |
| 10,215,010 B1 | 2/2019 | Hadi et al. |
| 10,472,893 B2 | 11/2019 | Benson et al. |
| 10,539,706 B2 | 1/2020 | Rodney |
| 10,672,154 B2 | 6/2020 | Gillen et al. |
| 10,683,743 B2 | 6/2020 | Benson et al. |
| 10,995,602 B2 | 5/2021 | Benson et al. |
| 11,028,684 B2 | 6/2021 | Benson et al. |
| 11,047,222 B2 | 6/2021 | Benson et al. |
| 11,085,283 B2 | 8/2021 | Benson et al. |
| 11,106,185 B2 | 8/2021 | Benson et al. |
| 11,136,876 B1 | 10/2021 | Coley |
| 11,286,719 B2 | 3/2022 | Benson et al. |
| 11,828,156 B2 | 11/2023 | Benson et al. |
| 11,933,158 B2 | 3/2024 | Benson et al. |
| 11,982,172 B2 | 5/2024 | Benson et al. |
| 2001/0042642 A1 | 11/2001 | King |
| 2001/0054514 A1 | 12/2001 | Sullivan et al. |
| 2002/0070050 A1 | 6/2002 | Wassell |
| 2002/0103630 A1 | 8/2002 | Aldred et al. |
| 2002/0104685 A1 | 8/2002 | Pinckard et al. |
| 2002/0116129 A1 | 8/2002 | Alft et al. |
| 2002/0139581 A1 | 10/2002 | Schultz et al. |
| 2002/0144842 A1 | 10/2002 | Schultz et al. |
| 2003/0024738 A1 | 2/2003 | Schuh |
| 2003/0085059 A1 | 5/2003 | Kuckes et al. |
| 2003/0173113 A1 | 9/2003 | Alft et al. |
| 2004/0047234 A1 | 3/2004 | Armstrong et al. |
| 2004/0124009 A1 | 7/2004 | Hoteit et al. |
| 2004/0124012 A1 | 7/2004 | Dunlop et al. |
| 2004/0162658 A1 | 8/2004 | Newman |
| 2004/0168811 A1 | 9/2004 | Shaw et al. |
| 2004/0222023 A1 | 11/2004 | Haci et al. |
| 2004/0238222 A1 | 12/2004 | Harrison |
| 2004/0243309 A1 | 12/2004 | Alft et al. |
| 2004/0245017 A1 | 12/2004 | Chen et al. |
| 2005/0006145 A1 | 1/2005 | Downton |
| 2005/0038631 A1 | 2/2005 | Steinke |
| 2005/0087367 A1 | 4/2005 | Hutchinson |
| 2005/0150689 A1 | 7/2005 | Jogi et al. |
| 2005/0194130 A1 | 9/2005 | Best et al. |
| 2005/0194185 A1 | 9/2005 | Gleitman |
| 2005/0269082 A1 | 12/2005 | Baron et al. |
| 2006/0074561 A1 | 4/2006 | Xia et al. |
| 2006/0151214 A1 | 7/2006 | Prange et al. |
| 2006/0212224 A1 | 9/2006 | Jogi et al. |
| 2006/0247903 A1 | 11/2006 | Schottle et al. |
| 2007/0056727 A1 | 3/2007 | Newman |
| 2007/0089878 A1 | 4/2007 | Newman |
| 2007/0126426 A1 | 6/2007 | Clark et al. |
| 2007/0163810 A1 | 7/2007 | Underwood et al. |
| 2007/0192074 A1* | 8/2007 | Chen .............. E21B 49/003 702/9 |
| 2007/0221375 A1 | 9/2007 | Baron et al. |
| 2007/0227775 A1 | 10/2007 | Ma et al. |
| 2007/0256861 A1 | 11/2007 | Hulick |
| 2008/0041626 A1 | 2/2008 | Clark |
| 2008/0105424 A1 | 5/2008 | Remmert et al. |
| 2008/0156531 A1 | 7/2008 | Boone et al. |
| 2008/0172272 A1 | 7/2008 | Back et al. |
| 2008/0230272 A1 | 9/2008 | Chen et al. |
| 2008/0271925 A1 | 11/2008 | Misselbrook et al. |
| 2009/0000823 A1 | 1/2009 | Pirovolou |
| 2009/0065252 A1 | 3/2009 | Moos et al. |
| 2009/0065258 A1 | 3/2009 | Hamilton |
| 2009/0076873 A1 | 3/2009 | Johnson et al. |
| 2009/0078462 A1 | 3/2009 | Boone et al. |
| 2009/0090555 A1 | 4/2009 | Boone et al. |
| 2009/0120690 A1 | 5/2009 | Phillips |
| 2009/0132458 A1 | 5/2009 | Edwards et al. |
| 2009/0159336 A1 | 6/2009 | Boone |
| 2009/0166089 A1 | 7/2009 | Millet |
| 2009/0234623 A1 | 9/2009 | Germain et al. |
| 2009/0260879 A1 | 10/2009 | Clark et al. |
| 2009/0294174 A1 | 12/2009 | Harmer et al. |
| 2009/0299654 A1 | 12/2009 | Garvey et al. |
| 2010/0042327 A1 | 2/2010 | Garvey et al. |
| 2010/0133008 A1 | 6/2010 | Gawski et al. |
| 2010/0139977 A1 | 6/2010 | Watkins et al. |
| 2010/0175922 A1 | 7/2010 | Ignova et al. |
| 2010/0185395 A1 | 7/2010 | Pirovolou et al. |
| 2010/0191516 A1 | 7/2010 | Benish et al. |
| 2010/0217530 A1 | 8/2010 | Boone |
| 2010/0235101 A1 | 9/2010 | Aamodt et al. |
| 2010/0252327 A1 | 10/2010 | Beuershausen et al. |
| 2010/0259415 A1 | 10/2010 | Strachan et al. |
| 2011/0024191 A1 | 2/2011 | Boone |
| 2011/0067928 A1 | 3/2011 | Hulden et al. |
| 2011/0153300 A1 | 6/2011 | Holl et al. |
| 2011/0186353 A1 | 8/2011 | Turner et al. |
| 2011/0213601 A1 | 9/2011 | Pirovolou |
| 2011/0284292 A1 | 11/2011 | Gibb et al. |
| 2012/0024606 A1 | 2/2012 | Pirovolou et al. |
| 2012/0027516 A1 | 2/2012 | Day et al. |
| 2012/0048621 A1 | 3/2012 | Stewart et al. |
| 2012/0084008 A1 | 4/2012 | Zhan et al. |
| 2012/0118637 A1 | 5/2012 | Wang et al. |
| 2012/0272174 A1 | 10/2012 | Vogel et al. |
| 2012/0285701 A1 | 11/2012 | Cheng et al. |
| 2012/0330551 A1* | 12/2012 | Mitchell .............. E21B 47/022 702/9 |
| 2013/0025937 A1 | 1/2013 | Pilgrim et al. |
| 2013/0032401 A1 | 2/2013 | Edbury et al. |
| 2013/0032402 A1 | 2/2013 | Byreddy et al. |
| 2013/0092441 A1 | 4/2013 | Hummes et al. |

(56) References Cited

U.S. PATENT DOCUMENTS

| | | |
|---|---|---|
| 2013/0112484 A1 | 5/2013 | Chen |
| 2013/0126239 A1 | 5/2013 | Panchal et al. |
| 2013/0140037 A1 | 6/2013 | Sequeira, Jr. et al. |
| 2013/0161096 A1 | 6/2013 | Benson et al. |
| 2013/0161097 A1 | 6/2013 | Benson et al. |
| 2013/0262048 A1 | 10/2013 | Tang et al. |
| 2013/0290156 A1 | 10/2013 | Norris |
| 2013/0340999 A1 | 12/2013 | Benson |
| 2014/0032115 A1 | 1/2014 | Mitchell |
| 2014/0070956 A1 | 3/2014 | Winkler et al. |
| 2014/0110167 A1 | 4/2014 | Goebel et al. |
| 2014/0116776 A1 | 5/2014 | Marx et al. |
| 2014/0121972 A1 | 5/2014 | Wessling et al. |
| 2014/0129148 A1 | 5/2014 | Harmer et al. |
| 2014/0131102 A1 | 5/2014 | Benson et al. |
| 2014/0151121 A1 | 6/2014 | Boone et al. |
| 2014/0244173 A1 | 8/2014 | Laughlin et al. |
| 2014/0291023 A1 | 10/2014 | Edbury et al. |
| 2015/0006227 A1 | 1/2015 | Benson et al. |
| 2015/0029034 A1 | 1/2015 | Abbassian et al. |
| 2015/0075274 A1 | 3/2015 | Kpetehoto et al. |
| 2015/0081221 A1 | 3/2015 | Mancini |
| 2015/0083492 A1 | 3/2015 | Wassell |
| 2015/0101864 A1 | 4/2015 | May |
| 2015/0107899 A1 | 4/2015 | Fisher, Jr. et al. |
| 2015/0167466 A1 | 6/2015 | Teodorescu et al. |
| 2015/0184505 A1 | 7/2015 | Panicker-Shah |
| 2015/0198035 A1 | 7/2015 | Reynal, Jr. |
| 2015/0226049 A1 | 8/2015 | Frangos et al. |
| 2015/0233229 A1 | 8/2015 | Benson et al. |
| 2015/0275646 A1 | 10/2015 | Benson et al. |
| 2015/0275648 A1 | 10/2015 | Wang et al. |
| 2015/0308191 A1 | 10/2015 | Zhan et al. |
| 2015/0330204 A1 | 11/2015 | Hildebrand et al. |
| 2015/0330209 A1 | 11/2015 | Panchal et al. |
| 2015/0337599 A1 | 11/2015 | Bullock |
| 2015/0337640 A1 | 11/2015 | Huang et al. |
| 2015/0377003 A1 | 12/2015 | Benson et al. |
| 2016/0024847 A1 | 1/2016 | Benson et al. |
| 2016/0032705 A1 | 2/2016 | Benson et al. |
| 2016/0130878 A1 | 5/2016 | Cobern |
| 2016/0177699 A1 | 6/2016 | Benson et al. |
| 2016/0194949 A1 | 7/2016 | Dirksen |
| 2016/0251900 A1 | 9/2016 | Benson et al. |
| 2016/0312598 A1 | 10/2016 | Samuel et al. |
| 2017/0004235 A1 | 1/2017 | Samuel et al. |
| 2017/0058656 A1 | 3/2017 | Benson et al. |
| 2017/0122095 A1 | 5/2017 | Flanagan |
| 2017/0211372 A1 | 7/2017 | Samuel |
| 2017/0243383 A1 | 8/2017 | Gillan et al. |
| 2018/0128095 A1 | 5/2018 | Zhang et al. |
| 2018/0143616 A1 | 5/2018 | Robello et al. |
| 2018/0171773 A1 | 6/2018 | Nessjoen et al. |
| 2018/0179823 A1 | 6/2018 | Spatz et al. |
| 2018/0179831 A1 | 6/2018 | Spatz et al. |
| 2018/0202280 A1 | 7/2018 | Williams et al. |
| 2018/0238162 A1 | 8/2018 | Jeffryes |
| 2018/0258750 A1 | 9/2018 | Hadi et al. |
| 2018/0283156 A1 | 10/2018 | Viens |
| 2018/0283157 A1 | 10/2018 | Hadi et al. |
| 2018/0283158 A1 | 10/2018 | Hadi |
| 2018/0334898 A1 | 11/2018 | Zha et al. |
| 2018/0340406 A1 | 11/2018 | Wagner et al. |
| 2018/0340407 A1 | 11/2018 | Wagner et al. |
| 2018/0355669 A1 | 12/2018 | Shen et al. |
| 2018/0371889 A1 | 12/2018 | Hohl et al. |
| 2018/0371894 A1 | 12/2018 | Wang et al. |
| 2018/0371901 A1 | 12/2018 | Lakings et al. |
| 2019/0032466 A1 | 1/2019 | Wilson et al. |
| 2019/0032473 A1 | 1/2019 | Kuckes |
| 2019/0048703 A1 | 2/2019 | Samuel et al. |
| 2019/0048706 A1 | 2/2019 | Benson et al. |
| 2019/0048707 A1 | 2/2019 | Benson et al. |
| 2019/0085680 A1 | 3/2019 | Maus et al. |
| 2019/0120039 A1 | 4/2019 | Gillan |
| 2019/0353024 A1 | 11/2019 | Papouras et al. |
| 2020/0040657 A1 | 2/2020 | Benson et al. |
| 2020/0056473 A1 | 2/2020 | Bolt |
| 2020/0116010 A1 | 4/2020 | Gillan |
| 2020/0149354 A1 | 5/2020 | Singh et al. |
| 2021/0262335 A1 | 8/2021 | Benson et al. |

FOREIGN PATENT DOCUMENTS

| | | |
|---|---|---|
| GB | 2439489 A | 12/2007 |
| WO | 2005071441 A1 | 8/2005 |
| WO | 2009039448 A2 | 3/2009 |
| WO | 2009129461 A2 | 10/2009 |
| WO | 2010039317 A1 | 4/2010 |
| WO | 2011130159 A2 | 10/2011 |
| WO | 2013083380 A2 | 6/2013 |
| WO | 2013095974 A2 | 6/2013 |
| WO | 2016032640 A1 | 3/2016 |

OTHER PUBLICATIONS

"Dictionary, Encyclopedia and Thesaurus-The Free Dictionary", Available Online At: https://www.thefreedictionary.com/, Accessed from Internet on Oct. 1, 2020, pp. 1-6.

"Directional Drilling-Schlumberger Oilfield Glossary", Available Online At: https://glossary.oilfield.slb.com/en/terms/d/directional_drilling, Accessed from Internet on Apr. 25, 2019, 1 page.

"Mud Motor-Schlumberger Oilfield Glossary", Available Online At: https://glossary.oilfield.slb.com/en/terms/m/mud_motor, Accessed from Internet on: Jan. 27, 2020, 1 page.

"Slide and Rotary Steerable System", Schlumberger Oilfield Glossary, Available Online At: https://www.glossary.oilfield.slb.com/, Accessed from Internet on Apr. 21, 2021, 5 pages.

"The Oilfield Glossary-Schlumberger Oilfield Glossary", Available Online At: https://www.glossary.oilfield.slb.com/, Accessed from Internet on Oct. 1, 2020, 1 page.

U.S. Appl. No. 13/334,370, "Notice of Allowance", May 31, 2012, 10 pages.

U.S. Appl. No. 13/530,298, "Final Office Action", Apr. 24, 2013, 16 pages.

U.S. Appl. No. 13/530,298, "Non-Final Office Action", Nov. 6, 2012, 16 pages.

U.S. Appl. No. 13/530,298, "Notice of Allowance", Oct. 8, 2010, 10 pages.

U.S. Appl. No. 13/535,573, "Final Office Action", May 9, 2013, 15 pages.

U.S. Appl. No. 13/535,573, "Non-Final Office Action", Aug. 27, 2012, 16 pages.

U.S. Appl. No. 13/535,573, "Non-Final Office Action", Sep. 6, 2013, 10 pages.

U.S. Appl. No. 13/535,573, "Notice of Allowance", May 28, 2014, 7 pages.

U.S. Appl. No. 14/095,073, "Non-Final Office Action", Jul. 22, 2015, 8 pages.

U.S. Appl. No. 14/095,073, "Notice of Allowance", Jan. 21, 2016, 9 pages.

U.S. Appl. No. 14/314,697, "Advisory Action", Feb. 24, 2016, 8 pages.

U.S. Appl. No. 14/314,697, "Final Office Action", Jan. 14, 2016, 13 pages.

U.S. Appl. No. 14/314,697, "Final Office Action", Mar. 27, 2015, 18 pages.

U.S. Appl. No. 14/314,697, "Non-Final Office Action", Aug. 8, 2014, 16 pages.

U.S. Appl. No. 14/314,697, "Non-Final Office Action", Jul. 21, 2015, 14 pages.

U.S. Appl. No. 14/314,697, "Notice of Allowance", Jul. 15, 2016, 6 pages.

U.S. Appl. No. 14/677,648, "Non-Final Office Action", Jul. 22, 2015, 15 pages.

U.S. Appl. No. 14/677,648, "Notice of Allowance", Nov. 18, 2015, 5 pages.

(56) References Cited

OTHER PUBLICATIONS

U.S. Appl. No. 14/733,448, "Advisory Action", Nov. 6, 2018, 3 pages.
U.S. Appl. No. 14/733,448, "Final Office Action", Aug. 2, 2019, 16 pages.
U.S. Appl. No. 14/733,448, "Final Office Action", Aug. 29, 2018, 11 pages.
U.S. Appl. No. 14/733,448, "Final Office Action", Jan. 31, 2020, 17 pages.
U.S. Appl. No. 14/733,448, "Final Office Action", Jun. 24, 2020, 19 pages.
U.S. Appl. No. 14/733,448, "Non-Final Office Action", Jan. 3, 2019, 13 pages.
U.S. Appl. No. 14/733,448, "Non-Final Office Action", Mar. 7, 2018, 9 pages.
U.S. Appl. No. 14/733,448, "Non-Final Office Action", Nov. 16, 2020, 23 pages.
U.S. Appl. No. 14/733,448, "Notice of Allowance", Apr. 26, 2021, 8 pages.
U.S. Appl. No. 14/734,384, "Notice of Allowance", Aug. 10, 2015, 10 pages.
U.S. Appl. No. 14/874,169, "Non-Final Office Action", Feb. 18, 2016, 9 pages.
U.S. Appl. No. 14/874,169, "Notice of Allowance", Apr. 26, 2016, 5 pages.
U.S. Appl. No. 14/882,079, "Non-Final Office Action", Feb. 26, 2016, 8 pages.
U.S. Appl. No. 14/882,079, "Notice of Allowance", Apr. 8, 2016, 7 pages.
U.S. Appl. No. 15/014,857, "Notice of Allowance", Mar. 7, 2018, 10 pages.
U.S. Appl. No. 15/068,222, "Advisory Action", Apr. 15, 2019, 3 pages.
U.S. Appl. No. 15/068,222, "Final Office Action", Nov. 19, 2018, 22 pages.
U.S. Appl. No. 15/068,222, "Non-Final Office Action", Mar. 28, 2018, 20 pages.
U.S. Appl. No. 15/068,222, "Notice of Allowance", Jul. 3, 2019, 6 pages.
U.S. Appl. No. 15/161,637, "Non-Final Office Action", Apr. 2, 2018, 20 pages.
U.S. Appl. No. 15/161,637, "Notice of Allowance", Sep. 21, 2018, 8 pages.
U.S. Appl. No. 15/196,242, "Non-Final Office Action", May 1, 2018, 12 pages.
U.S. Appl. No. 15/196,242, "Notice of Allowance", Oct. 2, 2018, 12 pages.
U.S. Appl. No. 15/250,575, "Advisory Action", Apr. 9, 2019, 2 pages.
U.S. Appl. No. 15/250,575, "Advisory Action", Mar. 8, 2019, 3 pages.
U.S. Appl. No. 15/250,575, "Final Office Action", Dec. 20, 2018, 12 pages.
U.S. Pat. No. 10,208,580, "Ex Parte Reexamination", Feb. 28, 2023, 57 pages.
U.S. Appl. No. 15/250,575, "Final Office Action", Nov. 21, 2019, 18 pages.
U.S. Appl. No. 15/250,575, "Non-Final Office Action", May 29, 2019, 13 pages.
U.S. Appl. No. 15/250,575, "Non-Final Office Action", Jun. 15, 2018, 15 pages.
U.S. Appl. No. 15/250,575, "Notice of Allowance", Feb. 11, 2020, 8 pages.
U.S. Appl. No. 15/256,045, "Advisory Action", Apr. 30, 2019, 11 pages.
U.S. Appl. No. 15/256,045, "Advisory Action", May 8, 2020, 3 pages.
U.S. Appl. No. 15/256,045, "Advisory Action", Apr. 15, 2020, 6 pages.
U.S. Appl. No. 15/256,045, "Final Office Action", Feb. 4, 2019, 15 pages.
U.S. Appl. No. 15/256,045, "Final Office Action", Dec. 14, 2020, 18 pages.
U.S. Appl. No. 15/256,045, "Final Office Action", Jan. 31, 2020, 22 pages.
U.S. Appl. No. 15/256,045, "Non-Final Office Action", Aug. 19, 2019, 15 pages.
U.S. Appl. No. 15/256,045, "Non-Final Office Action", Jun. 11, 2020, 19 pages.
U.S. Appl. No. 15/256,045, "Non-Final Office Action", Jun. 22, 2018, 20 pages.
U.S. Appl. No. 15/256,045, "Notice of Allowance", Apr. 6, 2021, 9 pages.
U.S. Appl. No. 15/930,291, "Advisory Action", Apr. 5, 2024, 3 pages.
U.S. Appl. No. 15/930,291, "Advisory Action", Apr. 3, 2024, 4 pages.
U.S. Appl. No. 15/930,291, "Final Office Action", Jun. 2, 2022, 16 pages.
U.S. Appl. No. 15/930,291, "Final Office Action", Jan. 11, 2024, 18 pages.
U.S. Appl. No. 15/930,291, "Non-Final Office Action", Dec. 15, 2021, 12 pages.
U.S. Appl. No. 15/930,291, "Non-Final Office Action", Jun. 5, 2023, 18 pages.
U.S. Appl. No. 16/002,851, "Non-Final Office Action", May 8, 2020, 18 pages.
U.S. Appl. No. 16/002,851, "Notice of Allowance", Dec. 30, 2020, 5 pages.
U.S. Appl. No. 16/242,564, "Non-Final Office Action", Oct. 26, 2020, 9 pages.
U.S. Appl. No. 16/242,564, "Notice of Allowance", Feb. 10, 2021, 8 pages.
U.S. Appl. No. 16/248,573, "Non-Final Office Action", Nov. 4, 2020, 12 pages.
U.S. Appl. No. 16/248,573, "Notice of Allowance", Feb. 22, 2021, 8 pages.
U.S. Appl. No. 16/592,226, "Non-Final Office Action", Apr. 26, 2021, 17 pages.
U.S. Appl. No. 16/592,226, "Notice of Allowance", Nov. 16, 2021, 6 pages.
U.S. Appl. No. 17/218,070, "Advisory Action", Feb. 11, 2022, 3 pages.
U.S. Appl. No. 17/218,070, "Advisory Action", Mar. 11, 2022, 3 pages.
U.S. Appl. No. 17/218,070, "Final Office Action", Dec. 14, 2021, 13 pages.
U.S. Appl. No. 17/218,070, "Non-Final Office Action", Jun. 17, 2021, 14 pages.
U.S. Appl. No. 17/218,070, "Non-Final Office Action", May 11, 2022, 15 pages.
U.S. Appl. No. 17/218,070, "Notice of Allowance", Aug. 9, 2023, 11 pages.
U.S. Appl. No. 17/218,070, "Notice of Allowance", Oct. 20, 2022, 17 pages.
U.S. Appl. No. 17/218,070, "Notice of Allowance", Dec. 13, 2023, 9 pages.
U.S. Appl. No. 17/317,738, "Final Office Action", Mar. 6, 2024, 26 pages.
U.S. Appl. No. 17/317,738, "Non-Final Office Action", Feb. 9, 2023, 14 pages.
U.S. Appl. No. 17/317,738, "Non-Final Office Action", Aug. 7, 2023, 18 pages.
U.S. Appl. No. 17/338,537, "Corrected Notice of Allowability", Oct. 25, 2023, 2 pages.
U.S. Appl. No. 17/338,537, "Final Office Action", Mar. 8, 2023, 8 pages.
U.S. Appl. No. 17/338,537, "Non-Final Office Action", Aug. 25, 2022, 13 pages.
U.S. Appl. No. 17/338,537, "Notice of Allowance", Jul. 10, 2023, 9 pages.

(56) References Cited

OTHER PUBLICATIONS

U.S. Appl. No. 17/374,632, "Final Office Action", Apr. 7, 2023, 26 pages.
U.S. Appl. No. 17/374,632, "Non-Final Office Action", Sep. 21, 2022, 33 pages.
U.S. Appl. No. 17/374,632, "Notice of Allowance", Nov. 1, 2023, 5 pages.
U.S. Appl. No. 17/390,037, "Non-Final Office Action", Jan. 9, 2024, 23 pages.
U.S. Appl. No. 90/015,200, "Ex Parte Reexamination", Apr. 21, 2023, 10 pages.
US Re-Examination U.S. Appl. No. 90/015,200, "Reexam—Non-Final Action", Aug. 21, 2023, 19 pages.
AU Application No. 2019200737, "First Examination Report", Mar. 16, 2020, 3 pages.
CA Application No. 2,964,639, "Notice of Allowance", Mar. 13, 2023, 1 page.
CA Application No. 2,964,639, "Office Action", Apr. 11, 2022, 2 pages.
CA Application No. 2,964,639, "Office Action", Nov. 9, 2021, 3 pages.
CA Application No. 3,031,827, "Notice of Allowance", Jun. 23, 2020, 1 page.
El-Biblawi et al., "Some Drilling Parameters as a Tool to Predict Different Categories of Rocks", Journal of Engineering Sciences, vol. 35, No. 4, Jul. 1, 2007, pp. 995-1008.
EP Application No. 12809448.9, "Notice of Decision to Grant", Jan. 17, 2019, 2 pages.
EP Application No. 12809448.9, "Office Action", Nov. 11, 2015, 6 pages.
EP Application No. 13734913.0, "Office Action", Apr. 26, 2018, 10 pages.
EP Application No. 13734913.0, "Summons to Attend Oral Proceedings", Jun. 15, 2021, 17 pages.
EP Application No. 15846891.8, "Extended European Search Report", May 18, 2018, 7 pages.
EP Application No. 15846891.8, "Notice of Decision to Grant", Apr. 26, 2022, 2 pages.
EP Application No. 15850002.5, "Extended European Search Report", May 30, 2018, 8 pages.
EP Application No. 15850002.5, "Notice of Decision to Grant", Oct. 24, 2019, 2 pages.
EP Application No. 19155716.4, "Extended European Search Report", Jul. 30, 2019, 9 pages.
EP Application No. 19155716.4, "Office Action", Apr. 22, 2021, 4 pages.
EP Application No. 19155716.4, "Office Action", Jun. 2, 2020, 4 pages.
EP Application No. 19155716.4, "Office Action", Feb. 2, 2023, 9 pages.
EP Application No. 22173708.3, "Extended European Search Report", Feb. 1, 2023, 7 pages.
Mitchell et al., "Lateral Buckling-The Key to Lockup", Society of Petroleum Engineers Drilling & Completion, vol. 26, No. 3, Sep. 2011, pp. 436-452.
MX Application No. MX/A/2015/000192, "Notice of Allowance", Apr. 28, 2021, 3 pages.
MX Application No. MX/A/2015/000192, "Office Action", Dec. 7, 2020, 7 pages.
MX Application No. MX/A/2015/000192, "Office Action", Jul. 20, 2020, 7 pages.
MX Application No. MX/A/2017/004303, "Notice of Allowance", Jan. 21, 2021, 3 pages.
MX Application No. MX/A/2017/004303, "Office Action", Jul. 23, 2020, 4 pages.
Pastusek et al., "A Fundamental Model for Prediction of Hole Curvature and Build Rates with Steerable Bollomhole Assemblies", Society of Petroleum Engineers Annual Technical Conference and Exhibition, Oct. 2005, pp. 1-7.
International Application No. PCT/US2013/047054, "International Preliminary Report on Patentability", Dec. 31, 2014, 10 pages.
International Application No. PCT/US2013/047054, "International Search Report and Written Opinion", Jun. 25, 2014, 12 pages.
International Application No. PCT/US2015/053846, "International Search Report and Written Opinion", Dec. 17, 2015, 15 pages.
International Application No. PCT/US2015/054376, "International Preliminary Report on Patentability", Apr. 27, 2017, 14 pages.
International Application No. PCT/US2015/054376, "International Search Report and Written Opinion", Feb. 19, 2016, 16 pages.
Rampersad et al., "Drilling Optimization Using Drilling Data and Available Technology", SPE Latin America/Caribbean Petroleum Engineering Conference, SPE 27034, Apr. 1994, 9 pages.
Saputelli et al., "Real-Time Decision-Making for Value Creation While Drilling", SPE/International Association of Drilling Contractors Middle East Drilling Technology Conference and Exhibition, Oct. 2003, pp. 1-19.
Yonezawa et al., "Robotic Controlled Drilling: A New Rotary Steerable Drilling System for the Oil and Gas Industry", Society of Petroleum Engineers, IADC/SPE 74458, Feb. 26-28, 2002, 15 pages.
"Schlumberger—Well Plan & Wellbore : Definitions", Oilfield Glossary, Dec. 16, 2021, 2 pages.
U.S. Appl. No. 15/930,291, "Non-Final Office Action", Aug. 27, 2024, 18 pages.
U.S. Appl. No. 15/930,291, "Notice of Allowance", Sep. 13, 2024, 6 pages.
U.S. Appl. No. 17/317,738, "Advisory Action", Aug. 27, 2024, 6 pages.
U.S. Appl. No. 17/317,738, "Notice of Allowance", Sep. 18, 2024, 10 pages.
U.S. Appl. No. 17/390,037, "Final Office Action", Aug. 20, 2024, 38 pages.

* cited by examiner

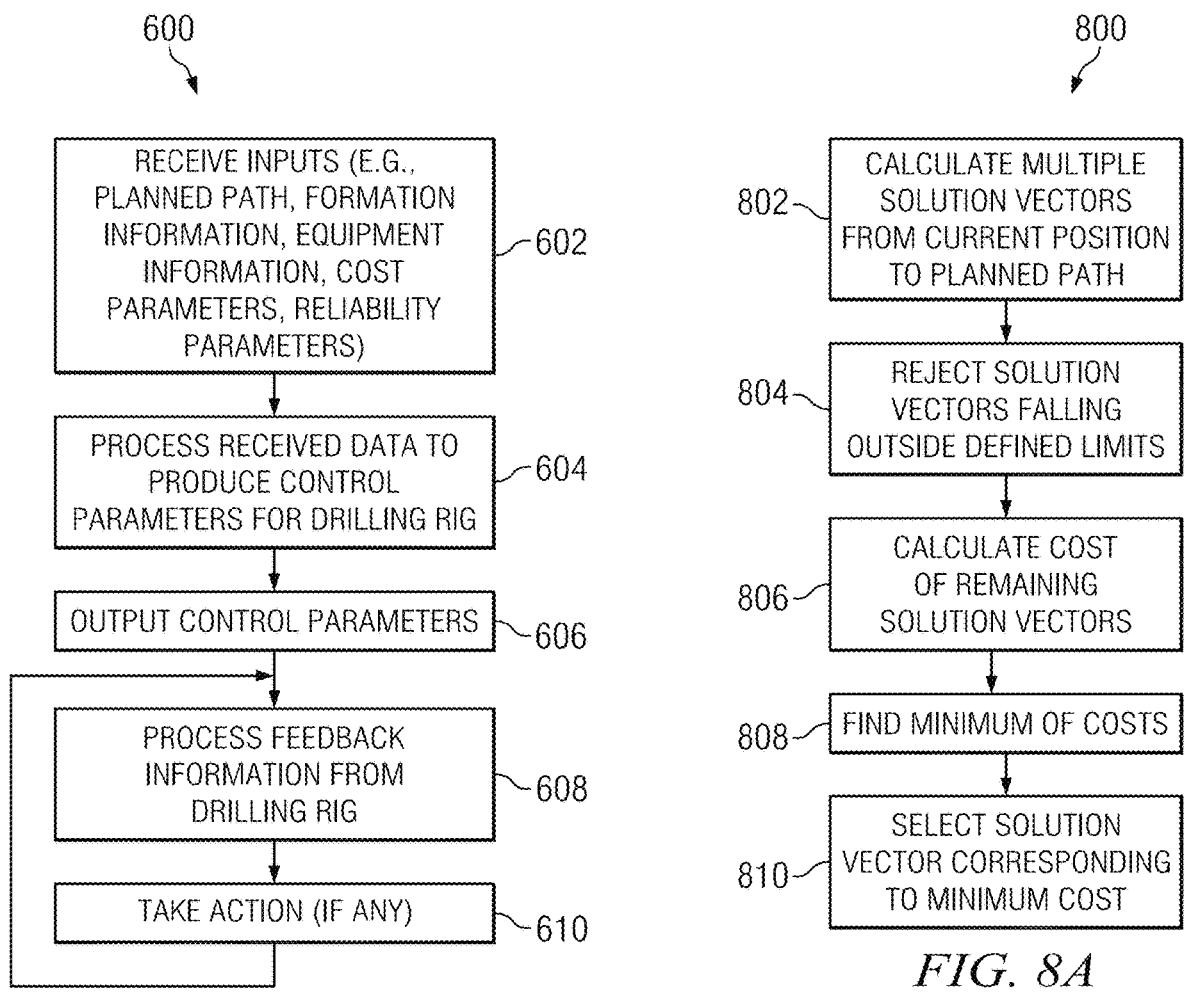
FIG. 6
FIG. 8A
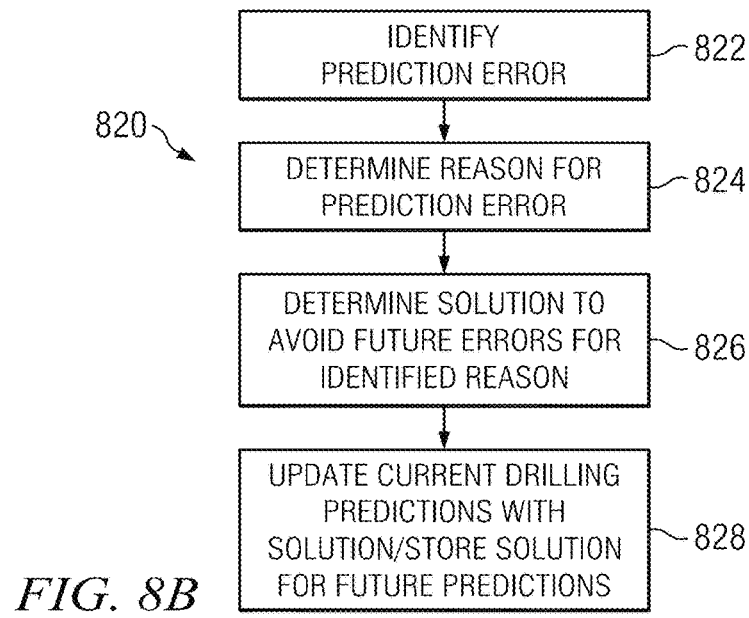
FIG. 8B

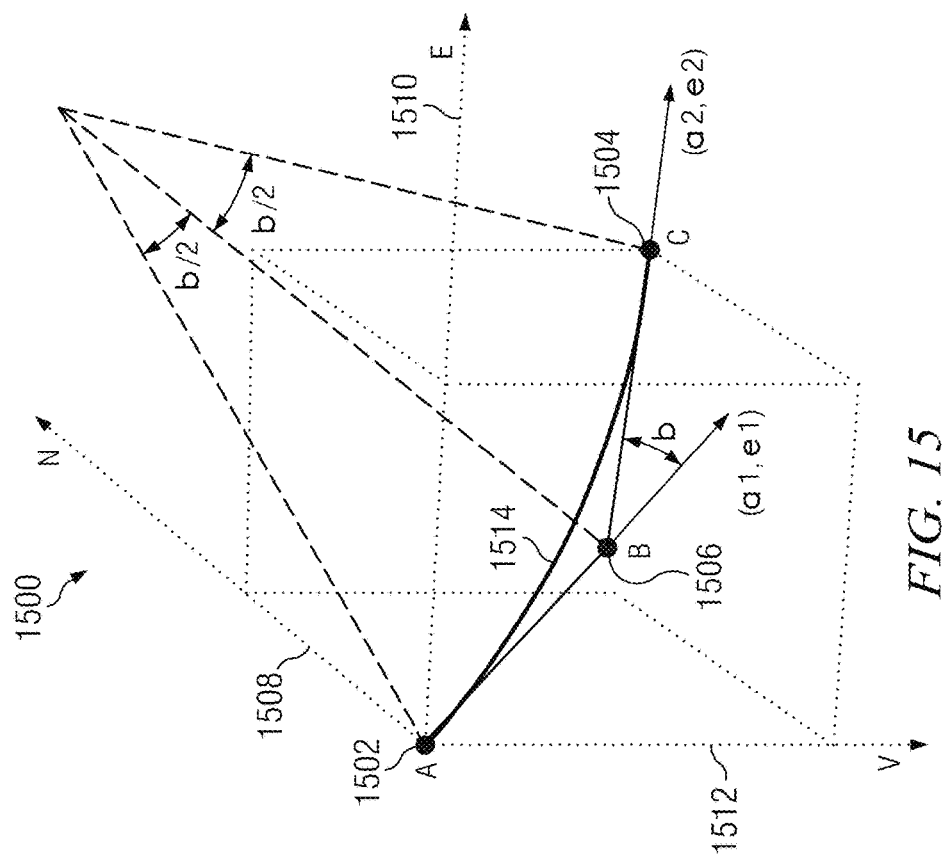
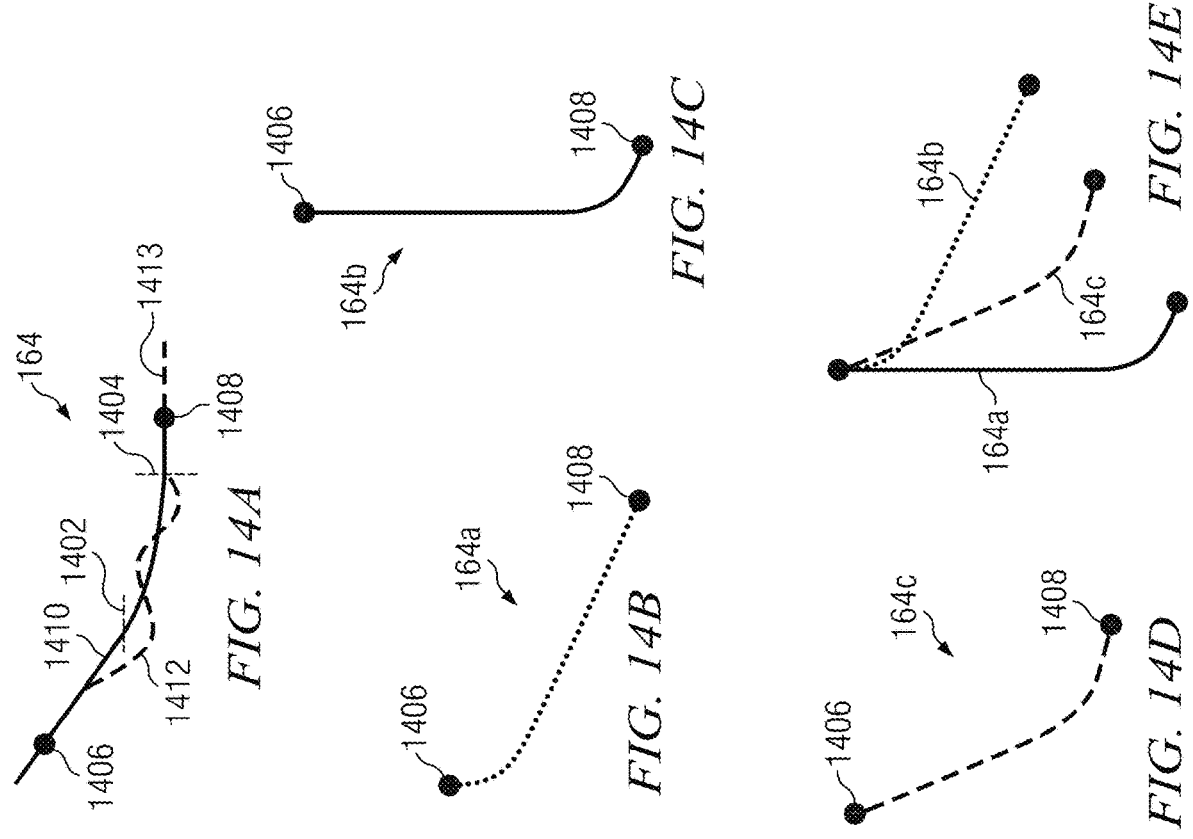

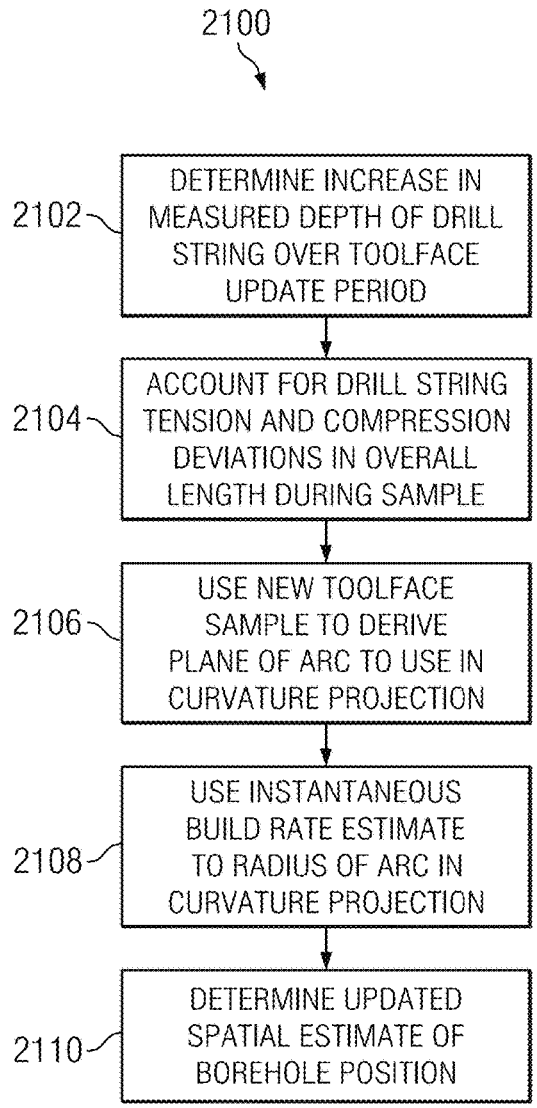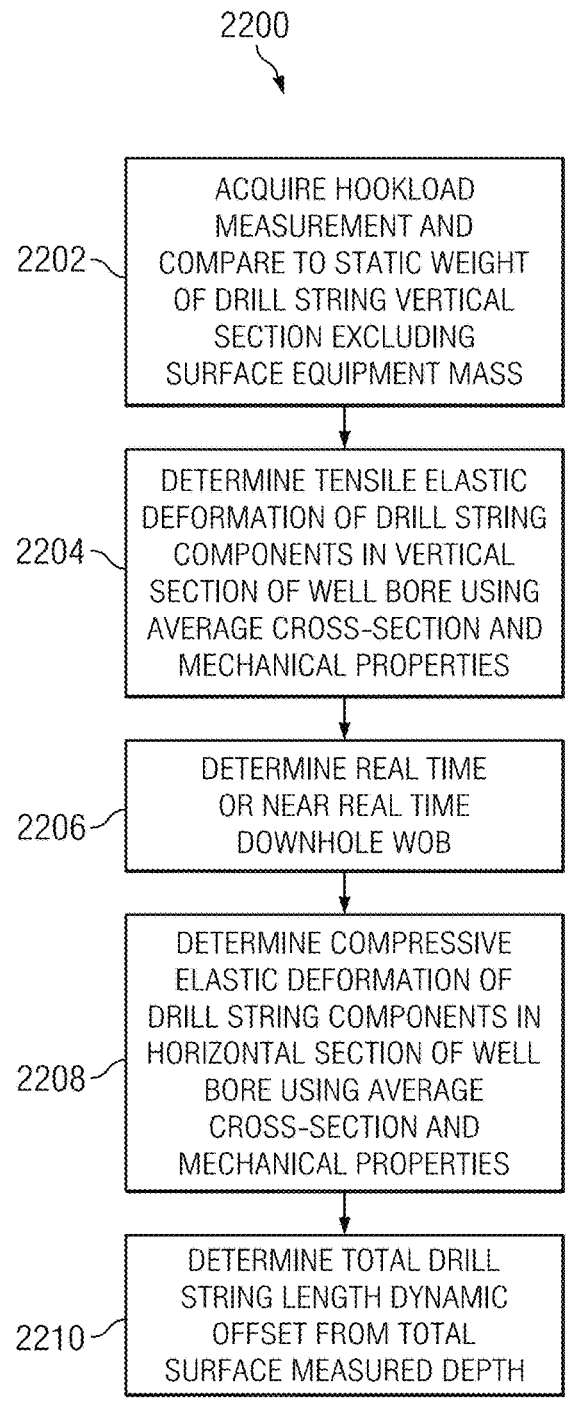
FIG. 21
FIG. 22

SYSTEMS AND METHODS FOR CONTROLLING A DRILLING PATH BASED ON DRIFT ESTIMATES

CROSS-REFERENCES TO RELATED APPLICATIONS

This application is a continuation of U.S. patent application Ser. No. 16/592,226, filed on Oct. 3, 2019, entitled SYSTEMS AND METHODS FOR CONTROLLING A DRILLING PATH BASED ON DRIFT ESTIMATES, which is a continuation of U.S. patent application Ser. No. 15/068,222, filed on Mar. 11, 2016, entitled SYSTEM AND METHOD FOR CONTROLLING A DRILLING PATH BASED ON DRIFT ESTIMATES, now U.S. Pat. No. 10,472,893, issued Nov. 12, 2019, which is a continuation of U.S. patent application Ser. No. 14/677,648, filed Apr. 2, 2015, entitled SYSTEM AND METHOD FOR CONTROLLING A DRILLING PATH BASED ON DRIFT ESTIMATES, now U.S. Pat. No. 9,297,205, issued Mar. 29, 2016, which is a continuation-in-part of U.S. patent application Ser. No. 14/095,073, filed Dec. 3, 2013, and entitled SYSTEM AND METHOD FOR DETERMINING INCREMENTAL PROGRESSION BETWEEN SURVEY POINTS WHILE DRILLING, now U.S. Pat. No. 9,347,308, issued May 24, 2016, which is a continuation of U.S. patent application Ser. No. 13/530,298, filed Jun. 22, 2012, and entitled SYSTEM AND METHOD FOR DETERMINING INCREMENTAL PROGRESSION BETWEEN SURVEY POINTS WHILE DRILLING, now U.S. Pat. No. 8,596,385, issued Dec. 3, 2013, which is a continuation-in-part of U.S. patent application Ser. No. 13/334,370, filed on Dec. 22, 2011, and entitled SYSTEM AND METHOD FOR SURFACE STEERABLE DRILLING, now U.S. Pat. No. 8,210,283, issued Jul. 3, 2013, the specifications of which are incorporated by reference herein in their entirety.

TECHNICAL FIELD

This application is directed to the creation of wells, such as oil wells, and more particularly to the planning and drilling of such wells.

SUMMARY

The present invention, as disclosed and described herein, comprises a method for drilling. A surface steerable system coupled to a drilling rig receives BHA information from a bottom hole assembly (BHA) located in a borehole. The BHA information corresponds to a first location of the BHA with respect to a target drilling path and geological formation drift information. The surface steerable system calculates a toolface vector to create a convergence path from the first location of the BHA to the target drilling path that accounts for geological formation drift defined by the geological formation drift information such that the BHA will converge with the target drilling path by drilling in accordance with the toolface vector. The surface steerable system causes at least one control parameter to be modified in order to alter a drilling direction of the BHA based on the calculated toolface vector and transmits the at least one control parameter to the drilling rig to target the BHA in accordance with the calculated toolface vector.

BACKGROUND

Drilling a borehole for the extraction of minerals has become an increasingly complicated operation due to the increased depth and complexity of many boreholes, including the complexity added by directional drilling. Drilling is an expensive operation and errors in drilling add to the cost and, in some cases, drilling errors may permanently lower the output of a well for years into the future. Current technologies and methods do not adequately address the complicated nature of drilling. Accordingly, what is needed are a system and method to improve drilling operations and minimize drilling errors.

BRIEF DESCRIPTION OF THE DRAWINGS

For a more complete understanding, reference is now made to the following description taken in conjunction with the accompanying Drawings in which:

FIG. 6 illustrates one embodiment of a method that may be executed by the surface steerable system of FIG. 2A;

FIG. 8A illustrates a more detailed embodiment of a portion of the method of FIG. 7B;

FIG. 8B illustrates a more detailed embodiment of a portion of the method of FIG. 6;

FIGS. 14A-14D illustrate embodiments of a portion of the drilling environment of FIG. 1B;

FIG. 14E illustrates FIGS. 14B-14D overlaid on one another;

FIG. 15 illustrates one embodiment of a three-dimensional borehole space.

FIG. 21 illustrates one embodiment of a method that represents a portion of the method of FIG. 16 in greater detail.

FIG. 22 illustrates one embodiment of a method that represents a portion of the method of FIG. 21 in greater detail.

DETAILED DESCRIPTION

Figure 1A:
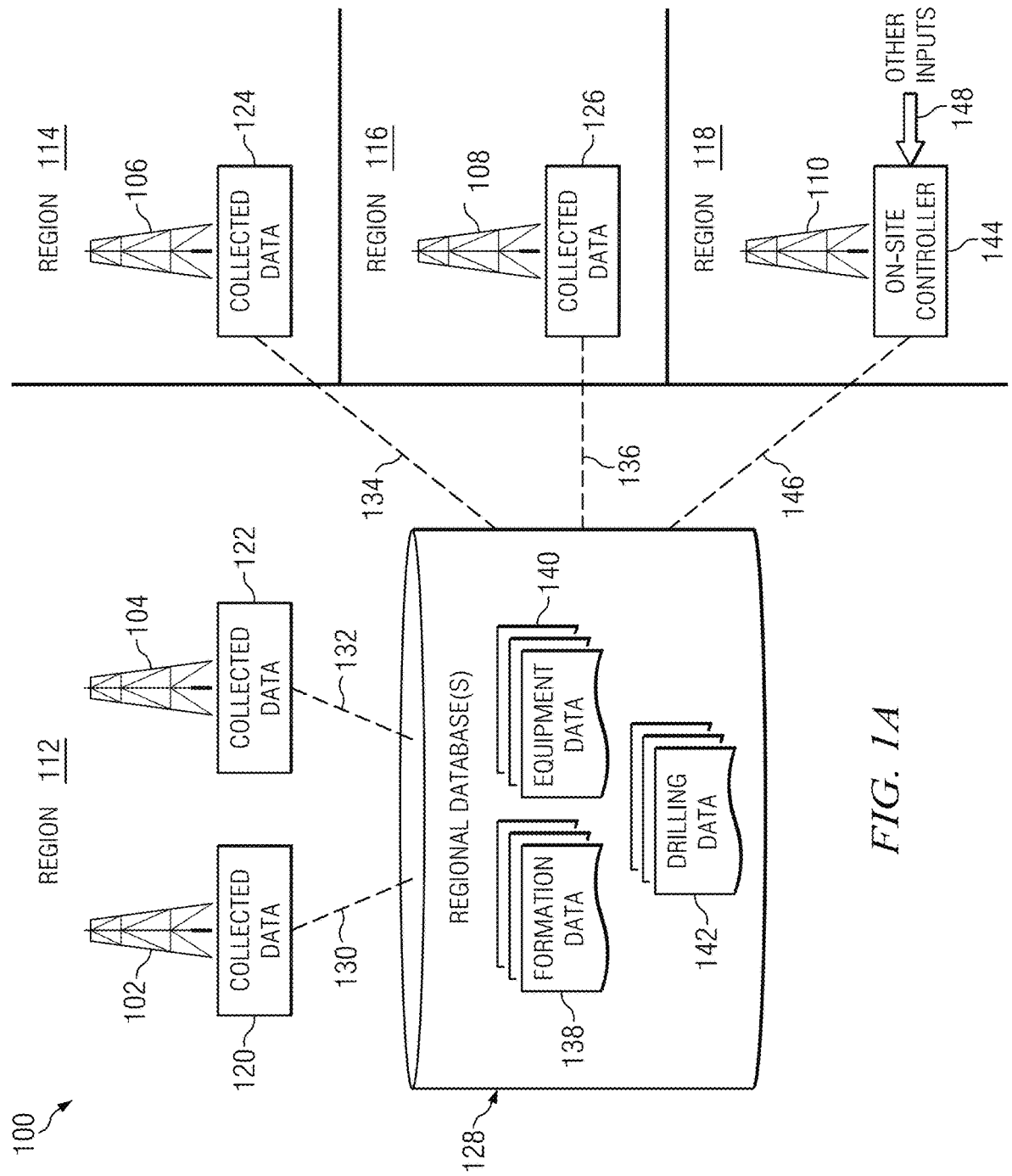
FIG. 1A illustrates one embodiment of a drilling environment in which a surface steerable system may operate.

Referring now to the drawings, wherein like reference numbers are used herein to designate like elements throughout, the various views and embodiments of a system and method for surface steerable drilling are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring to FIG. 1A, one embodiment of an environment 100 is illustrated with multiple wells 102, 104, 106, 108, and a drilling rig 110. In the present example, the wells 102 and 104 are located in a region 112, the well 106 is located in a region 114, the well 108 is located in a region 116, and the drilling rig 110 is located in a region 118. Each region 112, 114, 116, and 118 may represent a geographic area having similar geological formation characteristics. For example, region 112 may include particular formation characteristics identified by rock type, porosity, thickness, and other geological information. These formation characteristics affect drilling of the wells 102 and 104. Region 114 may have formation characteristics that are different enough to be classified as a different region for drilling purposes, and the different formation characteristics affect the drilling of the well 106. Likewise, formation characteristics in the regions 116 and 118 affect the well 108 and drilling rig 110, respectively.

It is understood the regions 112, 114, 116, and 118 may vary in size and shape depending on the characteristics by which they are identified. Furthermore, the regions 112, 114, 116, and 118 may be sub-regions of a larger region. Accordingly, the criteria by which the regions 112, 114, 116, and 118 are identified is less important for purposes of the present disclosure than the understanding that each region 112, 114, 116, and 118 includes geological characteristics that can be used to distinguish each region from the other regions from a drilling perspective. Such characteristics may be relatively major (e.g., the presence or absence of an entire rock layer in a given region) or may be relatively minor (e.g., variations in the thickness of a rock layer that extends through multiple regions).

Accordingly, drilling a well located in the same region as other wells, such as drilling a new well in the region 112 with already existing wells 102 and 104, means the drilling process is likely to face similar drilling issues as those faced when drilling the existing wells in the same region. For similar reasons, a drilling process performed in one region is likely to face issues different from a drilling process performed in another region. However, even the drilling processes that created the wells 102 and 104 may face different issues during actual drilling as variations in the formation are likely to occur even in a single region.

Drilling a well typically involves a substantial amount of human decision making during the drilling process. For example, geologists and drilling engineers use their knowledge, experience, and the available information to make decisions on how to plan the drilling operation, how to accomplish the plan, and how to handle issues that arise during drilling. However, even the best geologists and drilling engineers perform some guesswork due to the unique nature of each borehole. Furthermore, a directional driller directly responsible for the drilling may have drilled other boreholes in the same region and so may have some similar experience, but it is impossible for a human to mentally track all the possible inputs and factor those inputs into a decision. This can result in expensive mistakes, as errors in drilling can add hundreds of thousands or even millions of dollars to the drilling cost and, in some cases, drilling errors may permanently lower the output of a well, resulting in substantial long term losses.

In the present example, to aid in the drilling process, each well 102, 104, 106, and 108 has corresponding collected data 120, 122, 124, and 126, respectively. The collected data may include the geological characteristics of a particular formation in which the corresponding well was formed, the attributes of a particular drilling rig, including the bottom hole assembly (BHA), and drilling information such as weight-on-bit (WOB), drilling speed, and/or other information pertinent to the formation of that particular borehole. The drilling information may be associated with a particular depth or other identifiable marker so that, for example, it is recorded that drilling of the well 102 from 1000 feet to 1200 feet occurred at a first ROP through a first rock layer with a first WOB, while drilling from 1200 feet to 1500 feet occurred at a second ROP through a second rock layer with a second WOB. The collected data may be used to recreate the drilling process used to create the corresponding well 102, 104, 106, or 108 in the particular formation. It is understood that the accuracy with which the drilling process can be recreated depends on the level of detail and accuracy of the collected data.

The collected data 120, 122, 124, and 126 may be stored in a centralized database 128 as indicated by lines 130, 132, 134, and 136, respectively, which may represent any wired and/or wireless communication channel(s). The database 128 may be located at a drilling hub (not shown) or elsewhere. Alternatively, the data may be stored on a removable storage medium that is later coupled to the database 128 in order to store the data. The collected data 120, 122, 124, and 126 may be stored in the database 128 as formation data 138, equipment data 140, and drilling data 142 for example. Formation data 138 may include any formation information, such as rock type, layer thickness, layer location (e.g., depth), porosity, gamma readings, etc. Equipment data 140 may include any equipment information, such as drilling rig configuration (e.g., rotary table or top drive), bit type, mud composition, etc. Drilling data 142 may include any drilling information, such as drilling speed, WOB, differential pressure, toolface orientation, etc. The collected data may also be identified by well, region, and other criteria, and may be sortable to enable the data to be searched and analyzed. It is understood that many different storage mechanisms may be used to store the collected data in the database 128.

Figure 1B:
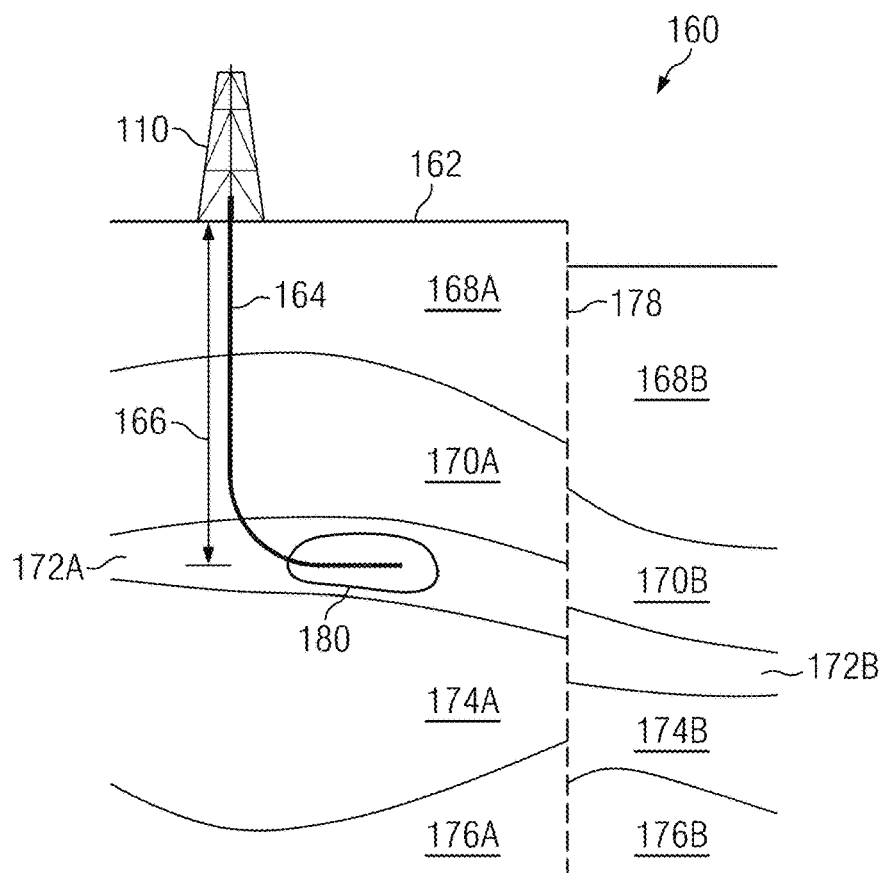
FIG. 1B illustrates one embodiment of a more detailed portion of the drilling environment of FIG. 1A.

With additional reference to FIG. 1B, an environment 160 (not to scale) illustrates a more detailed embodiment of a portion of the region 118 with the drilling rig 110 located at the surface 162. A drilling plan has been formulated to drill a borehole 164 extending into the ground to a true vertical depth (TVD) 166. The borehole 164 extends through strata layers 168 and 170, stopping in layer 172, and not reaching underlying layers 174 and 176. The borehole 164 may be directed to a target area 180 positioned in the layer 172. The target 180 may be a subsurface point or points defined by coordinates or other markers that indicate where the borehole 164 is to end or may simply define a depth range within which the borehole 164 is to remain (e.g., the layer 172 itself). It is understood that the target 180 may be any shape and size, and may be defined in any way. Accordingly, the target 180 may represent an endpoint of the borehole 164 or may extend as far as can be realistically drilled. For example, if the drilling includes a horizontal component and the goal is to follow the layer 172 as far as possible, the target may simply be the layer 172 itself and drilling may continue until a limit is reached, such as a property boundary or a physical limitation to the length of the drillstring. A fault 178 has shifted a portion of each layer downwards. Accordingly, the borehole 164 is located in non-shifted layer portions 168A-176A, while portions 168B-176B represent the shifted layer portions.

Current drilling techniques frequently involve directional drilling to reach a target, such as the target 180. The use of directional drilling generally increases the amount of reserves that can be obtained and also increases production rate, sometimes significantly. For example, the directional drilling used to provide the horizontal portion shown in FIG. 1B increases the length of the borehole in the layer 172, which is the target layer in the present example. Directional drilling may also be used alter the angle of the borehole to address faults, such as the fault 178 that has shifted the layer portion 172B. Other uses for directional drilling include sidetracking off of an existing well to reach a different target area or a missed target area, drilling around abandoned drilling equipment, drilling into otherwise inaccessible or difficult to reach locations (e.g., under populated areas or bodies of water), providing a relief well for an existing well, and increasing the capacity of a well by branching off and having multiple boreholes extending in different directions or at different vertical positions for the same well. Directional drilling is often not confined to a straight horizontal borehole, but may involve staying within a rock layer that varies in depth and thickness as illustrated by the layer 172. As such, directional drilling may involve multiple vertical adjustments that complicate the path of the borehole.

Figure 1C:
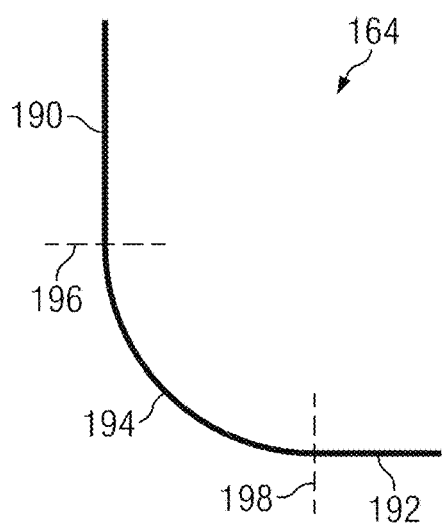
FIG. 1C illustrates one embodiment of a more detailed portion of the drilling environment of FIG. 1B.

With additional reference to FIG. 1C, which illustrates one embodiment of a portion of the borehole 164 of FIG. 1B, the drilling of horizontal wells clearly introduces significant challenges to drilling that do not exist in vertical wells. For example, a substantially horizontal portion 192 of the well may be started off of a vertical borehole 190 and one drilling consideration is the transition from the vertical portion of the well to the horizontal portion. This transition is generally a curve that defines a build up section 194 beginning at the vertical portion (called the kick off point and represented by line 196) and ending at the horizontal portion (represented by line 198). The change in inclination per measured length drilled is typically referred to as the build rate and is often defined in degrees per one hundred feet drilled. For example, the build rate may be 6°/100 ft, indicating that there is a six degree change in inclination for every one hundred feet drilled. The build rate for a particular build up section may remain relatively constant or may vary.

The build rate depends on factors such as the formation through which the borehole 164 is to be drilled, the trajectory of the borehole 164, the particular pipe and drill collars/BHA components used (e.g., length, diameter, flexibility, strength, mud motor bend setting, and drill bit), the mud type and flow rate, the required horizontal displacement, stabilization, and inclination. An overly aggressive built rate can cause problems such as severe doglegs (e.g., sharp changes in direction in the borehole) that may make it difficult or impossible to run casing or perform other needed tasks in the borehole 164. Depending on the severity of the mistake, the borehole 164 may require enlarging or the bit may need to be backed out and a new passage formed. Such mistakes cost time and money. However, if the built rate is too cautious, significant additional time may be added to the drilling process as it is generally slower to drill a curve than to drill straight. Furthermore, drilling a curve is more complicated and the possibility of drilling errors increases (e.g., overshoot and undershoot that may occur trying to keep the bit on the planned path).

Two modes of drilling, known as rotating and sliding, are commonly used to form the borehole 164. Rotating, also called rotary drilling, uses a topdrive or rotary table to rotate the drillstring. Rotating is used when drilling is to occur along a straight path. Sliding, also called steering, uses a downhole mud motor with an adjustable bent housing and does not rotate the drillstring. Instead, sliding uses hydraulic power to drive the downhole motor and bit. Sliding is used in order to control well direction.

To accomplish a slide, the rotation of the drill string is stopped. Based on feedback from measuring equipment such as a MWD tool, adjustments are made to the drill string. These adjustments continue until the downhole toolface that indicates the direction of the bend of the motor is oriented to the direction of the desired deviation of the borehole. Once the desired orientation is accomplished, pressure is applied to the drill bit, which causes the drill bit to move in the direction of deviation. Once sufficient distance and angle have been built, a transition back to rotating mode is accomplished by rotating the drill string. This rotation of the drill string neutralizes the directional deviation caused by the bend in the motor as it continuously rotates around the centerline of the borehole.

Referring again to FIG. 1A, the formulation of a drilling plan for the drilling rig 110 may include processing and analyzing the collected data in the database 128 to create a more effective drilling plan. Furthermore, once the drilling has begun, the collected data may be used in conjunction with current data from the drilling rig 110 to improve drilling decisions. Accordingly, an on-site controller 144 is coupled to the drilling rig 110 and may also be coupled to the database 128 via one or more wired and/or wireless communication channel(s) 146. Other inputs 148 may also be provided to the on-site controller 144. In some embodiments, the on-site controller 144 may operate as a stand-alone device with the drilling rig 110. For example, the on-site controller 144 may not be communicatively coupled to the database 128. Although shown as being positioned near or at the drilling rig 110 in the present example, it is understood that some or all components of the on-site controller 144 may be distributed and located elsewhere in other embodiments.

The on-site controller 144 may form all or part of a surface steerable system. The database 128 may also form part of the surface steerable system. As will be described in greater detail below, the surface steerable system may be used to plan and control drilling operations based on input information, including feedback from the drilling process itself. The surface steerable system may be used to perform such operations as receiving drilling data representing a drill path and other drilling parameters, calculating a drilling solution for the drill path based on the received data and other available data (e.g., rig characteristics), implementing the drilling solution at the drilling rig 110, monitoring the drilling process to gauge whether the drilling process is within a defined margin of error of the drill path, and/or calculating corrections for the drilling process if the drilling process is outside of the margin of error.

Figure 2A:
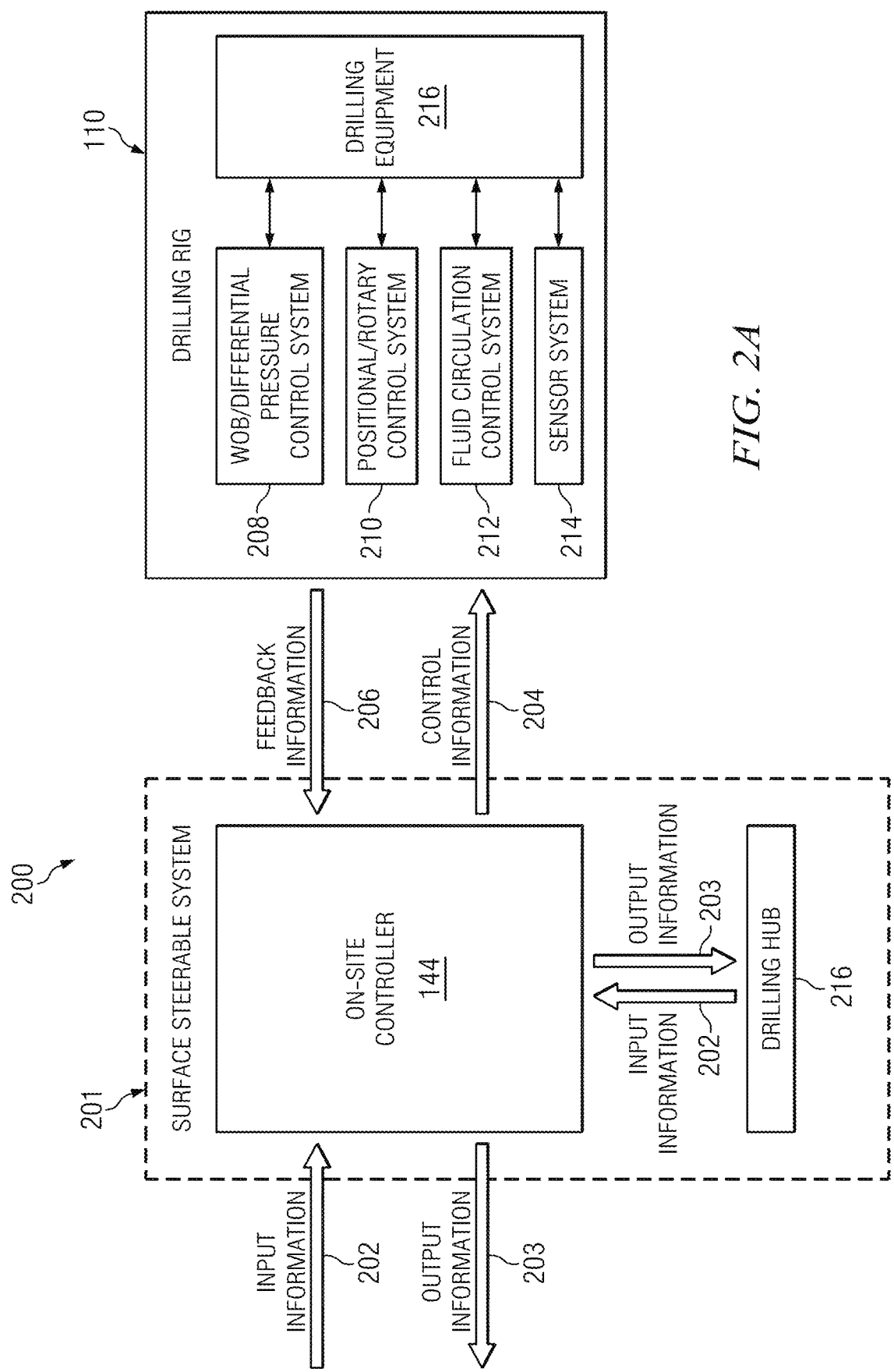
FIG. 2A illustrates one embodiment of the surface steerable system of FIG. 1A and how information may flow to and from the system.

Referring to FIG. 2A, a diagram 200 illustrates one embodiment of information flow for a surface steerable system 201 from the perspective of the on-site controller 144 of FIG. 1A. In the present example, the drilling rig 110 of FIG. 1A includes drilling equipment 216 used to perform the drilling of a borehole, such as top drive or rotary drive equipment that couples to the drill string and BHA and is configured to rotate the drill string and apply pressure to the drill bit. The drilling rig 110 may include control systems such as a WOB/differential pressure control system 208, a positional/rotary control system 210, and a fluid circulation control system 212. The control systems 208, 210, and 212 may be used to monitor and change drilling rig settings, such as the WOB and/or differential pressure to alter the ROP or the radial orientation of the toolface, change the flow rate of drilling mud, and perform other operations.

The drilling rig 110 may also include a sensor system 214 for obtaining sensor data about the drilling operation and the drilling rig 110, including the downhole equipment. For example, the sensor system 214 may include measuring while drilling (MWD) and/or logging while drilling (LWD) components for obtaining information, such as toolface and/or formation logging information, that may be saved for later retrieval, transmitted with a delay or in real time using any of various communication means (e.g., wireless, wireline, or mud pulse telemetry), or otherwise transferred to the on-site controller 144. Such information may include information related to hole depth, bit depth, inclination, azimuth, true vertical depth, gamma count, standpipe pressure, mud flow rate, rotary rotations per minute (RPM), bit speed, ROP, WOB, and/or other information. It is understood that all or part of the sensor system 214 may be incorporated into one or more of the control systems 208, 210, and 212, and/or in the drilling equipment 216. As the drilling rig 110 may be configured in many different ways, it is understood that these control systems may be different in some embodiments, and may be combined or further divided into various subsystems.

The on-site controller 144 receives input information 202. The input information 202 may include information that is pre-loaded, received, and/or updated in real time. The input information 202 may include a well plan, regional formation history, one or more drilling engineer parameters, MWD tool face/inclination information, LWD gamma/resistivity information, economic parameters, reliability parameters, and/or other decision guiding parameters. Some of the inputs, such as the regional formation history, may be available from a drilling hub 216, which may include the database 128 of FIG. 1A and one or more processors (not shown), while other inputs may be accessed or uploaded from other sources. For example, a web interface may be used to interact directly with the on-site controller 144 to upload the well plan and/or drilling engineer parameters. The input information 202 feeds into the on-site controller 144 and, after processing by the on-site controller 144, results in control information 204 that is output to the drilling rig 110 (e.g., to the control systems 208, 210, and 212). The drilling rig 110 (e.g., via the systems 208, 210, 212, and 214) provides feedback information 206 to the on-site controller 144. The feedback information 206 then serves as input to the on-site controller 144, enabling the on-site controller 144 to verify that the current control information is producing the desired results or to produce new control information for the drilling rig 110.

The on-site controller 144 also provides output information 203. As will be described later in greater detail, the output information 203 may be stored in the on-site controller 144 and/or sent offsite (e.g., to the database 128). The output information 203 may be used to provide updates to the database 128, as well as provide alerts, request decisions, and convey other data related to the drilling process.

Figure 2B:
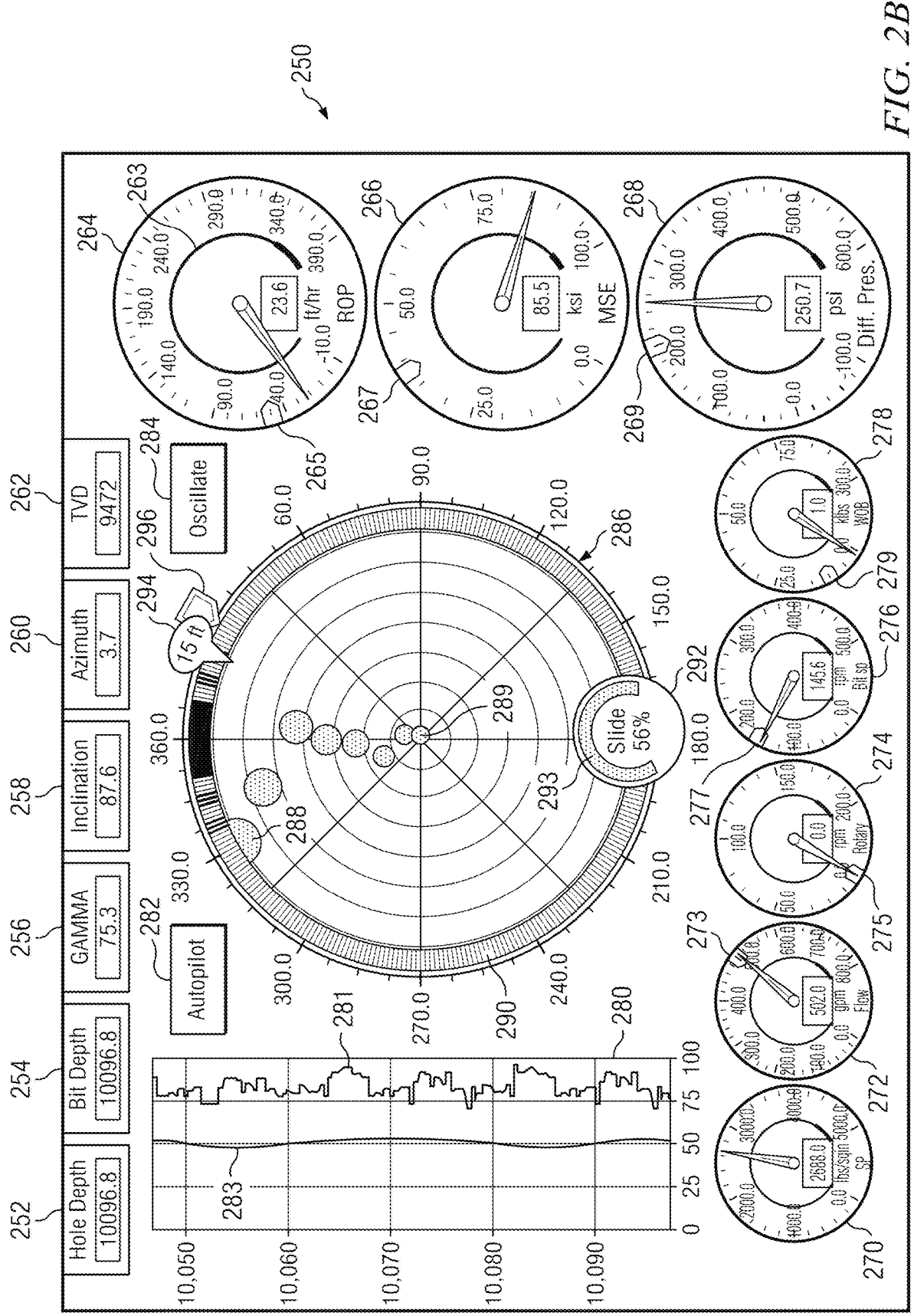
FIG. 2B illustrates one embodiment of a display that may be used with the surface steerable system of FIG. 2A.

Referring to FIG. 2B, one embodiment of a display 250 that may be provided by the on-site controller 144 is illustrated. The display 250 provides many different types of information in an easily accessible format. For example, the display 250 may be a viewing screen (e.g., a monitor) that is coupled to or forms part of the on-site controller 144.

The display 250 provides visual indicators such as a hole depth indicator 252, a bit depth indicator 254, a GAMMA indicator 256, an inclination indicator 258, an azimuth indicator 260, and a TVD indicator 262. Other indicators may also be provided, including a ROP indicator 264, a mechanical specific energy (MSE) indicator 266, a differential pressure indicator 268, a standpipe pressure indicator 270, a flow rate indicator 272, a rotary RPM indicator 274, a bit speed indicator 276, and a WOB indicator 278.

Some or all of the indicators 264, 266, 268, 270, 272, 274, 276, and/or 278 may include a marker representing a target value. For purposes of example, markers are set as the following values, but it is understood that any desired target value may be representing. For example, the ROP indicator 264 may include a marker 265 indicating that the target value is fifty ft/hr. The MSE indicator 266 may include a marker 267 indicating that the target value is thirty-seven ksi. The differential pressure indicator 268 may include a marker 269 indicating that the target value is two hundred psi. The ROP indicator 264 may include a marker 265 indicating that the target value is fifty ft/hr. The standpipe pressure indicator 270 may have no marker in the present example. The flow rate indicator 272 may include a marker 273 indicating that the target value is five hundred gpm. The rotary RPM indicator 274 may include a marker 275 indicating that the target value is zero RPM (due to sliding). The bit speed indicator 276 may include a marker 277 indicating that the target value is one hundred and fifty RPM. The WOB indicator 278 may include a marker 279 indicating that the target value is ten klbs. Although only labeled with respect to the indicator 264, each indicator may include a colored band 263 or another marking to indicate, for example, whether the respective gauge value is within a safe range (e.g., indicated by a green color), within a caution range (e.g., indicated by a yellow color), or within a danger range (e.g., indicated by a red color). Although not shown, in some embodiments, multiple markers may be present on a single indicator. The markers may vary in color and/or size.

A log chart 280 may visually indicate depth versus one or more measurements (e.g., may represent log inputs relative to a progressing depth chart). For example, the log chart 280 may have a y-axis representing depth and an x-axis representing a measurement such as GAMMA count 281 (as shown), ROP 283 (e.g., empirical ROP and normalized ROP), or resistivity. An autopilot button 282 and an oscillate button 284 may be used to control activity. For example, the autopilot button 282 may be used to engage or disengage an autopilot, while the oscillate button 284 may be used to directly control oscillation of the drill string or engage/disengage an external hardware device or controller via software and/or hardware.

A circular chart 286 may provide current and historical toolface orientation information (e.g., which way the bend is pointed). For purposes of illustration, the circular chart 286 represents three hundred and sixty degrees. A series of circles within the circular chart 286 may represent a timeline of toolface orientations, with the sizes of the circles indicating the temporal position of each circle. For example, larger circles may be more recent than smaller circles, so the largest circle 288 may be the newest reading and the smallest circle 289 may be the oldest reading. In other embodiments, the circles may represent the energy and/or progress made via size, color, shape, a number within a circle, etc. For example, the size of a particular circle may represent an accumulation of orientation and progress for the period of time represented by the circle. In other embodiments, concentric circles representing time (e.g., with the outside of the circular chart 286 being the most recent time and the center point being the oldest time) may be used to indicate the energy and/or progress (e.g., via color and/or patterning such as dashes or dots rather than a solid line).

The circular chart 286 may also be color coded, with the color coding existing in a band 290 around the circular chart 286 or positioned or represented in other ways. The color coding may use colors to indicate activity in a certain direction. For example, the color red may indicate the highest level of activity, while the color blue may indicate the lowest level of activity. Furthermore, the arc range in degrees of a color may indicate the amount of deviation. Accordingly, a relatively narrow (e.g., thirty degrees) arc of red with a relatively broad (e.g., three hundred degrees) arc of blue may indicate that most activity is occurring in a particular toolface orientation with little deviation. For purposes of illustration, the color blue extends from approximately 22-337 degrees, the color green extends from approximately 15-22 degrees and 337-345 degrees, the color yellow extends a few degrees around the 13 and 345 degree marks, and the color red extends from approximately 347-10 degrees. Transition colors or shades may be used with, for example, the color orange marking the transition between red and yellow and/or a light blue marking the transition between blue and green.

This color coding enables the display 250 to provide an intuitive summary of how narrow the standard deviation is and how much of the energy intensity is being expended in the proper direction. Furthermore, the center of energy may be viewed relative to the target. For example, the display 250 may clearly show that the target is at ninety degrees but the center of energy is at forty-five degrees.

Other indicators may be present, such as a slide indicator 292 to indicate how much time remains until a slide occurs and/or how much time remains for a current slide. For example, the slide indicator may represent a time, a percentage (e.g., current slide is fifty-six percent complete), a distance completed, and/or a distance remaining. The slide indicator 292 may graphically display information using, for example, a colored bar 293 that increases or decreases with the slide's progress. In some embodiments, the slide indicator may be built into the circular chart 286 (e.g., around the outer edge with an increasing/decreasing band), while in other embodiments the slide indicator may be a separate indicator such as a meter, a bar, a gauge, or another indicator type.

An error indicator 294 may be present to indicate a magnitude and/or a direction of error. For example, the error indicator 294 may indicate that the estimated drill bit position is a certain distance from the planned path, with a location of the error indicator 294 around the circular chart 286 representing the heading. For example, FIG. 2B illustrates an error magnitude of fifteen feet and an error direction of fifteen degrees. The error indicator 294 may be any color but is red for purposes of example. It is understood that the error indicator 294 may present a zero if there is no error and/or may represent that the bit is on the path in other ways, such as being a green color. Transition colors, such as yellow, may be used to indicate varying amounts of error. In some embodiments, the error indicator 294 may not appear unless there is an error in magnitude and/or direction. A marker 296 may indicate an ideal slide direction. Although not shown, other indicators may be present, such as a bit life indicator to indicate an estimated lifetime for the current bit based on a value such as time and/or distance.

It is understood that the display 250 may be arranged in many different ways. For example, colors may be used to indicate normal operation, warnings, and problems. In such cases, the numerical indicators may display numbers in one color (e.g., green) for normal operation, may use another color (e.g., yellow) for warnings, and may use yet another color (e.g., red) if a serious problem occurs. The indicators may also flash or otherwise indicate an alert. The gauge indicators may include colors (e.g., green, yellow, and red) to indicate operational conditions and may also indicate the target value (e.g., an ROP of 100 ft/hr). For example, the ROP indicator 264 may have a green bar to indicate a normal level of operation (e.g., from 10-300 ft/hr), a yellow bar to indicate a warning level of operation (e.g., from 300-360 ft/hr), and a red bar to indicate a dangerous or otherwise out of parameter level of operation (e.g., from 360-390 ft/hr). The ROP indicator 264 may also display a marker at 100 ft/hr to indicate the desired target ROP.

Furthermore, the use of numeric indicators, gauges, and similar visual display indicators may be varied based on factors such as the information to be conveyed and the personal preference of the viewer. Accordingly, the display 250 may provide a customizable view of various drilling processes and information for a particular individual involved in the drilling process. For example, the surface steerable system 201 may enable a user to customize the display 250 as desired, although certain features (e.g., standpipe pressure) may be locked to prevent removal. This locking may prevent a user from intentionally or accidentally removing important drilling information from the display. Other features may be set by preference. Accordingly, the level of customization and the information shown by the display 250 may be controlled based on who is viewing the display and their role in the drilling process.

Referring again to FIG. 2A, it is understood that the level of integration between the on-site controller 144 and the drilling rig 110 may depend on such factors as the configuration of the drilling rig 110 and whether the on-site controller 144 is able to fully support that configuration. One or more of the control systems 208, 210, and 212 may be part of the on-site controller 144, may be third-party systems, and/or may be part of the drilling rig 110. For example, an older drilling rig 110 may have relatively few interfaces with which the on-site controller 144 is able to interact. For purposes of illustration, if a knob must be physically turned to adjust the WOB on the drilling rig 110, the on-site controller 144 will not be able to directly manipulate the knob without a mechanical actuator. If such an actuator is not present, the on-site controller 144 may output the setting for the knob to a screen, and an operator may then turn the knob based on the setting. Alternatively, the on-site controller 144 may be directly coupled to the knob's electrical wiring.

However, a newer or more sophisticated drilling rig 110, such as a rig that has electronic control systems, may have interfaces with which the on-site controller 144 can interact for direct control. For example, an electronic control system may have a defined interface and the on-site controller 144 may be configured to interact with that defined interface. It is understood that, in some embodiments, direct control may not be allowed even if possible. For example, the on-site controller 144 may be configured to display the setting on a screen for approval, and may then send the setting to the appropriate control system only when the setting has been approved.

Figure 3:
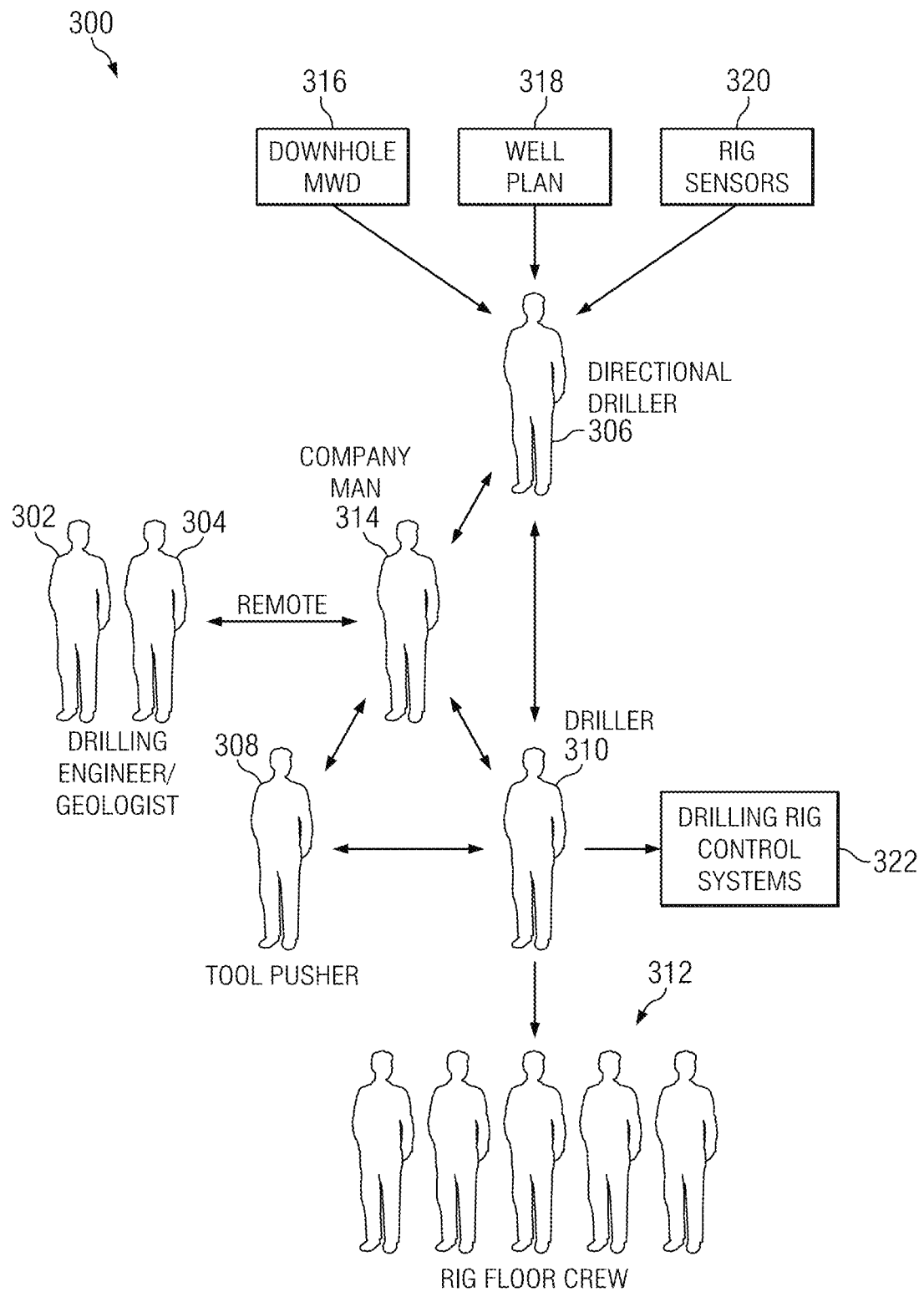
FIG. 3 illustrates one embodiment of a drilling environment that does not have the benefit of the surface steerable system of FIG. 2A and possible communication channels within the environment.

Referring to FIG. 3, one embodiment of an environment 300 illustrates multiple communication channels (indicated by arrows) that are commonly used in existing directional drilling operations that do not have the benefit of the surface steerable system 201 of FIG. 2A. The communication channels couple various individuals involved in the drilling process. The communication channels may support telephone calls, emails, text messages, faxes, data transfers (e.g., file transfers over networks), and other types of communications.

The individuals involved in the drilling process may include a drilling engineer 302, a geologist 304, a directional driller 306, a tool pusher 308, a driller 310, and a rig floor crew 312. One or more company representatives (e.g., company men) 314 may also be involved. The individuals may be employed by different organizations, which can further complicate the communication process. For example, the drilling engineer 302, geologist 304, and company man 314 may work for an operator, the directional driller 306 may work for a directional drilling service provider, and the tool pusher 308, driller 310, and rig floor crew 312 may work for a rig service provider.

The drilling engineer 302 and geologist 304 are often located at a location remote from the drilling rig (e.g., in a home office/drilling hub). The drilling engineer 302 may develop a well plan 318 and may make drilling decisions based on drilling rig information. The geologist 304 may perform such tasks as formation analysis based on seismic, gamma, and other data. The directional driller 306 is generally located at the drilling rig and provides instructions to the driller 310 based on the current well plan and feedback from the drilling engineer 302. The driller 310 handles the actual drilling operations and may rely on the rig floor crew 312 for certain tasks. The tool pusher 308 may be in charge of managing the entire drilling rig and its operation.

The following is one possible example of a communication process within the environment 300, although it is understood that many communication processes may be used. The use of a particular communication process may depend on such factors as the level of control maintained by various groups within the process, how strictly communication channels are enforced, and similar factors. In the present example, the directional driller 306 uses the well plan 318 to provide drilling instructions to the driller 310. The driller 310 controls the drilling using control systems such as the control systems 208, 210, and 212 of FIG. 2A. During drilling, information from sensor equipment such as downhole MWD equipment 316 and/or rig sensors 320 may indicate that a formation layer has been reached twenty feet higher than expected by the geologist 304. This information is passed back to the drilling engineer 302 and/or geologist 304 through the company man 314, and may pass through the directional driller 306 before reaching the company man 314.

The drilling engineer 302/well planner (not shown), either alone or in conjunction with the geologist 306, may modify the well plan 318 or make other decisions based on the received information. The modified well plan and/or other decisions may or may not be passed through the company man 314 to the directional driller 306, who then tells the driller 310 how to drill. The driller 310 may modify equipment settings (e.g., toolface orientation) and, if needed, pass orders on to the rig floor crew 312. For example, a change in WOB may be performed by the driller 310 changing a setting, while a bit trip may require the involvement of the rig floor crew 312. Accordingly, the level of involvement of different individuals may vary depending on the nature of the decision to be made and the task to be performed. The proceeding example may be more complex than described. Multiple intermediate individuals may be involved and, depending on the communication chain, some instructions may be passed through the tool pusher 308.

The environment 300 presents many opportunities for communication breakdowns as information is passed through the various communication channels, particularly given the varying types of communication that may be used. For example, verbal communications via phone may be misunderstood and, unless recorded, provide no record of what was said. Furthermore, accountability may be difficult or impossible to enforce as someone may provide an authorization but deny it or claim that they meant something else. Without a record of the information passing through the various channels and the authorizations used to approve changes in the drilling process, communication breakdowns can be difficult to trace and address. As many of the communication channels illustrated in FIG. 3 pass information through an individual to other individuals (e.g., an individual may serve as an information conduit between two or more other individuals), the risk of breakdown increases due to the possibility that errors may be introduced in the information.

Even if everyone involved does their part, drilling mistakes may be amplified while waiting for an answer. For example, a message may be sent to the geologist 306 that a formation layer seems to be higher than expected, but the geologist 306 may be asleep. Drilling may continue while waiting for the geologist 306 and the continued drilling may amplify the error. Such errors can cost hundreds of thousands or millions of dollars. However, the environment 300 provides no way to determine if the geologist 304 has received the message and no way to easily notify the geologist 304 or to contact someone else when there is no response within a defined period of time. Even if alternate contacts are available, such communications may be cumbersome and there may be difficulty in providing all the information that the alternate would need for a decision.

Figure 4:
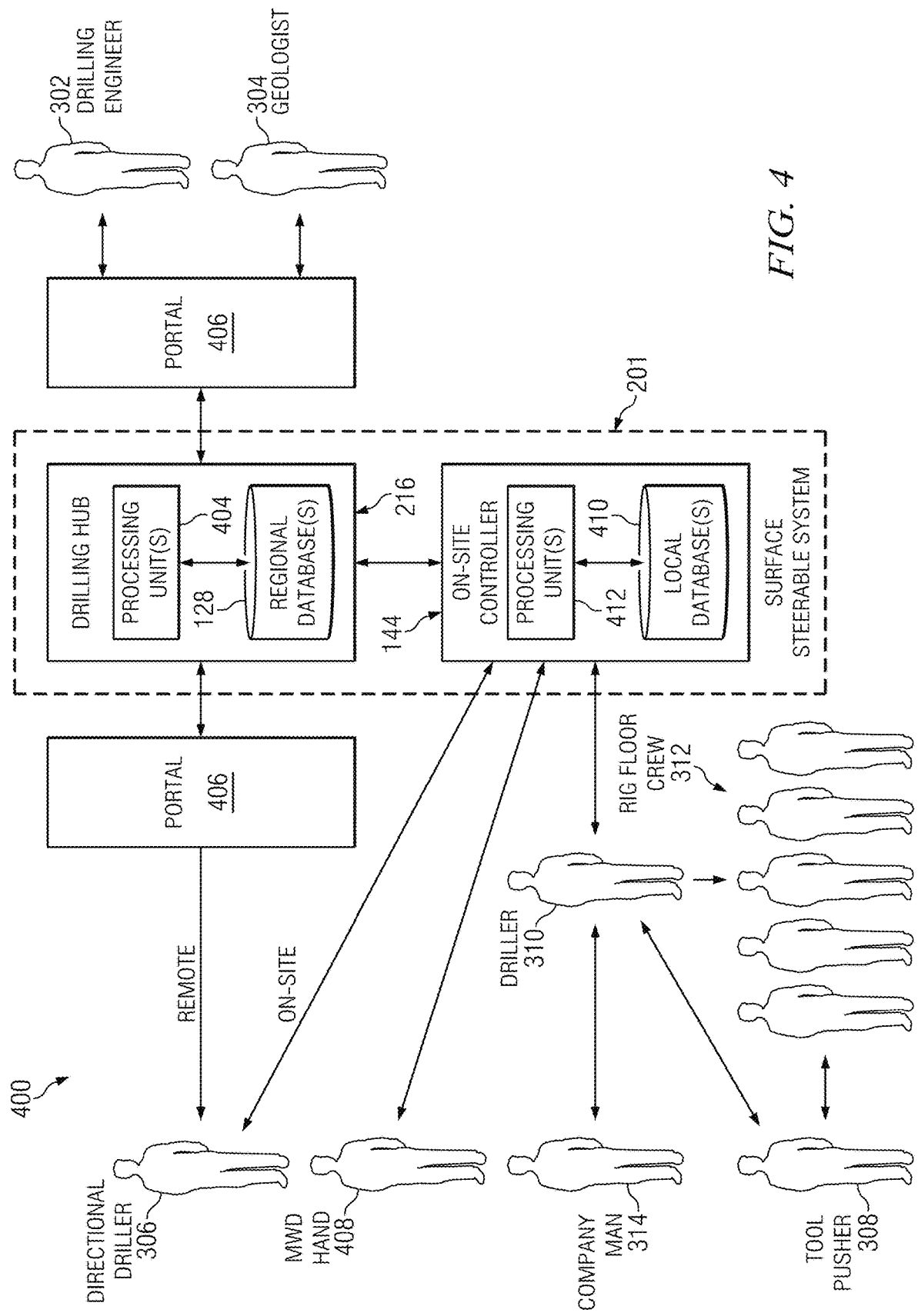
FIG. 4 illustrates one embodiment of a drilling environment that has the benefit of the surface steerable system of FIG. 2A and possible communication channels within the environment.

Referring to FIG. 4, one embodiment of an environment 400 illustrates communication channels that may exist in a directional drilling operation having the benefit of the surface steerable system 201 of FIG. 2A. In the present example, the surface steerable system 201 includes the drilling hub 216, which includes the regional database 128 of FIG. 1A and processing unit(s) 404 (e.g., computers). The drilling hub 216 also includes communication interfaces (e.g., web portals) 406 that may be accessed by computing devices capable of wireless and/or wireline communications, including desktop computers, laptops, tablets, smart phones, and personal digital assistants (PDAs). The on-site controller 144 includes one or more local databases 410 (where "local" is from the perspective of the on-site controller 144) and processing unit(s) 412.

The drilling hub 216 is remote from the on-site controller 144, and various individuals associated with the drilling operation interact either through the drilling hub 216 or through the on-site controller 144. In some embodiments, an individual may access the drilling project through both the drilling hub 216 and on-site controller 144. For example, the directional driller 306 may use the drilling hub 216 when not at the drilling site and may use the on-site controller 144 when at the drilling site.

The drilling engineer 302 and geologist 304 may access the surface steerable system 201 remotely via the portal 406 and set various parameters such as rig limit controls. Other actions may also be supported, such as granting approval to a request by the directional driller 306 to deviate from the well plan and evaluating the performance of the drilling operation. The directional driller 306 may be located either at the drilling rig 110 or off-site. Being off-site (e.g., at the drilling hub 216 or elsewhere) enables a single directional driller to monitor multiple drilling rigs. When off-site, the directional driller 306 may access the surface steerable system 201 via the portal 406. When on-site, the directional driller 306 may access the surface steerable system via the on-site controller 144.

The driller 310 may get instructions via the on-site controller 144, thereby lessening the possibly of miscommunication and ensuring that the instructions were received. Although the tool pusher 308, rig floor crew 312, and company man 314 are shown communicating via the driller 310, it is understood that they may also have access to the on-site controller 144. Other individuals, such as a MWD hand 408, may access the surface steerable system 201 via the drilling hub 216, the on-site controller 144, and/or an individual such as the driller 310.

As illustrated in FIG. 4, many of the individuals involved in a drilling operation may interact through the surface steerable system 201. This enables information to be tracked as it is handled by the various individuals involved in a particular decision. For example, the surface steerable system 201 may track which individual submitted information (or whether information was submitted automatically), who viewed the information, who made decisions, when such events occurred, and similar information-based issues. This provides a complete record of how particular information propagated through the surface steerable system 201 and resulted in a particular drilling decision. This also provides revision tracking as changes in the well plan occur, which in turn enables entire decision chains to be reviewed. Such reviews may lead to improved decision making processes and more efficient responses to problems as they occur.

In some embodiments, documentation produced using the surface steerable system 201 may be synchronized and/or merged with other documentation, such as that produced by third party systems such as the WellView product produced by Peloton Computer Enterprises Ltd. of Calgary, Canada. In such embodiments, the documents, database files, and other information produced by the surface steerable system 201 is synchronized to avoid such issues as redundancy, mismatched file versions, and other complications that may occur in projects where large numbers of documents are produced, edited, and transmitted by a relatively large number of people.

The surface steerable system 201 may also impose mandatory information formats and other constraints to ensure that predefined criteria are met. For example, an electronic form provided by the surface steerable system 201 in response to a request for authorization may require that some fields are filled out prior to submission. This ensures that the decision maker has the relevant information prior to making the decision. If the information for a required field is not available, the surface steerable system 201 may require an explanation to be entered for why the information is not available (e.g., sensor failure). Accordingly, a level of uniformity may be imposed by the surface steerable system 201, while exceptions may be defined to enable the surface steerable system 201 to handle various scenarios.

The surface steerable system 201 may also send alerts (e.g., email or text alerts) to notify one or more individuals of a particular problem, and the recipient list may be customized based on the problem. Furthermore, contact information may be time-based, so the surface steerable system 201 may know when a particular individual is available. In such situations, the surface steerable system 201 may automatically attempt to communicate with an available contact rather than waiting for a response from a contact that is likely not available.

As described previously, the surface steerable system 201 may present a customizable display of various drilling processes and information for a particular individual involved in the drilling process. For example, the drilling engineer 302 may see a display that presents information relevant to the drilling engineer's tasks, and the geologist 304 may see a different display that includes additional and/or more detailed formation information. This customization enables each individual to receive information needed for their particular role in the drilling process while minimizing or eliminating unnecessary information.

Figure 5:
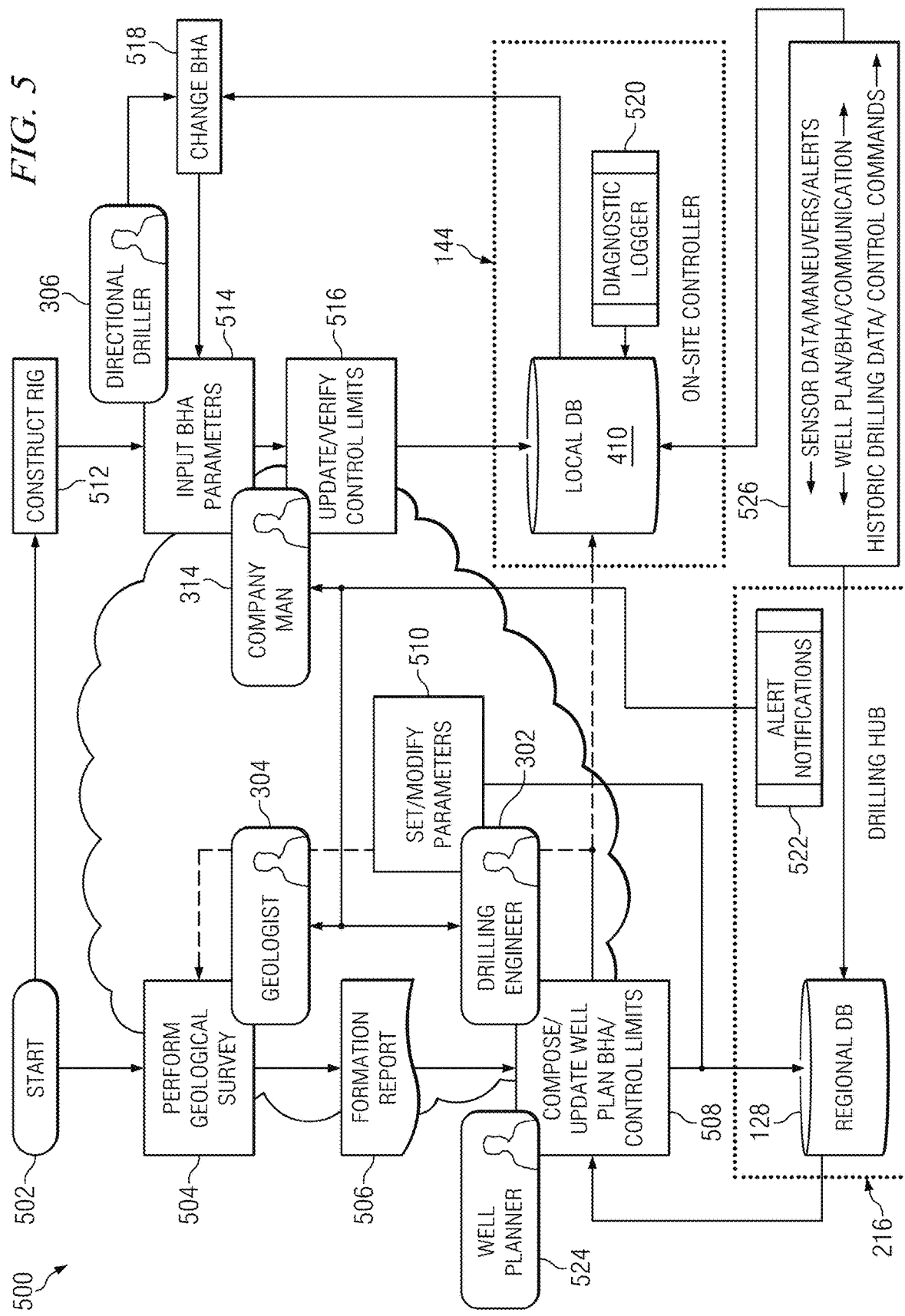
FIG. 5 illustrates one embodiment of data flow that may be supported by the surface steerable system of FIG. 2A.

Referring to FIG. 5, one embodiment of an environment 500 illustrates data flow that may be supported by the surface steerable system 201 of FIG. 2A. The data flow 500 begins at block 502 and may move through two branches, although some blocks in a branch may not occur before other blocks in the other branch. One branch involves the drilling hub 216 and the other branch involves the on-site controller 144 at the drilling rig 110.

In block 504, a geological survey is performed. The survey results are reviewed by the geologist 304 and a formation report 506 is produced. The formation report 506 details formation layers, rock type, layer thickness, layer depth, and similar information that may be used to develop a well plan. In block 508, a well plan is developed by a well planner 524 and/or the drilling engineer 302 based on the formation report and information from the regional database 128 at the drilling hub 216. Block 508 may include selection of a BHA and the setting of control limits. The well plan is stored in the database 128. The drilling engineer 302 may also set drilling operation parameters in step 510 that are also stored in the database 128.

In the other branch, the drilling rig 110 is constructed in block 512. At this point, as illustrated by block 526, the well plan, BHA information, control limits, historical drilling data, and control commands may be sent from the database 128 to the local database 410. Using the receiving information, the directional driller 306 inputs actual BHA parameters in block 514. The company man 314 and/or the directional driller 306 may verify performance control limits in block 516, and the control limits are stored in the local database 410 of the on-site controller 144. The performance control limits may include multiple levels such as a warning level and a critical level corresponding to no action taken within feet/minutes.

Once drilling begins, a diagnostic logger (described later in greater detail) 520 that is part of the on-site controller 144 logs information related to the drilling such as sensor information and maneuvers and stores the information in the local database 410 in block 526. The information is sent to the database 128. Alerts are also sent from the on-site controller 144 to the drilling hub 216. When an alert is received by the drilling hub 216, an alert notification 522 is sent to defined individuals, such as the drilling engineer 302, geologist 304, and company man 314. The actual recipient may vary based on the content of the alert message or other criteria. The alert notification 522 may result in the well plan and the BHA information and control limits being modified in block 508 and parameters being modified in block 510. These modifications are saved to the database 128 and transferred to the local database 410. The BHA may be modified by the directional driller 306 in block 518, and the changes propagated through blocks 514 and 516 with possible updated control limits. Accordingly, the surface steerable system 201 may provide a more controlled flow of information than may occur in an environment without such a system.

The flow charts described herein illustrate various exemplary functions and operations that may occur within various environments. Accordingly, these flow charts are not exhaustive and that various steps may be excluded to clarify the aspect being described. For example, it is understood that some actions, such as network authentication processes, notifications, and handshakes, may have been performed prior to the first step of a flow chart. Such actions may depend on the particular type and configuration of communications engaged in by the on-site controller 144 and/or drilling hub 216. Furthermore, other communication actions may occur between illustrated steps or simultaneously with illustrated steps.

The surface steerable system 201 includes large amounts of data specifically related to various drilling operations as stored in databases such as the databases 128 and 410. As described with respect to FIG. 1A, this data may include data collected from many different locations and may correspond to many different drilling operations. The data stored in the database 128 and other databases may be used for a variety of purposes, including data mining and analytics, which may aid in such processes as equipment comparisons, drilling plan formulation, convergence planning, recalibration forecasting, and self-tuning (e.g., drilling performance optimization). Some processes, such as equipment comparisons, may not be performed in real time using incoming data, while others, such as self-tuning, may be performed in real time or near real time. Accordingly, some processes may be executed at the drilling hub 216, other processes may be executed at the on-site controller 144, and still other processes may be executed by both the drilling hub 216 and the on-site controller 144 with communications occurring before, during, and/or after the processes are executed. As described below in various examples, some processes may be triggered by events (e.g., recalibration forecasting) while others may be ongoing (e.g., self-tuning).

For example, in equipment comparison, data from different drilling operations (e.g., from drilling the wells 102, 104, 106, and 108) may be normalized and used to compare equipment wear, performance, and similar factors. For example, the same bit may have been used to drill the wells 102 and 106, but the drilling may have been accomplished using different parameters (e.g., rotation speed and WOB). By normalizing the data, the two bits can be compared more effectively. The normalized data may be further processed to improve drilling efficiency by identifying which bits are most effective for particular rock layers, which drilling parameters resulted in the best ROP for a particular formation, ROP versus reliability tradeoffs for various bits in various rock layers, and similar factors. Such comparisons may be used to select a bit for another drilling operation based on formation characteristics or other criteria. Accordingly, by mining and analyzing the data available via the surface steerable system 201, an optimal equipment profile may be developed for different drilling operations. The equipment profile may then be used when planning future wells or to increase the efficiency of a well currently being drilled. This type of drilling optimization may become increasingly accurate as more data is compiled and analyzed.

In drilling plan formulation, the data available via the surface steerable system 201 may be used to identify likely formation characteristics and to select an appropriate equipment profile. For example, the geologist 304 may use local data obtained from the planned location of the drilling rig 110 in conjunction with regional data from the database 128 to identify likely locations of the layers 168A-176A (FIG. 1B). Based on that information, the drilling engineer 302 can create a well plan that will include the build curve of FIG. 1C.

Referring to FIG. 6, a method 600 illustrates one embodiment of an event-based process that may be executed by the on-site controller 144 of FIG. 2A. For example, software instructions needed to execute the method 600 may be stored on a computer readable storage medium of the on-site controller 144 and then executed by the processor 412 that is coupled to the storage medium and is also part of the on-site controller 144.

In step 602, the on-site controller 144 receives inputs, such as a planned path for a borehole, formation information for the borehole, equipment information for the drilling rig, and a set of cost parameters. The cost parameters may be used to guide decisions made by the on-site controller 144 as will be explained in greater detail below. The inputs may be received in many different ways, including receiving document (e.g., spreadsheet) uploads, accessing a database (e.g., the database 128 of FIG. 1A), and/or receiving manually entered data.

In step 604, the planned path, the formation information, the equipment information, and the set of cost parameters are processed to produce control parameters (e.g., the control information 204 of FIG. 2A) for the drilling rig 110. The control parameters may define the settings for various drilling operations that are to be executed by the drilling rig 110 to form the borehole, such as WOB, flow rate of mud, toolface orientation, and similar settings. In some embodiments, the control parameters may also define particular equipment selections, such as a particular bit. In the present example, step 604 is directed to defining initial control parameters for the drilling rig 110 prior to the beginning of drilling, but it is understood that step 604 may be used to define control parameters for the drilling rig 110 even after drilling has begun. For example, the on-site controller 144 may be put in place prior to drilling or may be put in place after drilling has commenced, in which case the method 600 may also receive current borehole information in step 602.

In step 606, the control parameters are output for use by the drilling rig 110. In embodiments where the on-site controller 144 is directly coupled to the drilling rig 110, outputting the control parameters may include sending the control parameters directly to one or more of the control systems of the drilling rig 110 (e.g., the control systems 210, 212, and 214). In other embodiments, outputting the control parameters may include displaying the control parameters on a screen, printing the control parameters, and/or copying them to a storage medium (e.g., a Universal Serial Bus (USB) drive) to be transferred manually.

In step 608, feedback information received from the drilling rig 110 (e.g., from one or more of the control systems 210, 212, and 214 and/or sensor system 216) is processed. The feedback information may provide the on-site controller 144 with the current state of the borehole (e.g., depth and inclination), the drilling rig equipment, and the drilling process, including an estimated position of the bit in the borehole. The processing may include extracting desired data from the feedback information, normalizing the data, comparing the data to desired or ideal parameters, determining whether the data is within a defined margin of error, and/or any other processing steps needed to make use of the feedback information.

In step 610, the on-site controller 144 may take action based on the occurrence of one or more defined events. For example, an event may trigger a decision on how to proceed with drilling in the most cost effective manner. Events may be triggered by equipment malfunctions, path differences between the measured borehole and the planned borehole, upcoming maintenance periods, unexpected geological readings, and any other activity or non-activity that may affect drilling the borehole. It is understood that events may also be defined for occurrences that have a less direct impact on drilling, such as actual or predicted labor shortages, actual or potential licensing issues for mineral rights, actual or predicted political issues that may impact drilling, and similar actual or predicted occurrences. Step 610 may also result in no action being taken if, for example, drilling is occurring without any issues and the current control parameters are satisfactory.

An event may be defined in the received inputs of step 602 or defined later. Events may also be defined on site using the on-site controller 144. For example, if the drilling rig 110 has a particular mechanical issue, one or more events may be defined to monitor that issue in more detail than might ordinarily occur. In some embodiments, an event chain may be implemented where the occurrence of one event triggers the monitoring of another related event. For example, a first event may trigger a notification about a potential problem with a piece of equipment and may also activate monitoring of a second event. In addition to activating the monitoring of the second event, the triggering of the first event may result in the activation of additional oversight that involves, for example, checking the piece of equipment more frequently or at a higher level of detail. If the second event occurs, the equipment may be shut down and an alarm sounded, or other actions may be taken. This enables different levels of monitoring and different levels of responses to be assigned independently if needed.

Figure 7A:
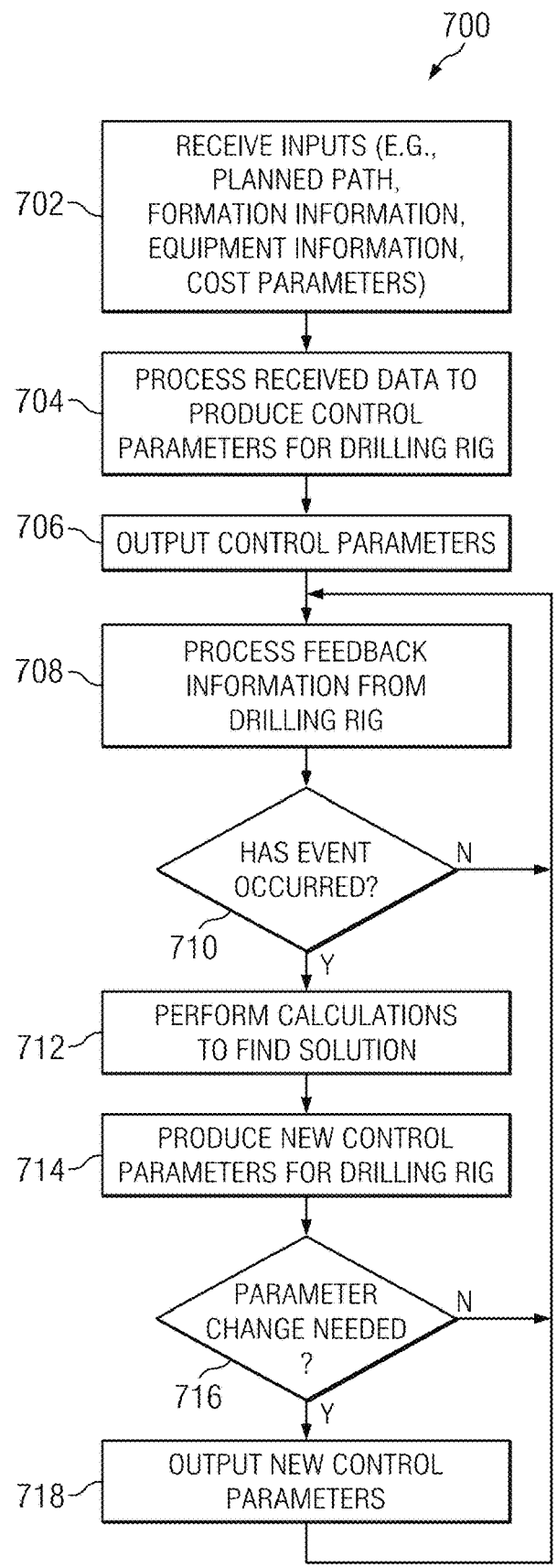
FIG. 7A illustrates a more detailed embodiment of the method of FIG. 6.

Referring to FIG. 7A, a method 700 illustrates a more detailed embodiment of the method 600 of FIG. 6, particularly of step 610. As steps 702, 704, 706, and 708 are similar or identical to steps 602, 604, 606, and 608, respectively, of FIG. 6, they are not described in detail in the present embodiment. In the present example, the action of step 610 of FIG. 6 is based on whether an event has occurred and the action needed if the event has occurred.

Accordingly, in step 710, a determination is made as to whether an event has occurred based on the inputs of steps 702 and 708. If no event has occurred, the method 700 returns to step 708. If an event has occurred, the method 700 moves to step 712, where calculations are performed based on the information relating to the event and at least one cost parameter. It is understood that additional information may be obtained and/or processed prior to or as part of step 712 if needed. For example, certain information may be used to determine whether an event has occurred, and additional information may then be retrieved and processed to determine the particulars of the event.

In step 714, new control parameters may be produced based on the calculations of step 712. In step 716, a determination may be made as to whether changes are needed in the current control parameters. For example, the calculations of step 712 may result in a decision that the current control parameters are satisfactory (e.g., the event may not affect the control parameters). If no changes are needed, the method 700 returns to step 708. If changes are needed, the on-site controller 144 outputs the new parameters in step 718. The method 700 may then return to step 708. In some embodiments, the determination of step 716 may occur before step 714. In such embodiments, step 714 may not be executed if the current control parameters are satisfactory.

In a more detailed example of the method 700, assume that the on-site controller 144 is involved in drilling a borehole and that approximately six hundred feet remain to be drilled. An event has been defined that warns the on-site controller 144 when the drill bit is predicted to reach a minimum level of efficiency due to wear and this event is triggered in step 710 at the six hundred foot mark. The event may be triggered because the drill bit is within a certain number of revolutions before reaching the minimum level of efficiency, within a certain distance remaining (based on strata type, thickness, etc.) that can be drilled before reaching the minimum level of efficiency, or may be based on some other factor or factors. Although the event of the current example is triggered prior to the predicted minimum level of efficiency being reached in order to proactively schedule drilling changes if needed, it is understood that the event may be triggered when the minimum level is actually reached.

The on-site controller 144 may perform calculations in step 712 that account for various factors that may be analyzed to determine how the last six hundred feet is drilled. These factors may include the rock type and thickness of the remaining six hundred feet, the predicted wear of the drill bit based on similar drilling conditions, location of the bit (e.g., depth), how long it will take to change the bit, and a cost versus time analysis. Generally, faster drilling is more cost effective, but there are many tradeoffs. For example, increasing the WOB or differential pressure to increase the rate of penetration may reduce the time it takes to finish the borehole, but may also wear out the drill bit faster, which will decrease the drilling effectiveness and slow the drilling down. If this slowdown occurs too early, it may be less efficient than drilling more slowly. Therefore, there is a tradeoff that must be calculated. Too much WOB or differential pressure may also cause other problems, such as damaging downhole tools. Should one of these problems occur, taking the time to trip the bit or drill a sidetrack may result in more total time to finish the borehole than simply drilling more slowly, so faster may not be better. The tradeoffs may be relatively complex, with many factors to be considered.

In step 714, the on-site controller 144 produces new control parameters based on the solution calculated in step 712. In step 716, a determination is made as to whether the current parameters should be replaced by the new parameters. For example, the new parameters may be compared to the current parameters. If the two sets of parameters are substantially similar (e.g., as calculated based on a percentage change or margin of error of the current path with a path that would be created using the new control parameters) or identical to the current parameters, no changes would be needed. However, if the new control parameters call for changes greater than the tolerated percentage change or outside of the margin of error, they are output in step 718. For example, the new control parameters may increase the WOB and also include the rate of mud flow significantly enough to override the previous control parameters. In other embodiments, the new control parameters may be output regardless of any differences, in which case step 716 may be omitted. In still other embodiments, the current path and the predicted path may be compared before the new parameters are produced, in which case step 714 may occur after step 716.

Figure 7B:
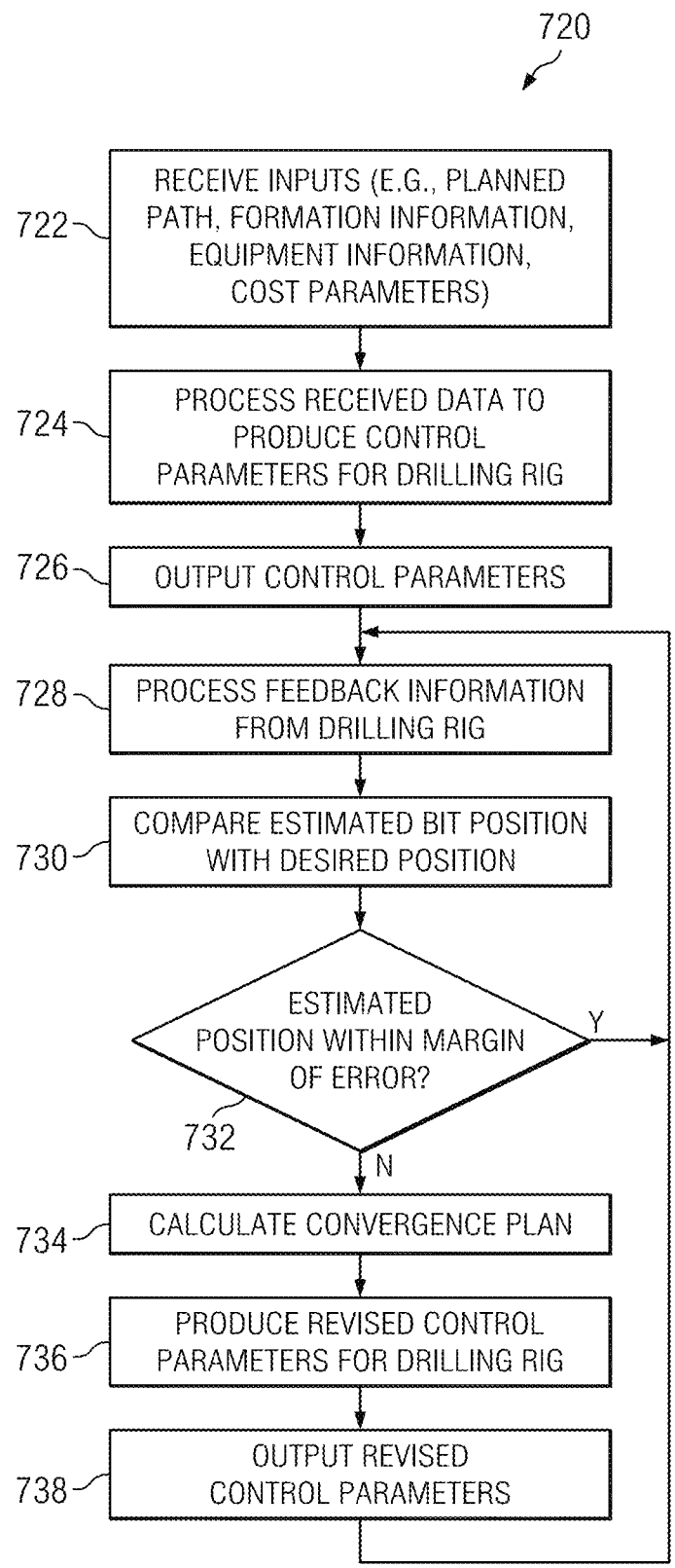
FIG. 7B illustrates a more detailed embodiment of the method of FIG. 6.
Figure 7C:
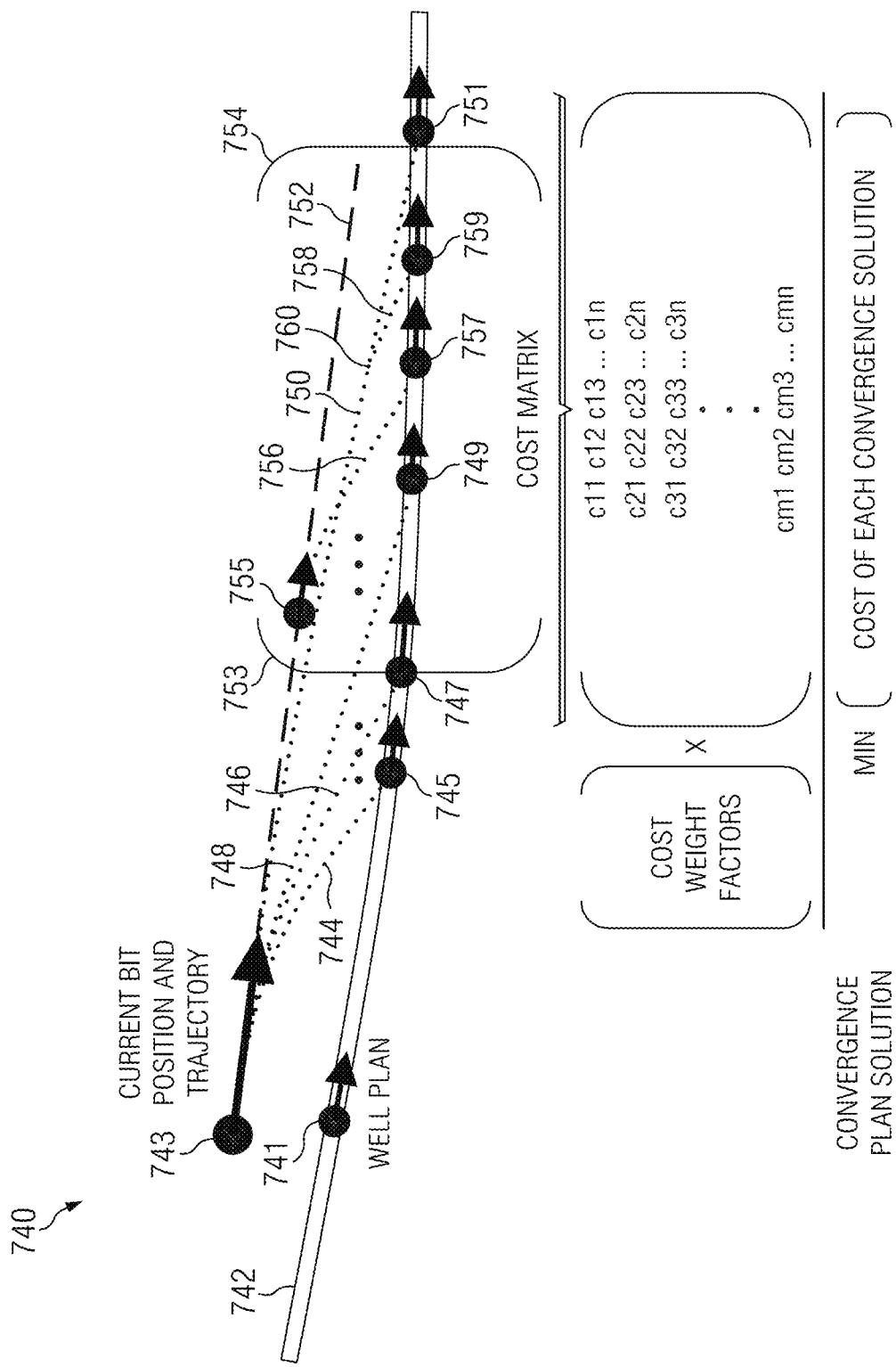
FIG. 7C illustrates one embodiment of a convergence plan diagram with multiple convergence paths.

Referring to FIG. 7B and with additional reference to FIG. 7C, a method 720 (FIG. 7B) and diagram 740 (FIG. 7C) illustrate a more detailed embodiment of the method 600 of FIG. 6, particularly of step 610. As steps 722, 724, 726, and 728 are similar or identical to steps 602, 604, 606, and 608, respectively, of FIG. 6, they are not described in detail in the present embodiment. In the present example, the action of step 610 of FIG. 6 is based on whether the drilling has deviated from the planned path.

In step 730, a comparison may be made to compare the estimated bit position and trajectory with a desired point (e.g., a desired bit position) along the planned path. The estimated bit position may be calculated based on information such as a survey reference point and/or represented as an output calculated by a borehole estimator (as will be described later) and may include a bit projection path and/or point that represents a predicted position of the bit if it continues its current trajectory from the estimated bit position. Such information may be included in the inputs of step 722 and feedback information of step 728 or may be obtained in other ways. It is understood that the estimated bit position and trajectory may not be calculated exactly, but may represent an estimate the current location of the drill bit based on the feedback information. As illustrated in FIG. 7C, the estimated bit position is indicated by arrow 743 relative to the desired bit position 741 along the planned path 742.

In step 732, a determination may be made as to whether the estimated bit position 743 is within a defined margin of error of the desired bit position. If the estimated bit position is within the margin of error, the method 720 returns to step 728. If the estimated bit position is not within the margin of error, the on-site controller 144 calculates a convergence plan in step 734. With reference to FIG. 7C, for purposes of the present example, the estimated bit position 743 is outside of the margin of error.

In some embodiments, a projected bit position (not shown) may also be used. For example, the estimated bit position 743 may be extended via calculations to determine where the bit is projected to be after a certain amount of drilling (e.g., time and/or distance). This information may be used in several ways. If the estimated bit position 743 is outside the margin of error, the projected bit position 743 may indicate that the current bit path will bring the bit within the margin of error without any action being taken. In such a scenario, action may be taken only if it will take too long to reach the projected bit position when a more optimal path is available. If the estimated bit position is inside the margin of error, the projected bit position may be used to determine if the current path is directing the bit away from the planned path. In other words, the projected bit position may be used to proactively detect that the bit is off course before the margin of error is reached. In such a scenario, action may be taken to correct the current path before the margin of error is reached.

The convergence plan identifies a plan by which the bit can be moved from the estimated bit position 743 to the planned path 742. It is noted that the convergence plan may bypass the desired bit position 741 entirely, as the objective is to get the actual drilling path back to the planned path 742 in the most optimal manner. The most optimal manner may be defined by cost, which may represent a financial value, a reliability value, a time value, and/or other values that may be defined for a convergence path.

As illustrated in FIG. 7C, an infinite number of paths may be selected to return the bit to the planned path 742. The paths may begin at the estimated bit position 743 or may begin at other points along a projected path 752 that may be determined by calculating future bit positions based on the current trajectory of the bit from the estimated bit position 752. In the present example, a first path 744 results in locating the bit at a position 745 (e.g., a convergence point). The convergence point 745 is outside of a lower limit 753 defined by a most aggressive possible correction (e.g., a lower limit on a window of correction). This correction represents the most aggressive possible convergence path, which may be limited by such factors as a maximum directional change possible in the convergence path, where any greater directional change creates a dogleg that makes it difficult or impossible to run casing or perform other needed tasks. A second path 746 results in a convergence point 747, which is right at the lower limit 753. A third path 748 results in a convergence point 749, which represents a mid-range convergence point. A third path 750 results in a convergence point 751, which occurs at an upper limit 754 defined by a maximum convergence delay (e.g., an upper limit on the window of correction).

A fourth path 756 may begin at a projected point or bit position 755 that lies along the projected path 752 and result in a convergence point 757, which represents a mid-range convergence point. The path 756 may be used by, for example, delaying a trajectory change until the bit reaches the position 755. Many additional convergence options may be opened up by using projected points for the basis of convergence plans as well as the estimated bit position.

A fifth path 758 may begin at a projected point or bit position 760 that lies along the projected path 750 and result in a convergence point 759. In such an embodiment, different convergence paths may include similar or identical path segments, such as the similar or identical path shared by the convergence points 751 and 759 to the point 760. For example, the point 760 may mark a position on the path 750 where a slide segment begins (or continues from a previous slide segment) for the path 758 and a straight line path segment begins (or continues) for the path 750. The surface steerable system 144 may calculate the paths 750 and 758 as two entirely separate paths or may calculate one of the paths as deviating from (e.g., being a child of) the other path. Accordingly, any path may have multiple paths deviating from that path based on, for example, different slide points and slide times.

Each of these paths 744, 746, 748, 750, 756, and 758 may present advantages and disadvantages from a drilling standpoint. For example, one path may be longer and may require more sliding in a relatively soft rock layer, while another path may be shorter but may require more sliding through a much harder rock layer. Accordingly, tradeoffs may be evaluated when selecting one of the convergence plans rather than simply selecting the most direct path for convergence. The tradeoffs may, for example, consider a balance between ROP, total cost, dogleg severity, and reliability. While the number of convergence plans may vary, there may be hundreds or thousands of convergence plans in some embodiments and the tradeoffs may be used to select one of those hundreds or thousands for implementation. The convergence plans from which the final convergence plan is selected may include plans calculated from the estimated bit position 743 as well as plans calculated from one or more projected points along the projected path.

In some embodiments, straight line projections of the convergence point vectors, after correction to the well plan 742, may be evaluated to predict the time and/or distance to the next correction requirement. This evaluation may be used when selecting the lowest total cost option by avoiding multiple corrections where a single more forward thinking option might be optimal. As an example, one of the solutions provided by the convergence planning may result in the most cost effective path to return to the well plan 742, but may result in an almost immediate need for a second correction due to a pending deviation within the well plan. Accordingly, a convergence path that merges the pending deviation with the correction by selecting a convergence point beyond the pending deviation might be selected when considering total well costs.

It is understood that the diagram 740 of FIG. 7C is a two dimensional representation of a three dimensional environment. Accordingly, the illustrated convergence paths in the diagram 740 of FIG. 7C may be three dimensional. In addition, although the illustrated convergence paths all converge with the planned path 742, is it understood that some convergence paths may be calculated that move away from the planned path 742 (although such paths may be rejected). Still other convergence paths may overshoot the actual path 742 and then converge (e.g., if there isn't enough room to build the curve otherwise). Accordingly, many different convergence path structures may be calculated.

Referring again to FIG. 7B, in step 736, the on-site controller 144 produces revised control parameters based on the convergence plan calculated in step 734. In step 738, the revised control parameters may be output. It is understood that the revised control parameters may be provided to get the drill bit back to the planned path 742 and the original control parameters may then be used from that point on (starting at the convergence point). For example, if the convergence plan selected the path 748, the revised control parameters may be used until the bit reaches position 749. Once the bit reaches the position 749, the original control parameters may be used for further drilling. Alternatively, the revised control parameters may incorporate the original control parameters starting at the position 749 or may re-calculate control parameters for the planned path even beyond the point 749. Accordingly, the convergence plan may result in control parameters from the bit position 743 to the position 749, and further control parameters may be reused or calculated depending on the particular implementation of the on-site controller 144.

Referring to FIG. 8A, a method 800 illustrates a more detailed embodiment of step 734 of FIG. 7B. It is understood that the convergence plan of step 734 may be calculated in many different ways, and that 800 method provides one possible approach to such a calculation when the goal is to find the lowest cost solution vector. In the present example, cost may include both the financial cost of a solution and the reliability cost of a solution. Other costs, such as time costs, may also be included. For purposes of example, the diagram 740 of FIG. 7C is used.

In step 802, multiple solution vectors are calculated from the current position 743 to the planned path 742. These solution vectors may include the paths 744, 746, 748, and 750. Additional paths (not shown in FIG. 7C) may also be calculated. The number of solution vectors that are calculated may vary depending on various factors. For example, the distance available to build a needed curve to get back to the planned path 742 may vary depending on the current bit location and orientation relative to the planned path. A greater number of solution vectors may be available when there is a greater distance in which to build a curve than for a smaller distance since the smaller distance may require a much more aggressive build rate that excludes lesser build rates that may be used for the greater distance. In other words, the earlier an error is caught, the more possible solution vectors there will generally be due to the greater distance over which the error can be corrected. While the number of solution vectors that are calculated in this step may vary, there may be hundreds or thousands of solution vectors calculated in some embodiments.

In step 804, any solution vectors that fall outside of defined limits are rejected, such as solution vectors that fall outside the lower limit 753 and the upper limit 754. For example, the path 744 would be rejected because the convergence point 745 falls outside of the lower limit 753. It is understood that the path 744 may be rejected for an engineering reason (e.g., the path would require a dogleg of greater than allowed severity) prior to cost considerations, or the engineering reason may be considered a cost.

In step 806, a cost is calculated for each remaining solution vector. As illustrated in FIG. 7C, the costs may be represented as a cost matrix (that may or may not be weighted) with each solution vector having corresponding costs in the cost matrix. In step 808, a minimum of the solution vectors may be taken to identify the lowest cost solution vector. It is understood that the minimum cost is one way of selecting the desired solution vector, and that other ways may be used. Accordingly, step 808 is concerned with selecting an optimal solution vector based on a set of target parameters, which may include one or more of a financial cost, a time cost, a reliability cost, and/or any other factors, such as an engineering cost like dogleg severity, that may be used to narrow the set of solution vectors to the optimal solution vector.

By weighting the costs, the cost matrix can be customized to handle many different cost scenarios and desired results. For example, if time is of primary importance, a time cost may be weighted over financial and reliability costs to ensure that a solution vector that is faster will be selected over other solution vectors that are substantially the same but somewhat slower, even though the other solution vectors may be more beneficial in terms of financial cost and reliability cost. In some embodiments, step 804 may be combined with step 808 and solution vectors falling outside of the limits may be given a cost that ensures they will not be selected. In step 810, the solution vector corresponding to the minimum cost is selected.

Referring to FIG. 8B, a method 820 illustrates one embodiment of an event-based process that may be executed by the on-site controller 144 of FIG. 2A. It is understood that an event may represent many different scenarios in the surface steerable system 201. In the present example, in step 822, an event may occur that indicates that a prediction is not correct based on what has actually occurred. For example, a formation layer is not where it is expected (e.g., too high or low), a selected bit did not drill as expected, or a selected mud motor did not build curve as expected. The prediction error may be identified by comparing expected results with actual results or by using other detection methods.

In step 824, a reason for the error may be determined as the surface steerable system 201 and its data may provide an environment in which the prediction error can be evaluated. For example, if a bit did not drill as expected, the method 820 may examine many different factors, such as whether the rock formation was different than expected, whether the drilling parameters were correct, whether the drilling parameters were correctly entered by the driller, whether another error and/or failure occurred that caused the bit to drill poorly, and whether the bit simply failed to perform. By accessing and analyzing the available data, the reason for the failure may be determined.

In step 826, a solution may be determined for the error. For example, if the rock formation was different than expected, the database 128 may be updated with the correct rock information and new drilling parameters may be obtained for the drilling rig 110. Alternatively, the current bit may be tripped and replaced with another bit more suitable for the rock. In step 828, the current drilling predictions (e.g., well plan, build rate, slide estimates) may be updated based on the solution and the solution may be stored in the database 128 for use in future predictions. Accordingly, the method 820 may result in benefits for future wells as well as improving current well predictions.

Figures 8C, 8D:
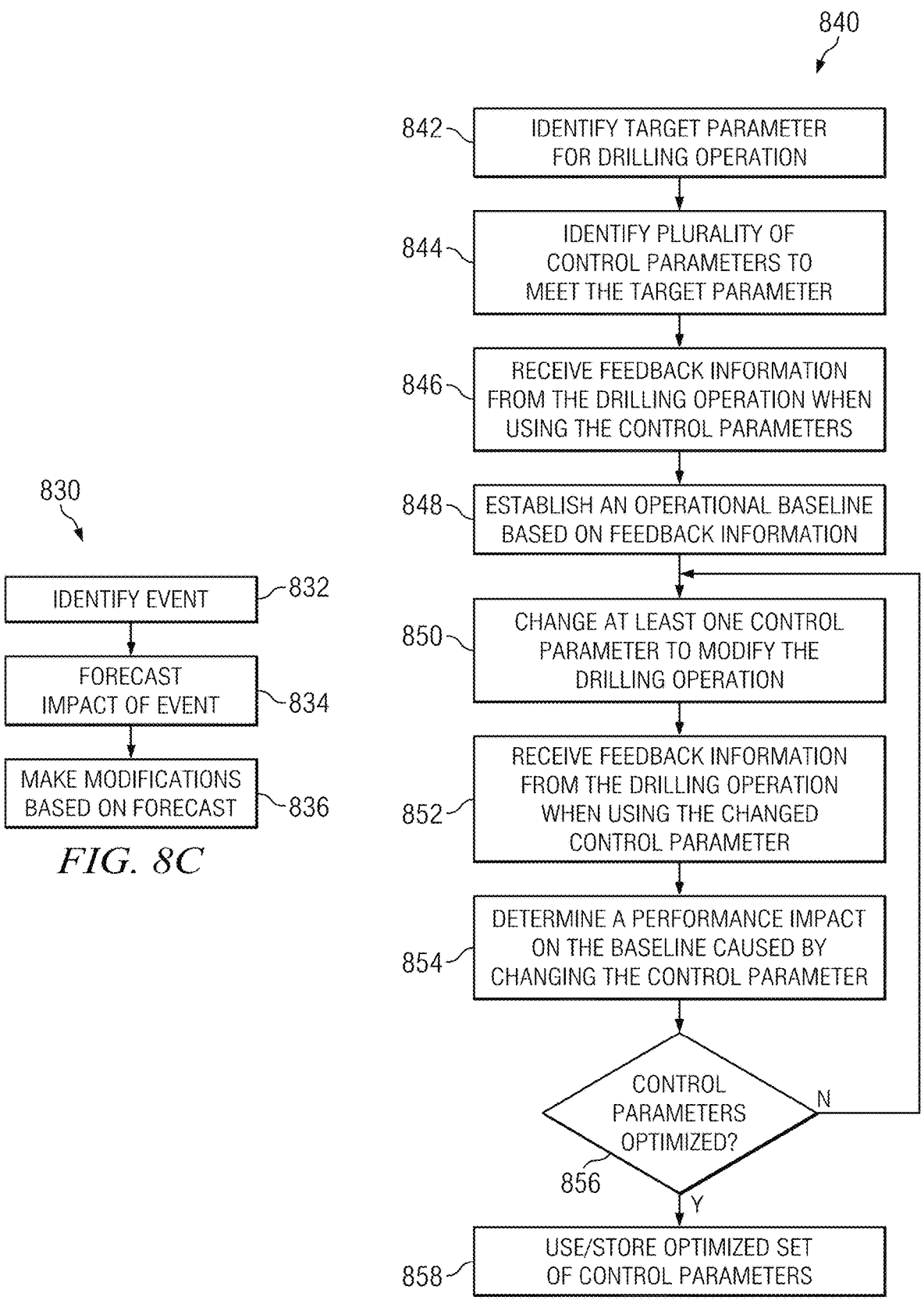
FIG. 8C illustrates a more detailed embodiment of a portion of the method of FIG. 6.
FIG. 8D illustrates a more detailed embodiment of a portion of the method of FIG. 6.

Referring to FIG. 8C, a method 830 illustrates one embodiment of an event-based process that may be executed by the on-site controller 144 of FIG. 2A. The method 830 is directed to recalibration forecasting that may be triggered by an event, such as an event detected in step 610 of FIG. 6. It is understood that the recalibration described in this embodiment may not be the same as calculating a convergence plan, although calculating a convergence plan may be part of the recalibration. As an example of a recalibration triggering event, a shift in ROP and/or GAMMA readings may indicate that a formation layer (e.g., the layer 170A of FIG. 1B) is actually twenty feet higher than planned. This will likely impact the well plan, as build rate predictions and other drilling parameters may need to be changed. Accordingly, in step 832, this event is identified.

In step 834, a forecast may be made as to the impact of the event. For example, the surface steerable system 201 may determine whether the projected build rate needed to land the curve can be met based on the twenty foot difference. This determination may include examining the current location of the bit, the projected path, and similar information.

In step 836, modifications may be made based on the forecast. For example, if the projected build rate can be met, then modifications may be made to the drilling parameters to address the formation depth difference, but the modifications may be relatively minor. However, if the projected build rate cannot be met, the surface steerable system 201 may determine how to address the situation by, for example, planning a bit trip to replace the current BHA with a BHA capable of making a new and more aggressive curve.

Such decisions may be automated or may require input or approval by the drilling engineer 302, geologist 304, or other individuals. For example, depending on the distance to the kick off point, the surface steerable system 201 may first stop drilling and then send an alert to an authorized individual, such as the drilling engineer 302 and/or geologist 304. The drilling engineer 302 and geologist 304 may then become involved in planning a solution or may approve of a solution proposed by the surface steerable system 201. In some embodiments, the surface steerable system 201 may automatically implement its calculated solution. Parameters may be set for such automatic implementation measures to ensure that drastic deviations from the original well plan do not occur automatically while allowing the automatic implementation of more minor measures.

It is understood that such recalibration forecasts may be performed based on many different factors and may be triggered by many different events. The forecasting portion of the process is directed to anticipating what changes may be needed due to the recalibration and calculating how such changes may be implemented. Such forecasting provides cost advantages because more options may be available when a problem is detected earlier rather than later. Using the previous example, the earlier the difference in the depth of the layer is identified, the more likely it is that the build rate can be met without changing the BHA.

Referring to FIG. 8D, a method 840 illustrates one embodiment of an event-based process that may be executed by the on-site controller 144 of FIG. 2A. The method 840 is directed to self-tuning that may be performed by the on-site controller 144 based on factors such as ROP, total cost, and reliability. By self-tuning, the on-site controller 144 may execute a learning process that enables it to optimize the drilling performance of the drilling rig 110. Furthermore, the self-tuning process enables a balance to be reached that provides reliability while also lowering costs. Reliability in drilling operations is often tied to vibration and the problems that vibration can cause, such as stick-slip and whirling. Such vibration issues can damage or destroy equipment and can also result in a very uneven surface in the borehole that can cause other problems such as friction loading of future drilling operations as pipe/casing passes through that area of the borehole. Accordingly, it is desirable to minimize vibration while optimizing performance, since over-correcting for vibration may result in slower drilling than necessary. It is understood that the present optimization may involve a change in any drilling parameter and is not limited to a particular piece of equipment or control system. In other words, parameters across the entire drilling rig 110 and BHA may be changed during the self-tuning process. Furthermore, the optimization process may be applied to production by optimizing well smoothness and other factors affecting production. For example, by minimizing dogleg severity, production may be increased for the lifetime of the well.

Accordingly, in step 842, one or more target parameters are identified. For example, the target parameter may be an MSE of 50 ksi or an ROP of 100 ft/hr that the on-site controller 144 is to establish and maintain. In step 844, a plurality of control parameters are identified for use with the drilling operation. The control parameters are selected to meet the target MSE of 50 ksi or ROP of 100 ft/hr. The drilling operation is started with the control parameters, which may be used until the target MSE or ROP is reached. In step 846, feedback information is received from the drilling operation when the control parameters are being used, so the feedback represents the performance of the drilling operation as controlled by the control parameters. Historical information may also be used in step 846. In step 848, an operational baseline is established based on the feedback information.

In step 850, at least one of the control parameters is changed to modify the drilling operation, although the target MSE or ROP should be maintained. For example, some or all of the control parameters may be associated with a range of values and the value of one or more of the control parameters may be changed. In step 852, more feedback information is received, but this time the feedback reflects the performance of the drilling operation with the changed control parameter. In step 854, a performance impact of the change is determined with respect to the operational baseline. The performance impact may occur in various ways, such as a change in MSE or ROP and/or a change in vibration. In step 856, a determination is made as to whether the control parameters are optimized. If the control parameters are not optimized, the method 840 returns to step 850. If the control parameters are optimized, the method 840 moves to step 858. In step 858, the optimized control parameters are used for the current drilling operation with the target MSE or ROP and stored (e.g., in the database 128) for use in later drilling operations and operational analyses. This may include linking formation information to the control parameters in the regional database 128.

Figure 9:
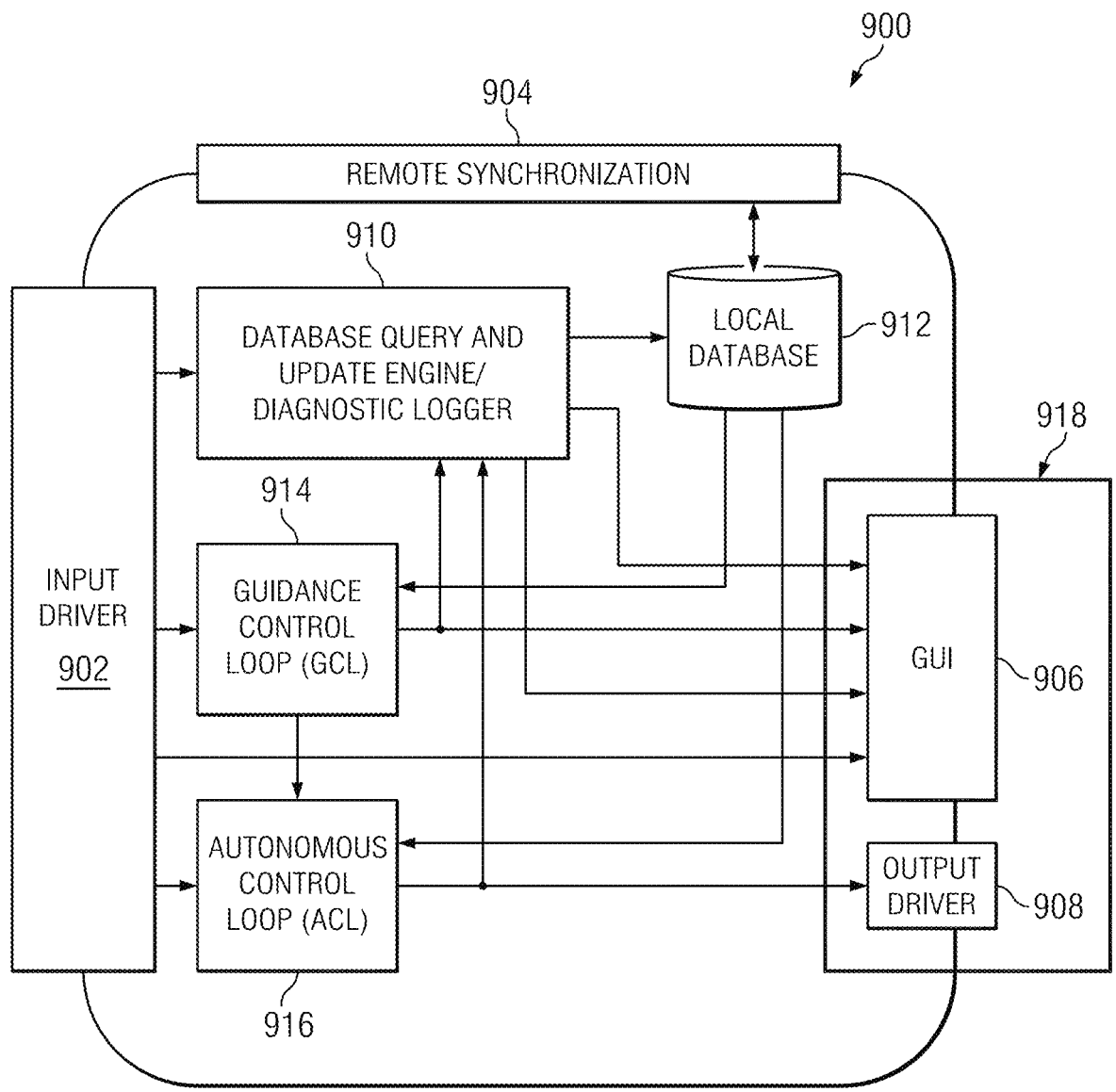
FIG. 9 illustrates one embodiment of a system architecture that may be used for the surface steerable system of FIG. 2A.

Referring to FIG. 9, one embodiment of a system architecture 900 is illustrated that may be used for the on-site controller 144 of FIG. 1A. The system architecture 900 includes interfaces configured to interact with external components and internal modules configured to process information. The interfaces may include an input driver 902, a remote synchronization interface 904, and an output interface 918, which may include at least one of a graphical user interface (GUI) 906 and an output driver 908. The internal modules may include a database query and update engine/diagnostic logger 910, a local database 912 (which may be similar or identical to the database 410 of FIG. 4), a guidance control loop (GCL) module 914, and an autonomous control loop (ACL) module 916. It is understood that the system architecture 900 is merely one example of a system architecture that may be used for the on-site controller 144 and the functionality may be provided for the on-site controller 144 using many different architectures. Accordingly, the functionality described herein with respect to particular modules and architecture components may be combined, further separated, and organized in many different ways.

It is understood that the computer steerable system 144 may perform certain computations to prevent errors or inaccuracies from accumulating and throwing off calculations. For example, as will be described later, the input driver 902 may receive Wellsite Information Transfer Specification (WITS) input representing absolute pressure, while the surface steerable system 144 needs differential pressure and needs an accurate zero point for the differential pressure. Generally, the driller will zero out the differential pressure when the drillstring is positioned with the bit off bottom and full pump flow is occurring. However, this may be a relatively sporadic event. Accordingly, the surface steerable system 144 may recognize when the bit is off bottom and target flow rate has been achieved and zero out the differential pressure.

Another computation may involve block height, which needs to be calibrated properly. For example, block height may oscillate over a wide range, including distances that may not even be possible for a particular drilling rig. Accordingly, if the reported range is sixty feet to one hundred and fifty feet and there should only be one hundred feet, the surface steerable system 144 may assign a zero value to the reported sixty feet and a one hundred foot value to the reported one hundred and fifty feet. Furthermore, during drilling, error gradually accumulates as the cable is shifted and other events occur. The surface steerable system 144 may compute its own block height to predict when the next connection occurs and other related events, and may also take into account any error that may be introduced by cable issues.

Referring specifically to FIG. 9, the input driver 902 provides output to the GUI 906, the database query and update engine/diagnostic logger 910, the GCL 914, and the ACL 916. The input driver 902 is configured to receive input for the on-site controller 144. It is understood that the input driver 902 may include the functionality needed to receive various file types, formats, and data streams. The input driver 902 may also be configured to convert formats if needed. Accordingly, the input driver 902 may be configured to provide flexibility to the on-site controller 144 by handling incoming data without the need to change the internal modules. In some embodiments, for purposes of abstraction, the protocol of the data stream can be arbitrary with an input event defined as a single change (e.g., a real time sensor change) of any of the given inputs.

The input driver 902 may receive various types of input, including rig sensor input (e.g., from the sensor system 214 of FIG. 2A), well plan data, and control data (e.g., engineering control parameters). For example, rig sensor input may include hole depth, bit depth, toolface, inclination, azimuth, true vertical depth, gamma count, standpipe pressure, mud flow rate, rotary RPMs, bit speed, ROP, and WOB. The well plan data may include information such as projected starting and ending locations of various geologic layers at vertical depth points along the well plan path, and a planned path of the borehole presented in a three dimensional space. The control data may be used to define maximum operating parameters and other limitations to control drilling speed, limit the amount of deviation permitted from the planned path, define levels of authority (e.g., can an on-site operator make a particular decision or should it be made by an off-site engineer), and similar limitations. The input driver 902 may also handle manual input, such as input entered via a keyboard, a mouse, or a touch screen. In some embodiments, the input driver 902 may also handle wireless signal input, such as from a cell phone, a smart phone, a PDA, a tablet, a laptop, or any other device capable of wirelessly communicating with the on-site controller 144 through a network locally and/or offsite.

The database query and update engine/diagnostic logger 910 receives input from the input driver 902, the GCL 914, and ACL 916, and provides output to the local database 912 and GUI 906. The database query and update engine/diagnostic logger 910 is configured to manage the archiving of data to the local database 912. The database query and update engine/diagnostic logger 910 may also manage some functional requirements of a remote synchronization server (RSS) via the remote synchronization interface 904 for archiving data that will be uploaded and synchronized with a remote database, such as the database 128 of FIG. 1A. The database query and update engine/diagnostic logger 910 may also be configured to serve as a diagnostic tool for evaluating algorithm behavior and performance against raw rig data and sensor feedback data.

The local database 912 receives input from the database query and update engine/diagnostic logger 910 and the remote synchronization interface 904, and provides output to the GCL 914, the ACL 916, and the remote synchronization interface 904. It is understood that the local database 912 may be configured in many different ways. As described in previous embodiments, the local database 912 may store both current and historic information representing both the current drilling operation with which the on-site controller 144 is engaged as well as regional information from the database 128.

The GCL 914 receives input from the input driver 902 and the local database 912, and provides output to the database query and update engine/diagnostic logger 910, the GUI 906, and the ACL 916. Although not shown, in some embodiments, the GCL 906 may provide output to the output driver 908, which enables the GCL 914 to directly control third party systems and/or interface with the drilling rig alone or with the ACL 916. An embodiment of the GCL 914 is discussed below with respect to FIG. 11.

The ACL 916 receives input from the input driver 902, the local database 912, and the GCL 914, and provides output to the database query and update engine/diagnostic logger 910 and output driver 908. An embodiment of the ACL 916 is discussed below with respect to FIG. 12.

The output interface 918 receives input from the input driver 902, the GCL 914, and the ACL 916. In the present example, the GUI 906 receives input from the input driver 902 and the GCL 914. The GUI 906 may display output on a monitor or other visual indicator. The output driver 908 receives input from the ACL 916 and is configured to provide an interface between the on-site controller 144 and external control systems, such as the control systems 208, 210, and 212 of FIG. 2A.

It is understood that the system architecture 900 of FIG. 9 may be configured in many different ways. For example, various interfaces and modules may be combined or further separated. Accordingly, the system architecture 900 provides one example of how functionality may be structured to provide the on-site controller 144, but the on-site controller 144 is not limited to the illustrated structure of FIG. 9.

Figure 10:
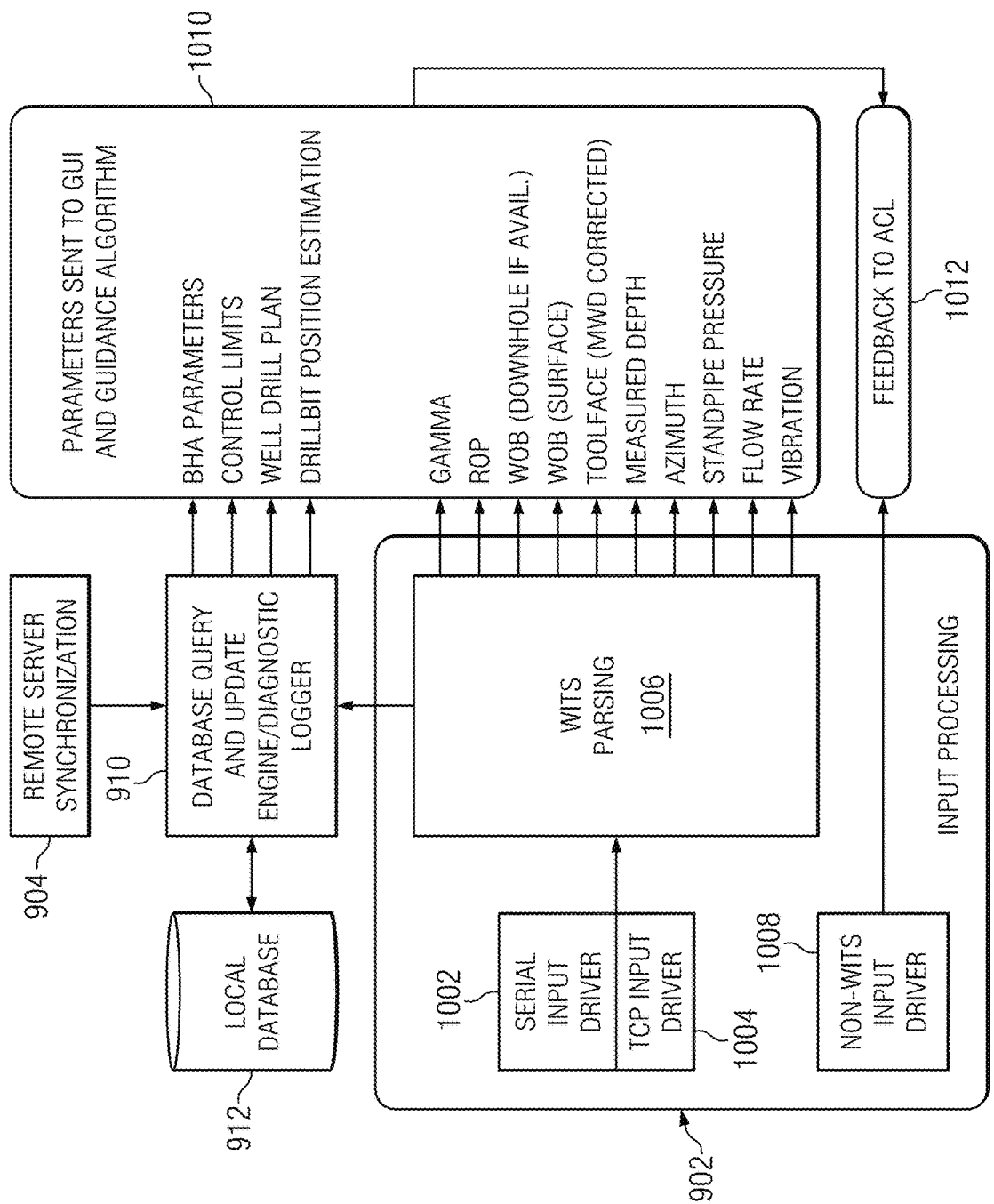
FIG. 10 illustrates one embodiment of a more detailed portion of the system architecture of FIG. 9.

Referring to FIG. 10, one embodiment of the input driver 902 of the system architecture 900 of FIG. 9 is illustrated in greater detail. In the present example, the input driver 902 may be configured to receive input via different input interfaces, such as a serial input driver 1002 and a Transmission Control Protocol (TCP) driver 1004. Both the serial input driver 1002 and the TCP input driver 1004 may feed into a parser 1006.

The parser 1006 in the present example may be configured in accordance with a specification such as WITS and/or using a standard such as Wellsite Information Transfer Standard Markup Language (WITSML). WITS is a specification for the transfer of drilling rig-related data and uses a binary file format. WITS may be replaced or supplemented in some embodiments by WITSML, which relies on eXtensible Markup Language (XML) for transferring such information. The parser 1006 may feed into the database query and update engine/diagnostic logger 910, and also to the GCL 914 and GUI 906 as illustrated by the example parameters of block 1010. The input driver 902 may also include a non-WITS input driver 1008 that provides input to the ACL 916 as illustrated by block 1012.

Figure 11:
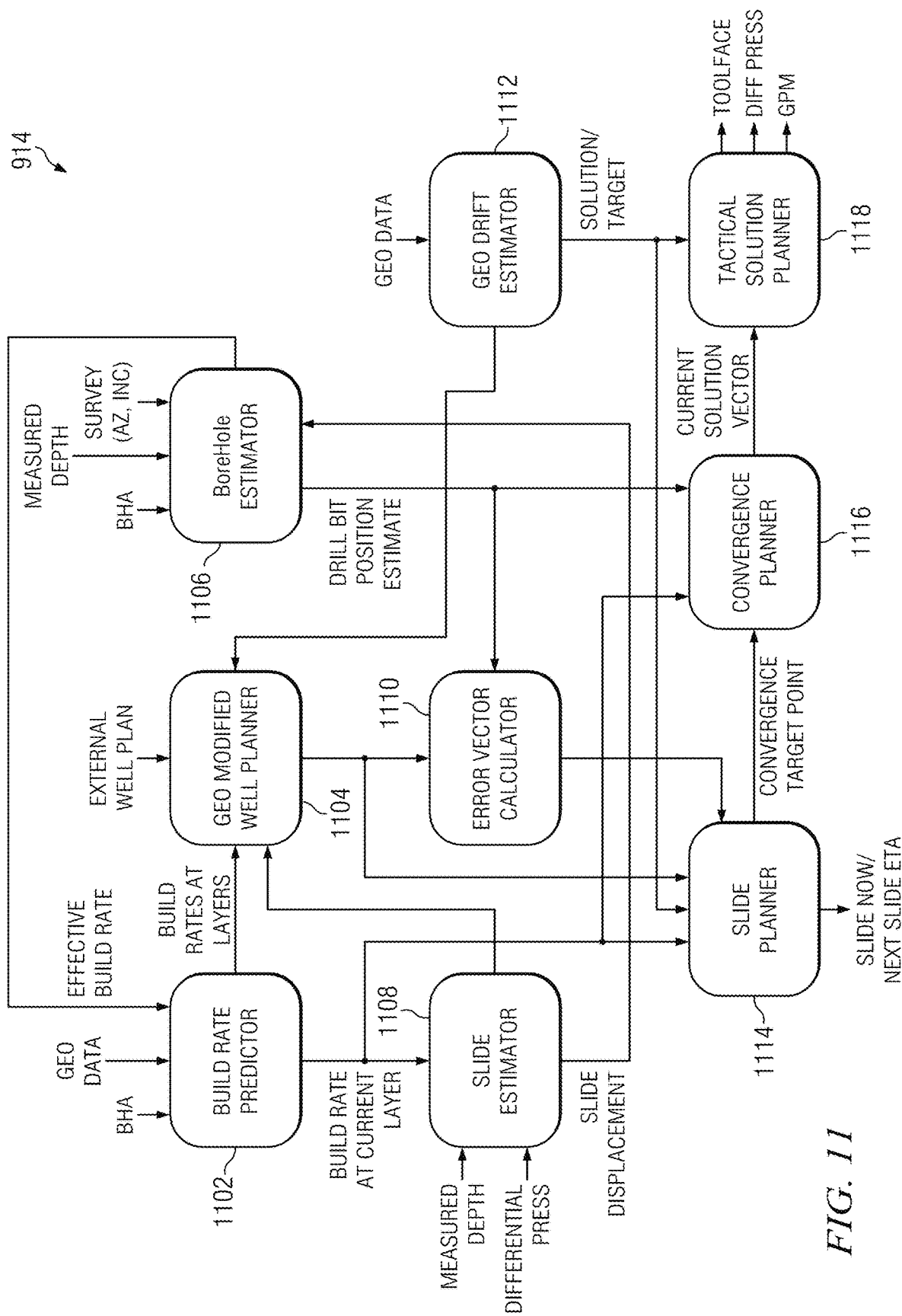
FIG. 11 illustrates one embodiment of a guidance control loop that may be used within the system architecture of FIG. 9.

Referring to FIG. 11, one embodiment of the GCL 914 of FIG. 9 is illustrated in greater detail. In the present example, the GCL 914 may include various functional modules, including a build rate predictor 1102, a geo modified well planner 1104, a borehole estimator 1106, a slide estimator 1108, an error vector calculator 1110, a geological drift estimator 1112, a slide planner 1114, a convergence planner 1116, and a tactical solution planner 1118. In the following description of the GCL 914, the term external input refers to input received from outside the GCL 914 (e.g., from the input driver 902 of FIG. 9), while internal input refers to input received by a GCL module from another GCL module.

The build rate predictor 1102 receives external input representing BHA and geological information, receives internal input from the borehole estimator 1106, and provides output to the geo modified well planner 1104, slide estimator 1108, slide planner 1114, and convergence planner 1116. The build rate predictor 1102 is configured to use the BHA and geological information to predict the drilling build rates of current and future sections of a well. For example, the build rate predictor 1102 may determine how aggressively the curve will be built for a given formation with given BHA and other equipment parameters.

The build rate predictor 1102 may use the orientation of the BHA to the formation to determine an angle of attack for formation transitions and build rates within a single layer of a formation. For example, if there is a layer of rock with a layer of sand above it, there is a formation transition from the sand layer to the rock layer. Approaching the rock layer at a ninety degree angle may provide a good face and a clean drill entry, while approaching the rock layer at a forty-five degree angle may build a curve relatively quickly. An angle of approach that is near parallel may cause the bit to skip off the upper surface of the rock layer. Accordingly, the build rate predictor 1102 may calculate BHA orientation to account for formation transitions. Within a single layer, the build rate predictor 1102 may use BHA orientation to account for internal layer characteristics (e.g., grain) to determine build rates for different parts of a layer.

The BHA information may include bit characteristics, mud motor bend setting, stabilization and mud motor bit to bend distance. The geological information may include formation data such as compressive strength, thicknesses, and depths for formations encountered in the specific drilling location. Such information enables a calculation-based prediction of the build rates and ROP that may be compared to both real time results (e.g., obtained while drilling the well) and regional historical results (e.g., from the database 128) to improve the accuracy of predictions as the drilling progresses. Future formation build rate predictions may be used to plan convergence adjustments and confirm that targets can be achieved with current variables in advance.

The geo modified well planner 1104 receives external input representing a well plan, internal input from the build rate predictor 1102 and the geo drift estimator 1112, and provides output to the slide planner 1114 and the error vector calculator 1110. The geo modified well planner 1104 uses the input to determine whether there is a more optimal path than that provided by the external well plan while staying within the original well plan error limits. More specifically, the geo modified well planner 1104 takes geological information (e.g., drift) and calculates whether another solution to the target may be more efficient in terms of cost and/or reliability. The outputs of the geo modified well planner 1104 to the slide planner 1114 and the error vector calculator 1110 may be used to calculate an error vector based on the current vector to the newly calculated path and to modify slide predictions.

In some embodiments, the geo modified well planner 1104 (or another module) may provide functionality needed to track a formation trend. For example, in horizontal wells, the geologist 304 may provide the surface steerable system 144 with a target inclination that the surface steerable system 144 is to attempt to hold. For example, the geologist 304 may provide a target to the directional driller 306 of 90.5-91 degrees of inclination for a section of the well. The geologist 304 may enter this information into the surface steerable system 144 and the directional driller 306 may retrieve the information from the surface steerable system 144. The geo modified well planner 1104 may then treat the target as a vector target, for example, either by processing the information provided by the geologist 304 to create the vector target or by using a vector target entered by the geologist 304. The geo modified well planner 1104 may accomplish this while remaining within the error limits of the original well plan.

In some embodiments, the geo modified well planner 1104 may be an optional module that is not used unless the well plan is to be modified. For example, if the well plan is marked in the surface steerable system 201 as non-modifiable, the geo modified well planner 1104 may be bypassed altogether or the geo modified well planner 1104 may be configured to pass the well plan through without any changes.

The borehole estimator 1106 receives external inputs representing BHA information, measured depth information, survey information (e.g., azimuth and inclination), and provides outputs to the build rate predictor 1102, the error vector calculator 1110, and the convergence planner 1116. The borehole estimator 1106 is configured to provide a real time or near real time estimate of the actual borehole and drill bit position and trajectory angle. This estimate may use both straight line projections and projections that incorporate sliding. The borehole estimator 1106 may be used to compensate for the fact that a sensor is usually physically located some distance behind the bit (e.g., fifty feet), which makes sensor readings lag the actual bit location by fifty feet. The borehole estimator 1106 may also be used to compensate for the fact that sensor measurements may not be continuous (e.g., a sensor measurement may occur every one hundred feet).

The borehole estimator 1106 may use two techniques to accomplish this. First, the borehole estimator 1106 may provide the most accurate estimate from the surface to the last survey location based on the collection of all survey measurements. Second, the borehole estimator 1106 may take the slide estimate from the slide estimator 1108 (described below) and extend this estimation from the last survey point to the real time drill bit location. Using the combination of these two estimates, the borehole estimator 1106 may provide the on-site controller 144 with an estimate of the drill bit's location and trajectory angle from which guidance and steering solutions can be derived. An additional metric that can be derived from the borehole estimate is the effective build rate that is achieved throughout the drilling process. For example, the borehole estimator 1106 may calculate the current bit position and trajectory 743 in FIG. 7C.

The slide estimator 1108 receives external inputs representing measured depth and differential pressure information, receives internal input from the build rate predictor 1102, and provides output to the borehole estimator 1106 and the geo modified well planner 1104. The slide estimator 1108, which may operate in real time or near real time, is configured to sample toolface orientation, differential pressure, measured depth (MD) incremental movement, MSE, and other sensor feedback to quantify/estimate a deviation vector and progress while sliding.

Traditionally, deviation from the slide would be predicted by a human operator based on experience. The operator would, for example, use a long slide cycle to assess what likely was accomplished during the last slide. However, the results are generally not confirmed until the MWD survey sensor point passes the slide portion of the borehole, often resulting in a response lag defined by the distance of the sensor point from the drill bit tip (e.g., approximately fifty feet). This lag introduces inefficiencies in the slide cycles due to over/under correction of the actual path relative to the planned path.

With the slide estimator 1108, each toolface update is algorithmically merged with the average differential pressure of the period between the previous and current toolfaces, as well as the MD change during this period to predict the direction, angular deviation, and MD progress during that period. As an example, the periodic rate may be between ten and sixty seconds per cycle depending on the tool face update rate of the MWD tool. With a more accurate estimation of the slide effectiveness, the sliding efficiency can be improved. The output of the slide estimator 1108 is periodically provided to the borehole estimator 1106 for accumulation of well deviation information, as well to the geo modified well planner 1104. Some or all of the output of the slide estimator 1108 may be output via a display such as the display 250 of FIG. 2B.

The error vector calculator 1110 receives internal input from the geo modified well planner 1104 and the borehole estimator 1106. The error vector calculator 1110 is configured to compare the planned well path to the actual borehole path and drill bit position estimate. The error vector calculator 1110 may provide the metrics used to determine the error (e.g., how far off) the current drill bit position and trajectory are from the plan. For example, the error vector calculator 1110 may calculate the error between the current position 743 of FIG. 7C to the planned path 742 and the desired bit position 741. The error vector calculator 1110 may also calculate a projected bit position/projected path representing the future result of a current error as described previously with respect to FIG. 7B.

The geological drift estimator 1112 receives external input representing geological information and provides outputs to the geo modified well planner 1104, slide planner 1114, and tactical solution planner 1118. During drilling, drift may occur as the particular characteristics of the formation affect the drilling direction. More specifically, there may be a trajectory bias that is contributed by the formation as a function of drilling rate and BHA. The geological drift estimator 1112 is configured to provide a drift estimate as a vector. This vector can then be used to calculate drift compensation parameters that can be used to offset the drift in a control solution.

The drift vector information may also be used in determinations involving creation of a convergence path wherein the drift vector effect on drilling direction may be utilized in determining a drilling direction in order that a direction of drilling may be utilized in order to take into account the drift vector provided by the present formation characteristic and drill bit characteristics as will be more fully described hereinbelow.

The slide planner 1114 receives internal input from the build rate predictor 1102, the geo modified well planner 1104, the error vector calculator 1110, and the geological drift estimator 1112, and provides output to the convergence planner 1116 as well as an estimated time to the next slide. The slide planner 1114 is configured to evaluate a slide/drill ahead cost equation and plan for sliding activity, which may include factoring in BHA wear, expected build rates of current and expected formations, and the well plan path. During drill ahead, the slide planner 1114 may attempt to forecast an estimated time of the next slide to aid with planning. For example, if additional lubricants (e.g., beads) are needed for the next slide and pumping the lubricants into the drill string needs to begin thirty minutes before the slide, the estimated time of the next slide may be calculated and then used to schedule when to start pumping the lubricants.

Functionality for a loss circulation material (LCM) planner may be provided as part of the slide planner 1114 or elsewhere (e.g., as a stand-alone module or as part of another module described herein). The LCM planner functionality may be configured to determine whether additives need to be pumped into the borehole based on indications such as flow-in versus flow-back measurements. For example, if drilling through a porous rock formation, fluid being pumped into the borehole may get lost in the rock formation. To address this issue, the LCM planner may control pumping LCM into the borehole to clog up the holes in the porous rock surrounding the borehole to establish a more closed-loop control system for the fluid.

The slide planner 1114 may also look at the current position relative to the next connection. A connection may happen every ninety to one hundred feet (or some other distance or distance range based on the particulars of the drilling operation) and the slide planner 1114 may avoid planning a slide when close to a connection and/or when the slide would carry through the connection. For example, if the slide planner 1114 is planning a fifty foot slide but only twenty feet remain until the next connection, the slide planner 1114 may calculate the slide starting after the next connection and make any changes to the slide parameters that may be needed to accommodate waiting to slide until after the next connection. This avoids inefficiencies that may be caused by starting the slide, stopping for the connection, and then having to reorient the toolface before finishing the slide. During slides, the slide planner 1114 may provide some feedback as to the progress of achieving the desired goal of the current slide.

In some embodiments, the slide planner 1114 may account for reactive torque in the drillstring. More specifically, when rotating is occurring, there is a reactional torque wind up in the drillstring. When the rotating is stopped, the drillstring unwinds, which changes toolface orientation and other parameters. When rotating is started again, the drillstring starts to wind back up. The slide planner 1114 may account for this reactional torque so that toolface references are maintained rather than stopping rotation and then trying to adjust to an optimal tool face orientation. While not all MWD tools may provide toolface orientation when rotating, using one that does supply such information for the GCL 914 may significantly reduce the transition time from rotating to sliding.

In additional embodiments, the slide planner 1114 may also use drift information provided from the geo drift estimator 1112 in order to perform tool face targeting calculations in order to plan a drilling segment from a present bit location to a target bit location at a location that attempts to bring the bit more in line with a predetermined drilling target path.

Figure 26:
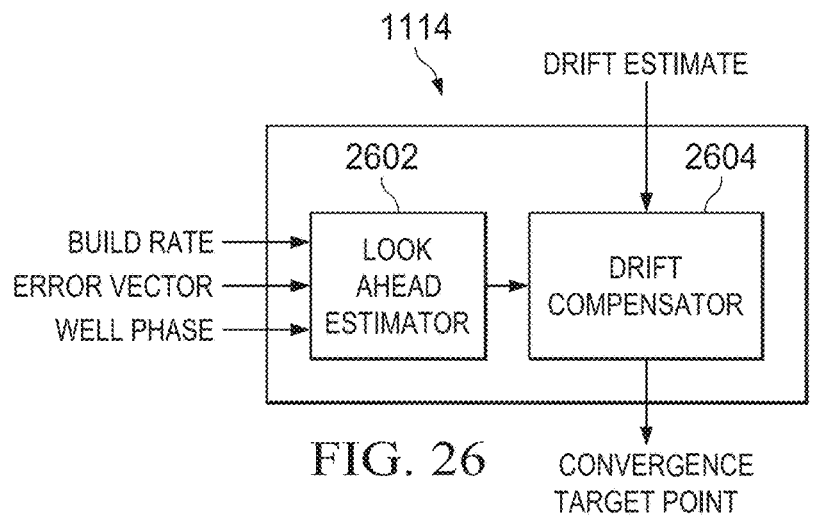
FIG. 26 illustrates a more particular embodiment of the slide planner for determining a drilling path responsive to drift information.

Referring now also to FIG. 26, there is more particularly illustrated the slide planner 1114 and the components associated with determining a convergence path that takes into account drift information provided by the drift estimator 1112. Initially, a look ahead estimator 2602 utilizes information provided by the system on the system build rate, an error vector associated with error vector calculations from the error vector calculator 110 indicating the degree of error from a target well path and a present well plan provided by the well planner 1104. The well plan provides information with respect to the desired target path where the bottom hole assembly should presently be located. The error vector provides information with respect to the error from the indicated well path, and the build rate demonstrates the predicted build rate that has been determined thus far within the drilling. Each of these pieces of information are provided to the look ahead estimator 2602 that determines a look ahead point that is a fixed distance ahead of the bottom hole assembly for getting the bottom hole assembly back on target with respect to the well plan. The look ahead estimator 2602 calculates a direction of drilling toward the look ahead point by establishing a tool face vector for the bottom hole assembly. The tool face vector comprises a vector toward the look ahead point transposed onto a plane that is perpendicular to the bottom hole assembly. The toolface vector shows the orientation of the toolface while sliding to help achieve convergence with the target well path as the bottom hole assembly drills toward moving look ahead point that is a fixed distance ahead of the bottom hole assembly. The calculated tool face vector is provided to a drift compensator 2604 which additionally receives the drift estimate information form the drift estimator 1112. The drift compensator 2604 determines a new adjusted toolface vector that adjusts the toolface vector based upon the drift associated with the present geological formation that the bottom hole assembly is passing through in an attempt to bring the bottom hole assembly back into convergence with the target well path as the bottom hole assembly travel toward its moving look ahead point that is a fixed distance ahead of the bottom hole assembly. The adjustment to the tool face vector direction takes into account the geological formation drift that has been calculated from recent drilling operations.

Figure 27A:
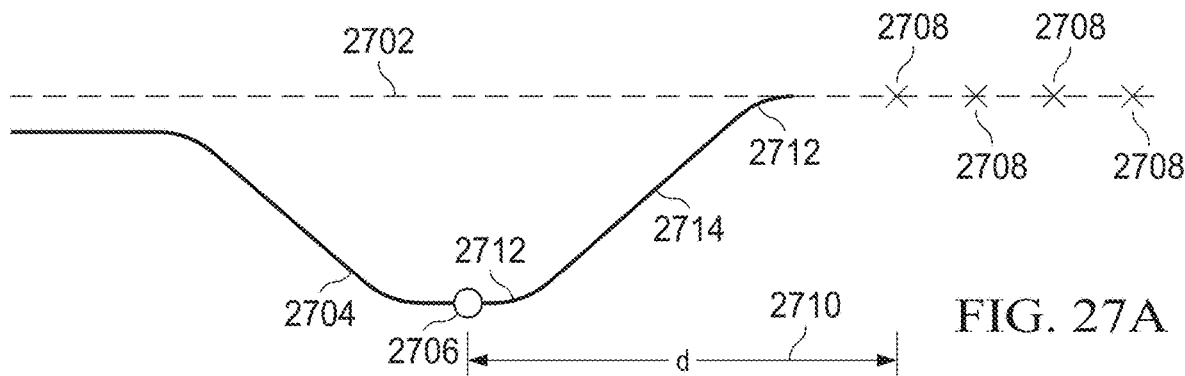
FIG. 27A illustrates a drilling path target selection using a sequence of slides and rotations.

Referring now also to FIG. 27A there is more particularly illustrated the drilling path associated with this process. Dashed line 2702 illustrates the target drill path that the bottom hole assembly is attempting to drill along according to a created well plan. Line 2704 up to point 2706 illustrates the actual drill path that has been achieved up to a selected point in time. As can be seen, the point 2706 is not located upon the desired target path 2702. Using the look ahead estimator 2602, a toolface vector is determined from the current position 2706 to cause the bottom hole assembly to converge toward the target drill path 2702 as the bottom hole assembly moves from the present toolface location 2706 toward the moving look ahead point 2708 that remains a fixed distance 2710 out from the front of the bottom hole assembly. The drilling path back toward convergence with the target path 2702 consists of a series of slides 2712 represented by curved portions of the drill path and rotations 2714 represented by the straight portions of the drill path that take the bit back toward convergence with the target path 2702. However, the slides 2712 of the drill path 2710 does not take into account the geological drift associated with the geological formation that the bottom hole assembly is drilling through. In actual operation, the drift associated with the drilling operation will affect the drill path location such that attempting to drill along a toolface vector that attempts to create path 2710 will cause the bottom hole assembly to actually follow a path above or below the desired drilling path that either overshoots or undershoots that target drill path 2702.

Figure 27B:
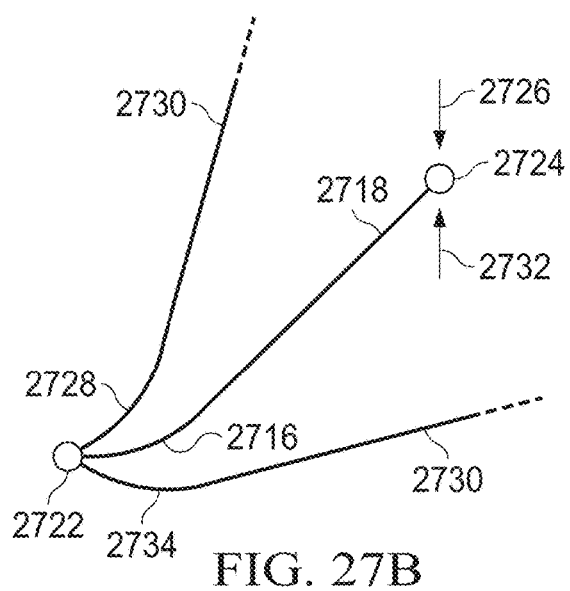
FIG. 27B illustrates the generation of compensated drill paths based on formation drift.

In order to compensate for this, the drift compensator 2604 will alter the toolface vector to take into account the geological drift occurring when drilling over the rotation portions of the drilling path. Referring now to FIG. 27B, slide 2716 and rotation 2718 represent an ideal slide/rotation drilling sequence that is not affected by geological drift. In this case the bit would move from an initial point 2722 to an ending point 2724 as expected. In the case of drift that drift is forcing the bit to move downward as illustrated generally at 2726, the slide 2728 will appear to point the bit above the desired endpoint 2724 after the rotation portion 2730. However the downward drift 2726 will force the bit in a downward direction such that the bit will end up at point 2724. This type of toolface vector would be utilized when the geological drift tendency would be to drive the bottom hole assembly below the planned drill path 2702.

In a similar manner, when the drift is forcing the bit to move upward as illustrated generally at 2732, the slide 2734 will appear to point the bit above the desired endpoint 2724 after the rotation portion 2730. However the upward drift 2726 will force the bit in an upward direction such that the bit will end up at point 2724 after the slide 2734 and rotation 2730. This type of toolface vector would be utilized when the geological drift tendency would be to drive the bottom hole assembly above the planned drill path 2702. Thus, the drift adjusted toolface vectors for providing slides 2728 or 2734 compensate for the natural drift tendency of the geological formation during the rotation portions of drilling to arrive at a desired target location.

While the present description with respect to FIG. 27 has been made with respect to establishing a toolface vector to create a path above or below a target path 2702 in the Y axis, the drift associated with a drilling bit may occur in three dimensions. Thus, the drift adjusted toolface vector may be established anywhere in three dimensions in order to ultimately achieve a convergence with the desired target path 2702 while taking into account any number of drift forces acting on the bit.

For example, assume the drilling operator is looking a distance of 100 feet ahead of the present drill point location on the well plan. If the recent historical drift information is causing the drill bit to drift up 2 degrees per 100 feet, the toolface vector would use an average angle over the 100 foot window to determine a net 1.8 foot upward migration to achieve intersection with the target path at the desired location. To compensate a toolface vector down from the well plan by 1.8 feet at a distance of 100 feet ahead of the current position would be utilized for the look ahead reference target point.

Figure 27C:
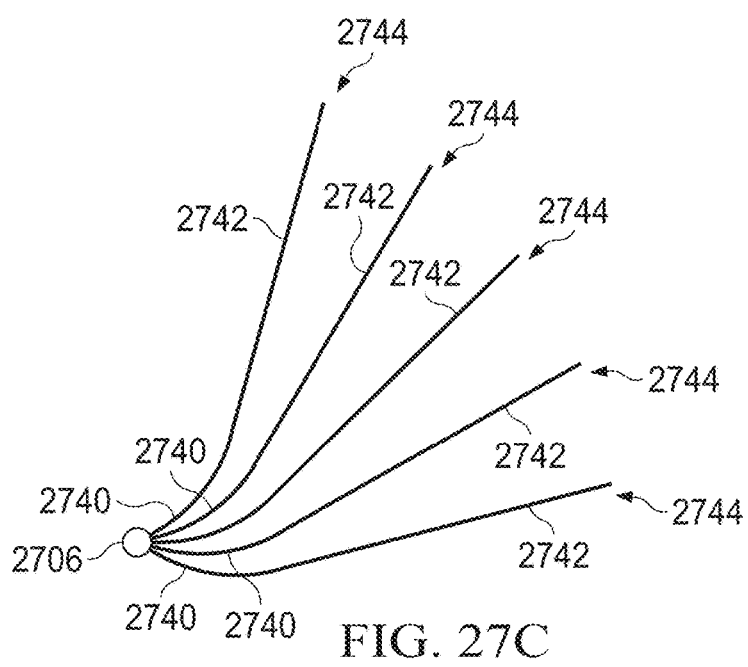
FIG. 27C illustrates the generation of multiple potential compensated drill paths.

Referring now to FIG. 27C, rather than calculating a single toolface vector or group of toolface vectors to determine a convergence path from the present bit location 2706 to a target drill path, the drift compensator 2604 may determine a number of potential toolface vectors associated with different slides 2740 and rotations 2742 to provide a plurality of drill paths 2744 to enable a system to further base target convergence decisions on cost of drilling paths that utilized multiple drilling paths. Thus, multiple toolface vectors may be determined for each slide point creating multiple paths accounting for drift, and a most cost effective path selected. In some cases, the most direct drilling path may not be the most cost effective one and variations from the most direct toolface vector may be utilized in order to carry out various cost concerns.

In addition to determining a sweep of toolface vectors for determining a most cost effective drilling path, a sweep of toolface vectors may be selected for addressing total vertical depth (TVD) errors and to determining more aggressive convergence paths for the BHA to the target drill path. In this manner various ways for correcting TVD errors or more quickly seeking a convergence path may be presented and selected based upon differing drilling needs.

Figure 28:
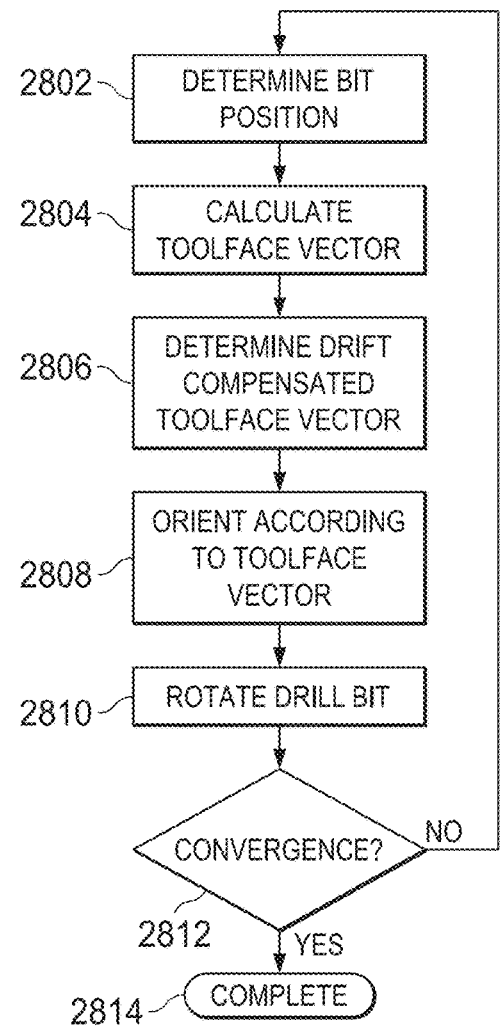
FIG. 28 is a flow diagram illustrating the process of compensating a drilling path based on drift information.

Referring now to FIG. 28, there is more particularly illustrated a flow chart describing the process of FIGS. 26 and 27. Initially, at step 2802, a present position of the drilling tool is determined during a slide. A toolface vector necessary to converge with a desired target path at a look ahead point a fixed distance ahead of the bit is calculated at step 2804 utilizing information such as the build rate, present error vector and well plan information within the look ahead estimator 2602. The desired toolface vector is further combined with geologic formation drift estimate information within the drift estimator 2604 to move the look ahead point and determine the compensated toolface vector at step 2806. The bottom hole assembly is oriented during sliding in accordance with the compensated toolface vector and then through a rotation at steps 2808 and 2810 providing a path that achieves the desired convergence. Inquiry step 2812 determines if the desired convergence with the target path has been achieved. If not control passes back to step 2802. If a desired convergence has been achieved, the processed is determined to complete at step 2814.

Thus, the above-described feature operates in a similar fashion to that of a sharp shooter when adjusting their scope to account for their movement in a bullet over a long target distance. The sharp shooter must account for bullet drop occurring due to gravity and side to side compensation due to a cross-wind. The toolface vector is adjusted in a similar manner to have the bottom hole assembly converge with the target drill path utilizing the recent drift information associated with the bottom hole assembly While a foregoing discussion has been done with respect to the drift forces applied to a bottom hole assembly as it is drilling through a drilling formation, the same concepts may be applied to any forces acting upon the bottom hole assembly to cause the bottomhole assembly to move indirectly from a first point toward a second point when the drilling rig is driving the bit from a first point toward a second point.

The convergence planner 1116 receives internal inputs from the build rate predictor 1102, the borehole estimator 1106, and the slide planner 1114, and provides output to the tactical solution planner 1118. The convergence planner 1116 is configured to provide a convergence plan when the current drill bit position is not within a defined margin of error of the planned well path. The convergence plan represents a path from the current drill bit position to an achievable and optimal convergence target point along the planned path. The convergence plan may take account the amount of sliding/drilling ahead that has been planned to take place by the slide planner 1114. The convergence planner 1116 may also use BHA orientation information for angle of attack calculations when determining convergence plans as described above with respect to the build rate predictor 1102. The solution provided by the convergence planner 1116 defines a new trajectory solution for the current position of the drill bit. The solution may be real time, near real time, or future (e.g., planned for implementation at a future time). For example, the convergence planner 1116 may calculate a convergence plan as described previously with respect to FIGS. 7C and 8.

The tactical solution planner 1118 receives internal inputs from the geological drift estimator 1112 and the convergence planner 1116, and provides external outputs representing information such as toolface orientation, differential pressure, and mud flow rate. The tactical solution planner 1118 is configured to take the trajectory solution provided by the convergence planner 1116 and translate the solution into control parameters that can be used to control the drilling rig 110. For example, the tactical solution planner 1118 may take the solution and convert the solution into settings for the control systems 208, 210, and 212 to accomplish the actual drilling based on the solution. The tactical solution planner 1118 may also perform performance optimization as described previously. The performance optimization may apply to optimizing the overall drilling operation as well as optimizing the drilling itself (e.g., how to drill faster).

Other functionality may be provided by the GCL 914 in additional modules or added to an existing module. For example, there is a relationship between the rotational position of the drill pipe on the surface and the orientation of the downhole toolface. Accordingly, the GCL 914 may receive information corresponding to the rotational position of the drill pipe on the surface. The GCL 914 may use this surface positional information to calculate current and desired toolface orientations. These calculations may then be used to define control parameters for adjusting the top drive or Kelly drive to accomplish adjustments to the downhole toolface in order to steer the well.

For purposes of example, an object-oriented software approach may be utilized to provide a class-based structure that may be used with the GCL 914 and/or other components of the on-site controller 144. In the present embodiment, a drilling model class is defined to capture and define the drilling state throughout the drilling process. The class may include real time information. This class may be based on the following components and sub-models: a drill bit model, a borehole model, a rig surface gear model, a mud pump model, a WOB/differential pressure model, a positional/rotary model, an MSE model, an active well plan, and control limits. The class may produce a control output solution and may be executed via a main processing loop that rotates through the various modules of the GCL 914.

The drill bit model may represent the current position and state of the drill bit. This model includes a three dimensional position, a drill bit trajectory, BHA information, bit speed, and toolface (e.g., orientation information). The three dimensional position may be specified in north-south (NS), east-west (EW), and true vertical depth (TVD). The drill bit trajectory may be specified as an inclination and an azimuth angle. The BHA information may be a set of dimensions defining the active BHA. The borehole model may represent the current path and size of the active borehole. This model includes hole depth information, an array of survey points collected along the borehole path, a gamma log, and borehole diameters. The hole depth information is for the current drilling job. The borehole diameters represent the diameters of the borehole as drilled over the current drill job.

The rig surface gear model may represent pipe length, block height, and other models, such as the mud pump model, WOB/differential pressure model, positional/rotary model, and MSE model. The mud pump model represents mud pump equipment and includes flow rate, standpipe pressure, and differential pressure. The WOB/differential pressure model represents drawworks or other WOB/differential pressure controls and parameters, including WOB. The positional/rotary model represents top drive or other positional/rotary controls and parameters including rotary RPM and spindle position. The active well plan represents the target borehole path and may include an external well plan and a modified well plan. The control limits represent defined parameters that may be set as maximums and/or minimums. For example, control limits may be set for the rotary RPM in the top drive model to limit the maximum RPMs to the defined level. The control output solution represents the control parameters for the drilling rig 110.

The main processing loop can be handled in many different ways. For example, the main processing loop can run as a single thread in a fixed time loop to handle rig sensor event changes and time propagation. If no rig sensor updates occur between fixed time intervals, a time only propagation may occur. In other embodiments, the main processing loop may be multi-threaded.

Each functional module of the GCL 914 may have its behavior encapsulated within its own respective class definition. During its processing window, the individual units may have an exclusive portion in time to execute and update the drilling model. For purposes of example, the processing order for the modules may be in the sequence of geo modified well planner 1104, build rate predictor 1102, slide estimator 1108, borehole estimator 1106, error vector calculator 1110, slide planner 1114, convergence planner 1116, geological drift estimator 1112, and tactical solution planner 1118. It is understood that other sequences may be used.

In the present embodiment, the GCL 914 may rely on a programmable timer module that provides a timing mechanism to provide timer event signals to drive the main processing loop. While the on-site controller 144 may rely purely on timer and date calls driven by the programming environment (e.g., java), this would limit timing to be exclusively driven by system time. In situations where it may be advantageous to manipulate the clock (e.g., for evaluation and/or testing), the programmable timer module may be used to alter the time. For example, the programmable timer module may enable a default time set to the system time and a time scale of 1.0, may enable the system time of the on-site controller 144 to be manually set, may enable the time scale relative to the system time to be modified, and/or may enable periodic event time requests scaled to the time scale to be requested.

Figure 12:
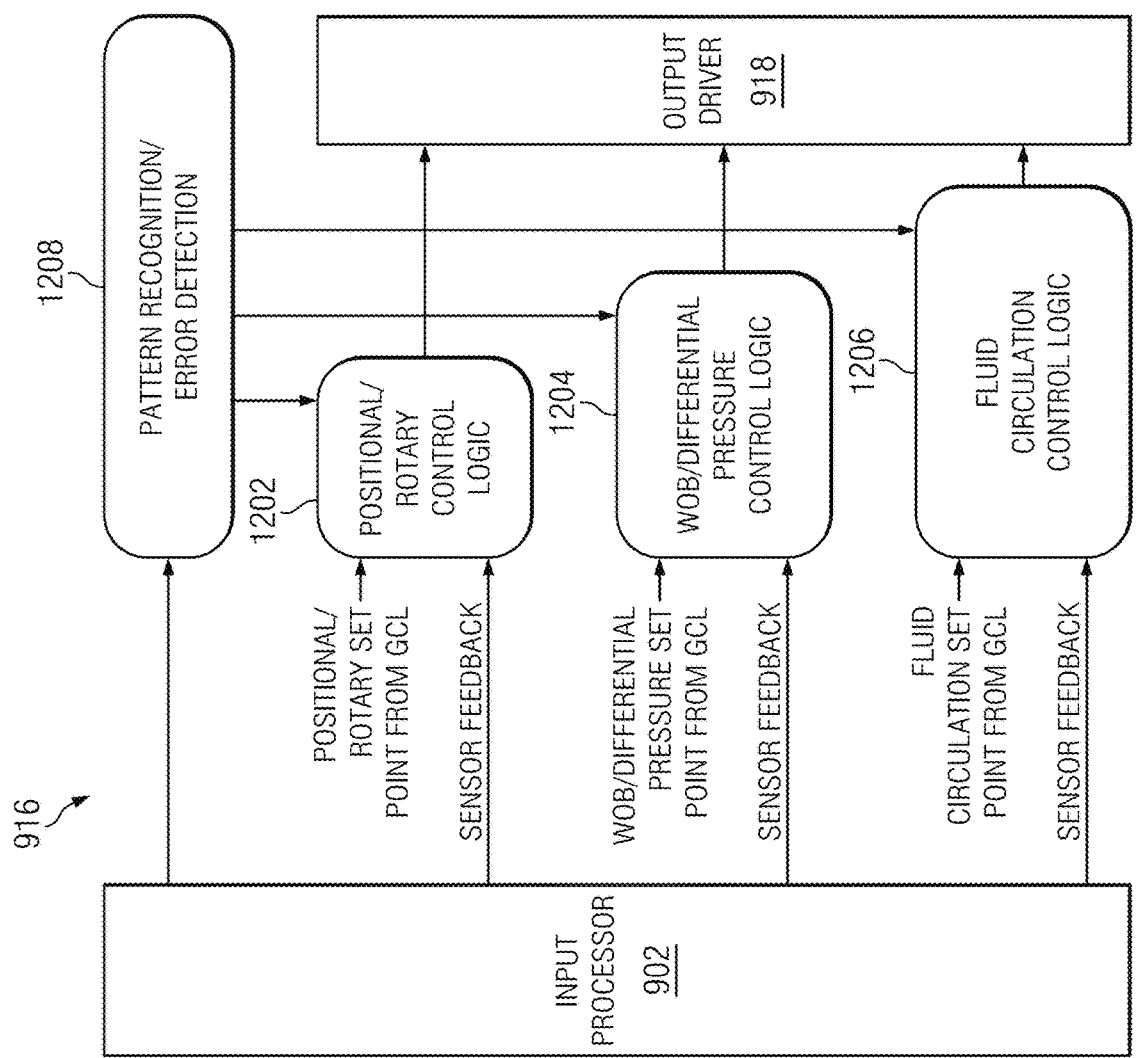
FIG. 12 illustrates one embodiment of an autonomous control loop that may be used within the system architecture of FIG. 9.

Referring to FIG. 12, one embodiment of the ACL 916 provides different functions to the on-site controller 144. The ACL 916 may be considered a second feedback control loop that operates in conjunction with a first feedback control loop provided by the GCL 914. The ACL 916 may also provide actual instructions to the drilling rig 110, either directly to the drilling equipment 216 or via the control systems 208, 210, and 212. The ACL 916 may include a positional/rotary control logic block 1202, WOB/differential pressure control logic block 1204, fluid circulation control logic block 1206, and a pattern recognition/error detection block 1208.

One function of the ACL 916 is to establish and maintain a target parameter (e.g., an ROP of a defined value of ft/hr) based on input from the GCL 914. This may be accomplished via control loops using the positional/rotary control logic block 1202, WOB/differential pressure control logic block 1204, and fluid circulation control logic block 1206. The positional/rotary control logic block 1202 may receive sensor feedback information from the input driver 902 and set point information from the GCL 914 (e.g., from the tactical solution planner 1118). The differential pressure control logic block 1204 may receive sensor feedback information from the input driver 902 and set point information from the GCL 914 (e.g., from the tactical solution planner 1118). The fluid circulation control logic block 1206 may receive sensor feedback information from the input driver 902 and set point information from the GCL 914 (e.g., from the tactical solution planner 1118).

The ACL 916 may use the sensor feedback information and the set points from the GCL 914 to attempt to maintain the established target parameter. More specifically, the ACL 916 may have control over various parameters via the positional/rotary control logic block 1202, WOB/differential pressure control logic block 1204, and fluid circulation control logic block 1206, and may modulate the various parameters to achieve the target parameter. The ACL 916 may also modulate the parameters in light of cost-driven and reliability-driven drilling goals, which may include parameters such as a trajectory goal, a cost goal, and/or a performance goal. It is understood that the parameters may be limited (e.g., by control limits set by the drilling engineer 306) and the ACL 916 may vary the parameters to achieve the target parameter without exceeding the defined limits. If this is not possible, the ACL 916 may notify the on-site controller 144 or otherwise indicate that the target parameter is currently unachievable.

In some embodiments, the ACL 916 may continue to modify the parameters to identify an optimal set of parameters with which to achieve the target parameter for the particular combination of drilling equipment and formation characteristics. In such embodiments, the on-site controller 144 may export the optimal set of parameters to the database 128 for use in formulating drilling plans for other drilling projects.

Another function of the ACL 916 is error detection. Error detection is directed to identifying problems in the current drilling process and may monitor for sudden failures and gradual failures. In this capacity, the pattern recognition/error detection block 1208 receives input from the input driver 902. The input may include the sensor feedback received by the positional/rotary control logic block 1202, WOB/differential pressure control logic block 1204, and fluid circulation control logic block 1206. The pattern recognition/error detection block 1208 monitors the input information for indications that a failure has occurred or for sudden changes that are illogical.

For example, a failure may be indicated by an ROP shift, a radical change in build rate, or any other significant changes. As an illustration, assume the drilling is occurring with an expected ROP of 100 ft/hr. If the ROP suddenly drops to 50 ft/hr with no change in parameters and remains there for some defined amount of time, an equipment failure, formation shift, or another event has occurred. Another error may be indicated when MWD sensor feedback has been steadily indicating that drilling has been heading north for hours and the sensor feedback suddenly indicates that drilling has reversed in a few feet and is heading south. This change clearly indicates that a failure has occurred. The changes may be defined and/or the pattern recognition/error detection block 1208 may be configured to watch for deviations of a certain magnitude. The pattern recognition/error detection block 1208 may also be configured to detect deviations that occur over a period of time in order to catch more gradual failures or safety concerns.

When an error is identified based on a significant shift in input values, the on-site controller 201 may send an alert. This enables an individual to review the error and determine whether action needs to be taken. For example, if an error indicates that there is a significant loss of ROP and an intermittent change/rise in pressure, the individual may determine that mud motor chunking has likely occurred with rubber tearing off and plugging the bit. In this case, the BHA may be tripped and the damage repaired before more serious damage is done. Accordingly, the error detection may be used to identify potential issues that are occurring before they become more serious and more costly to repair.

Another function of the ACL 916 is pattern recognition. Pattern recognition is directed to identifying safety concerns for rig workers and to provide warnings (e.g., if a large increase in pressure is identified, personnel safety may be compromised) and also to identifying problems that are not necessarily related to the current drilling process, but may impact the drilling process if ignored. In this capacity, the pattern recognition/error detection block 1208 receives input from the input driver 902. The input may include the sensor feedback received by the positional/rotary control logic block 1202, WOB/differential pressure control logic block 1204, and fluid circulation control logic block 1206. The pattern recognition/error detection block 1208 monitors the input information for specific defined conditions. A condition may be relatively common (e.g., may occur multiple times in a single borehole) or may be relatively rare (e.g., may occur once every two years). Differential pressure, standpipe pressure, and any other desired conditions may be monitored. If a condition indicates a particular recognized pattern, the ACL 916 may determine how the condition is to be addressed. For example, if a pressure spike is detected, the ACL 916 may determine that the drilling needs to be stopped in a specific manner to enable a safe exit. Accordingly, while error detection may simply indicate that a problem has occurred, pattern recognition is directed to identifying future problems and attempting to provide a solution to the problem before the problem occurs or becomes more serious.

Figure 13:
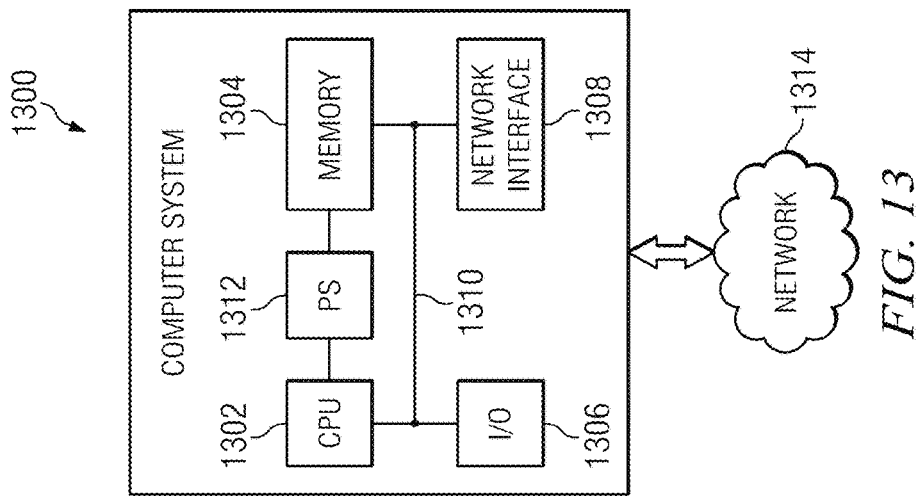
FIG. 13 illustrates one embodiment of a computer system that may be used within the surface steerable system of FIG. 2A.

Referring to FIG. 13, one embodiment of a computer system 1300 is illustrated. The computer system 1300 is one possible example of a system component or device such as the on-site controller 144 of FIG. 1A. In scenarios where the computer system 1300 is on-site, such as at the location of the drilling rig 110 of FIG. 1A, the computer system may be contained in a relatively rugged, shock-resistant case that is hardened for industrial applications and harsh environments.

The computer system 1300 may include a central processing unit ("CPU") 1302, a memory unit 1304, an input/output ("I/O") device 1306, and a network interface 1308. The components 1302, 1304, 1306, and 1308 are interconnected by a transport system (e.g., a bus) 1310. A power supply (PS) 1312 may provide power to components of the computer system 1300, such as the CPU 1302 and memory unit 1304. It is understood that the computer system 1300 may be differently configured and that each of the listed components may actually represent several different components. For example, the CPU 1302 may actually represent a multi-processor or a distributed processing system; the memory unit 1304 may include different levels of cache memory, main memory, hard disks, and remote storage locations; the I/O device 1306 may include monitors, keyboards, and the like; and the network interface 1308 may include one or more network cards providing one or more wired and/or wireless connections to a network 1314. Therefore, a wide range of flexibility is anticipated in the configuration of the computer system 1300.

The computer system 1300 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, and servers depending on the use of the computer system 1300. The operating system, as well as other instructions (e.g., software instructions for performing the functionality described in previous embodiments) may be stored in the memory unit 1304 and executed by the processor 1302. For example, if the computer system 1300 is the on-site controller 144, the memory unit 1304 may include instructions for performing methods such as the methods 600 of FIG. 6, 700 of FIG. 7A, 720 of FIG. 7B, 800 of FIG. 8A, 820 of FIG. 8B, 830 of FIG. 8C, and 840 of FIG. 8D.

Referring to FIGS. 14A-14D, embodiments of sections of the borehole 164 of FIG. 1B are illustrated. FIG. 14A illustrates an embodiment of the borehole 164 where the slide occurs in the middle of the section. The slide is planned to begin at a point marked by line 1402 and end at a point marked by line 1404. Sequential survey points 1406 and 1408 mark locations where measured surveys occur. Being sequential, there is no survey point between the two survey points 1406 and 1408. FIG. 14B illustrates an embodiment of the borehole 164*a* where the slide occurs at the beginning of the section (e.g., right after the survey point 1406). FIG. 14C illustrates an embodiment of the borehole 164*b* where the slide occurs at the end of the section (e.g., leading up to the survey point 1408). FIG. 14D illustrates an embodiment of the borehole 164*c* where the slide occurs for the entire distance between the survey points 1406 and 1408. FIG. 14E illustrates the boreholes 164*a*-164*c* (not to scale) overlaid on one another.

Referring specifically to FIG. 14A, in the present example, two possible paths 1410 and 1412 are illustrated between the survey points 1406 and 1408. The two paths 1410 and 1412 are used herein to illustrate what may happen in the borehole 164 between the two survey points 1406 and 1408. As described previously, surveys may occur at defined intervals, such as every thirty, forty-five, or ninety feet. For example, a survey may occur each time a new section of pipe (e.g., a joint) is added to the drill string. If the sections are approximately thirty feet long and a survey is taken every three sections (e.g., a stand), the surveys may occur approximately every ninety feet. Constant surveying is generally not practical as performing a survey may take a relatively substantial amount of time (e.g., from five to twenty minutes) and, in addition, control of the reactional torque neutral point may be lost. Between surveys, the state of the drilling (e.g., orientation of the bit and distance drilled) is not generally known. Accordingly, the path between the survey points 1406 and 1408 is unknown. This lack of knowledge may affect various aspects of drilling the borehole 164, as well as the final efficiency of the well.

For example, assume that the planned borehole 164 includes a fifty foot slide (from point 1402 to point 1404) and the slide occurs between the survey points 1406 and 1408. One possible path 1410 for the slide occurs when the drilling is held almost perfectly on course, which would result in a slide of approximately fifty feet (assuming other factors are ideal). However, another possible path 1412 occurs when the drilling does not stay on course. In the present example, the path 1412 is not even on course prior to the line 1402 that represents the beginning of the slide. As the shortest distance between the points 1406 and 1408 is a straight line (or an arc at the maximum build rate), the path 1410 is more efficient than the path 1412 in making progress toward the target. Furthermore, not only is the path 1412 less efficient in reaching the target, it also forms a less ideal borehole in terms of tortuosity as described in greater detail below.

It is understood, as described previously, that there may be a survey point offset where the survey point is actually located some distance behind the bit and so the survey location may not represent the actual bit location. Because of this offset distance, a survey is accurate only to a certain distance (e.g., fifty feet behind the bit) and there is usually some uncertainty in the path ahead of the survey point to where the bit is actually located. Accordingly, knowing the actual path past a survey point may also be beneficial as illustrated by path segment 1413 extending from survey point 1408.

In addition to providing information about drilling efficiency, knowing what occurs between the survey points 1406 and 1408 may enable the effective build rate of the BHA to be assessed more objectively because the build rate orientation stability can be taken into account. If the build rate orientation stability is not taken into account, the second path 1412 that lacks orientation stability may be included in the assessment, which would make the BHA seem less efficient than it actually was. In turn, the more accurate assessment of the actual path of the BHA aids in the accuracy of later drilling predictions (e.g., build rate predictions).

Knowledge of what occurs between survey points may also aid in addressing drilling problems such as tortuosity in the borehole that may impact whether casing can be run, increase friction in the drill string, affect lubrication planning for slides, and other issues. For example, dogleg severity is often viewed as the change of angle between two sequential survey points. However, this view provides no information as to whether a dogleg exists between the survey points and, if one does exist, how severe it is. Furthermore, the orientation of the doglegs may create even more severe problems. For example, a dogleg created by a left arc that is immediately followed by a dogleg created by a right arc may be more problematic than if the following dogleg is also a left arc. In other words, sequential doglegs that arc in generally the same direction may be preferable to sequential doglegs that arc in opposite directions. Accordingly, the survey points may show a dogleg characterized by a five degree per hundred foot severity (5°/100'), while the actual path may include a dogleg of 10°/100' at one point, 5°/100' at another point, et cetera, between the survey points, and these doglegs may have different orientations.

Knowing what is happening between the survey points and accumulating such information over the course of the well enables problems to be addressed by implementing one or more solutions before drilling continues, during later drilling, and even after drilling. For example, the ability to measure tortuosity in real time or near real time may enable determinations to be made during drilling such as whether lubrication is needed, how and when to apply the lubrication, and whether back reaming a particular section of the borehole is needed. Such information may also be used to determine whether a planned well should be stopped early. After the well is completed, the use of path information that is higher resolution than the information provided by the survey points may be used to improve the well, such as in a determination on where to focus reaming activity (e.g., at a problem area at ten thousand feet).

It is understood that information about what is occurring between survey points may also be useful even when not sliding. For example, drift caused by formation characteristics may affect the path even when drilling straight ahead. Accordingly, current location estimates may be useful regardless of the type of drilling (e.g., rotating or sliding).

Referring to FIG. 15, one embodiment of a three-dimensional borehole space 1500 is illustrated with two measured survey points 1502 (also labeled as "A") and 1504 (also labeled as "C"). A borehole path (not shown) extends between the two survey points 1502 and 1504, but the actual path is unknown. Current borehole projection methods frequently use a minimum curvature technique for estimating the borehole projection between the two survey points 1502 and 1504. Assuming the initial borehole position is known as well as its initial survey trajectory, there may be only a subsequent measure of additional borehole length and a new survey trajectory that can be measured from surface and downhole instruments that are available.

In FIG. 15, the borehole space is presented in Cartesian space with a North-South (N) axis 1508, an East-West (E) axis 1510, an Up-Down Vertical (V) axis 1512, and a borehole trajectory where an inclination angle represents the vertical component and a compass style azimuth angle represents the horizontal component. The initial survey point 1502 has an inclination and azimuth trajectory of $\alpha 1$ and $\varepsilon 1$, respectively, and the second survey point 1504 has an inclination and azimuth trajectory of $\alpha 2$ and $\varepsilon 2$, respectively.

With only new survey trajectory and path length information available, an assumption must be made about the shape of the borehole between the survey points 1502 and 1504. The minimum curvature method works off the assumption that the borehole moves along the smoothest possible arc between two survey points. This arc is represented by arc 1514. The change in trajectory angle from survey point 1502 to survey point 1504 ($\beta$) is often referred to as a dogleg in the context of surveying. The path ABC (where B is also labeled as point 1506) represents the balanced tangential method path, whereby a borehole projection is estimated by two line segments which intersect at the point where the curvature angle, $\beta$, is evenly bisected. This bisection point is point 1506 in the present example. This is a useful case, as the minimum curvature method represents a special case of the balanced tangential method where the two line segments are substituted with a circular arc curve (e.g., the arc 1514) that also passes through points 1502 and 1504 with tangents at those points aligned with their respective trajectories. The equations for the curve AB are the same as the balanced tangential method for calculating path ABC except for the application of the ratio factor (RF):

$$\Delta V = \frac{\Delta MD}{2}[\cos \alpha 1 + \cos \alpha 2] \times RF \quad \text{(Equation 1)}$$

$$\Delta N = \frac{\Delta MD}{2}[\sin \alpha 1 \times \cos \varepsilon 1 + \sin \alpha 2 \times \cos \varepsilon 2] \times RF \quad \text{(Equation 2)}$$

$$\Delta E = \frac{\Delta MD}{2}[\sin \alpha 1 \times \sin \varepsilon 1 + \sin \alpha 2 \times \sin \varepsilon 2] \times RF \quad \text{(Equation 3)}$$

When using Equations 1-3 for estimating borehole positions between measured survey points, $\Delta MD$ represents an increase in measured depth progress between two survey trajectory measurements.

The ratio factor (RF) is used to account for the path length difference between the length of ABC and the length of the minimum curvature arc which crosses through AC. RF is given by the equation:

$$RF = \frac{2}{\beta} \tan \frac{\beta}{2} \quad \text{(Equation 4)}$$

The minimum curvature method may result in significant inaccuracy as shown in the following examples. There are two basic assumptions in these examples. The first is that the example starts from a ninety degree inclination. The second is that all sliding is two-dimensional in the vertical plane.

Table 1, shown below, illustrates a scenario where a slide has occurred.

TABLE 1

| Description | Value | Units |
| --- | --- | --- |
| Total MD Increment Between Surveys | 100 | ft |
| Slide/Build Duration | 15 | ft |
| Instantaneous Build Rate | 12 | Degrees/100 ft |
| Inclination Change | 1.8 | Degrees |

For purposes of illustration, the distance between surveys is equal to one hundred feet and is used as a surface measurement of the total measured depth increment. Accordingly, the total measured depth increment between surveys in Table 1 is one hundred feet. The slide lasted for fifteen feet and had an instantaneous build rate of twelve degrees per one hundred feet, so the inclination change over the twelve foot slide was 1.8 degrees.

Table 2, shown below, illustrates two scenarios where a slide has occurred. The first column contains two rows, with each row indicating whether the slide occurred at the beginning of the one hundred foot distance (one embodiment of which is illustrated in FIG. 14B) or at the end (one embodiment of which is illustrated in FIG. 14C).

TABLE 2

| | MD change (ft) | TVD change (ft) | Traditional Curve Fit TVD change (ft) | Interpreted TVD error (ft) | Interpreted Formation Dip Error Over Survey Period Due to TVD Error (degrees) |
| --- | --- | --- | --- | --- | --- |
| Slide before Rotate | 100 | 2.906 | 1.571 | 1.335 | 0.765 |
| Rotate before Slide | 100 | 0.236 | 1.571 | −1.335 | −0.765 |

In the first row where sliding occurred before rotation, the TVD change is 2.906 feet. Using the previously presented equations for curve fitting, the curve fit TVD change is 1.571 feet. This results in an interpreted TVD error of 1.335 feet and an interpreted formation dip error of 0.765 degrees. In the second row where sliding occurred after rotation, the TVD change is 0.236 feet. Using the previously presented equations for curve fitting, the curve fit TVD change is 1.571 feet. In other words, the curve fit TVD change is the same as in row one. The curve fit TVD change of 1.571 results in an interpreted TVD error of −1.335 feet and an interpreted formation dip error of −0.765 degrees.

Although the errors may cancel each other out relative to the entire well (e.g., an error in one direction may be canceled by an equal error in the opposite direction), the errors in a given direction accumulate and there is more accumulation the longer that a slide occurs in a particular direction.

As illustrated in Table 2, the curve fit TVD change for a particular set of slide/build duration and instantaneous build rate values remains constant regardless of whether sliding occurs before or after rotation even though the TVD change is different based on whether sliding occurs before or after rotation. This difference between the curve fit TVD change and the total TVD change occurs for different values of slide/build duration and instantaneous build rate in Table 1. The curve fit TVD change and the total TVD change may only match in two scenarios. The first is when the slide occurs for the full one hundred feet (e.g., slide/build duration is set to 100 in Table 1), as the borehole shape may be estimated as an arc between the two survey points (one embodiment of which is illustrated in FIG. 14D). The second is when the slide is symmetrically centered on the midpoint between survey points. As illustrated in FIG. 14E, the boreholes 164a-164c of FIGS. 14B-14D may vary significantly for the same curve fit TVD change.

Accordingly, using only information from two measured survey points to estimate the state of the drilling (e.g., orientation of the bit and distance drilled) between the two survey points may result in significant inaccuracies. These inaccuracies may negatively impact drilling efficiency, the ability to objectively identify well plan corrections, the ability to characterize formation position and dip angles, and/or similar issues. Furthermore, problems such as tortuosity may be more difficult to identify and address. Inaccurate TVD information may result in difficulties in following the target layer (e.g., the layer 172A of FIG. 1B), as even seemingly minor variations in inclination (e.g., one half of one degree) may cause the drill bit to exit the target layer.

Figure 16:
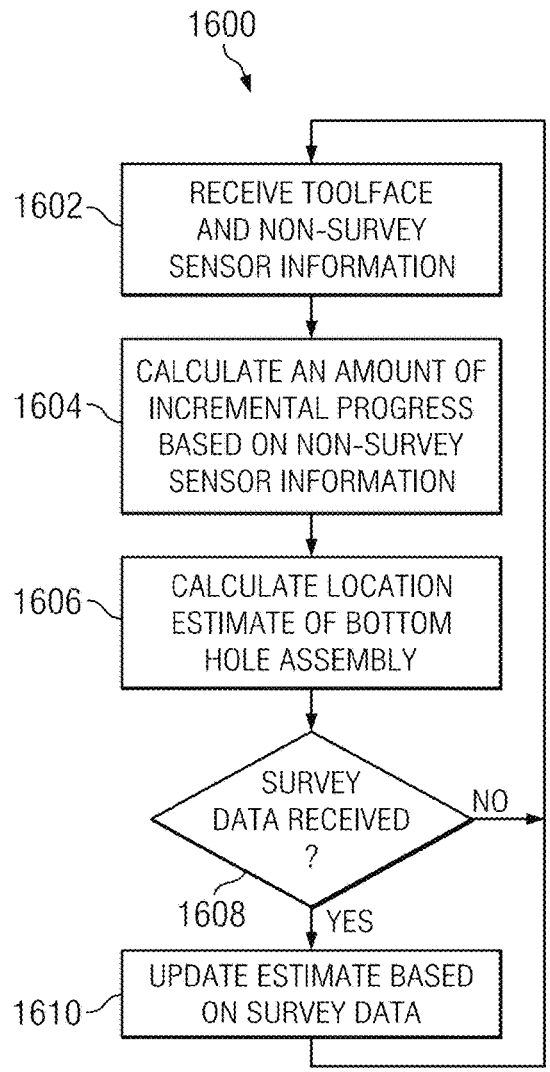
FIG. 16 illustrates one embodiment of a method that may be executed by the surface steerable system of FIG. 2A to estimate a drill bit position between survey points.

Referring to FIG. 16, a method 1600 illustrates one embodiment of a process that may be executed by the on-site controller 144 of FIG. 2A and/or another part of the surface steerable system 201. For example, software instructions needed to execute the method 1600 may be stored on a computer readable storage medium of the on-site controller 144 and then executed by the processor 412 that is coupled to the storage medium and is also part of the on-site controller 144.

In the present example, the method 1600 may be used to estimate the position of the drill bit between survey points during straight drilling and/or during a sliding operation. The method 1600 may provide more accurate information on the state of the drilling (e.g., orientation of the bit and distance drilled) than that provided by the minimum curvature method described above.

In step 1602, toolface and other non-survey sensor information is received. The toolface information may be relayed from the toolface periodically, such as at set intervals of between ten and thirty seconds. The non-survey sensor information may include any type of data, such as differential pressure and may be continuous or non-continuous. As the toolface information may be obtained at set intervals and the other non-survey sensor information may be continuous, non-survey sensor information may be obtained between orientation updates. The non-survey sensor information may be averaged (symmetrically or otherwise) to relate the sensor information to the toolface information.

In step 1604, calculations are performed on the non-survey sensor information to estimate the amount of progress made by the drill bit since the last estimate. For example, the differential pressure may be used to estimate the force on the bit, which may be used with formation information to determine the distance that the bit should have drilled in the current formation layer.

One difficulty in measuring drilling information between survey points is that measurements made at the top of the drill string may not accurately reflect events at the BHA. For example, a ten thousand foot drill string may be viewed as a big spring, and when motion is stopped at the surface, the spring force may continue to increase the length of the drill string and the BHA may make progress in a certain direction. In another example, if a foot of pipe is moved into the hole, the drill string may compress and/or buckle and the bit may move little, if at all.

Accordingly, predictions about the current orientation and progress of the drill bit may vary in accuracy depending on the information on which the predictions are based. For example, rather than exclusively using surface deviation, energy produced by the bit and a combination of differential pressure, MSE, and/or other measurements may be used. In some embodiments, more sensors may be placed downhole to provide more accurate information. Depending on the particular embodiment, calculations may be performed based on sensors at various levels of the drillstring to predict actual progress between surveys. For example, calculations may be used to approximate the fluid pressure to how much force is on the bit. Other calculations may be made to account for drill string compression, tension, and/or buckling.

It is understood that the calculations may differ based on the configuration of the drilling equipment and/or the BHA. For example, if an autodrilling system is used, the drilling rig may have a fixed value for ROP, WOB, DP, and/or other characteristics. Such fixed values may affect the particular calculations used. For example, if DP is fixed, the calculations may not rely on changes in DP as the autodrilling system may attempt to maintain the fixed DP value. In another example, if ROP is fixed, measurements of DP may have a wide range due to the attempt to maintain the fixed ROP value. If an autodrilling system is not used to control drilling functions, more flexibility may be available in the calculations that are used.

In step 1606, calculations may be performed to obtain an estimate of the BHA's location using the toolface information and the calculated amount of progress. This calculation may be performed in a variety of ways, including the calculation of a vector as a three-dimensional estimate of the drill bit's current location and orientation. The vector progress (e.g., degrees/100 feet) may come from the build rate predictor 1102 of FIG. 11, and may also include the use of formation information.

In step 1608, a determination may be made as to whether survey data has been received. If not, the method 1600 may return to step 1602 and calculate another location estimate (e.g., another vector) of the BHA's incremental progression. As these estimates are calculated, an estimated path of the BHA between the two survey points is developed. If survey data has been received, the method 1600 moves to step 1610, where the survey data is used to update the estimated location. The method 1600 may then return to step 1602 and calculate another location estimate using the new survey data as the baseline for the current estimate.

Accordingly, the survey data may serve as truth data against which the estimates can be measured. This enables the calculations used for the estimates to be refined in conjunction with formation information as more survey point data is received. For example, if the estimates use a particular drilling speed through the current formation layer and the survey data indicates that the drilling speed is incorrect, future estimates may be calculated based on the revised drilling speed to provide a higher level of accuracy. Furthermore, although not shown in FIG. 16, it is understood that the survey data may also be used to check the estimated build rate and, if needed, recalibrate the build rate (e.g., the build rate predictor 1102 of FIG. 11) to correspond to the survey data.

Figure 17:
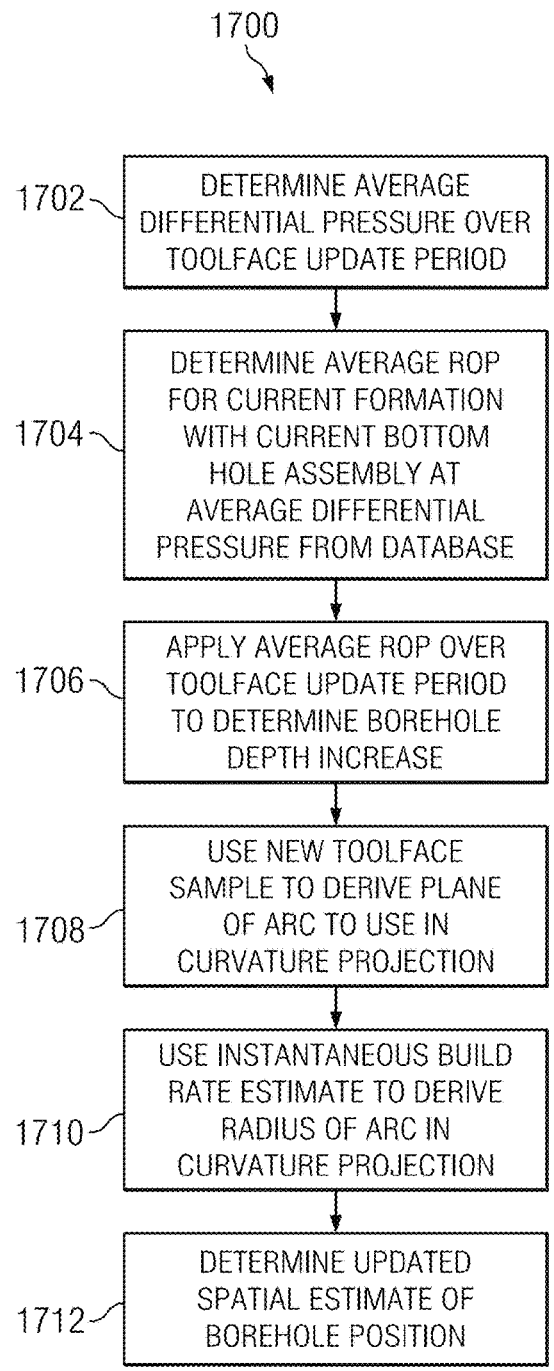
FIG. 17 illustrates one embodiment of a method that represents a portion of the method of FIG. 16 in greater detail.

Referring to FIG. 17, a method 1700 illustrates one embodiment of a process that may be executed by the on-site controller 144 of FIG. 2A and/or another part of the surface steerable system 201. For example, software instructions needed to execute the method 1700 may be stored on a computer readable storage medium of the on-site controller 144 and then executed by the processor 412 that is coupled to the storage medium and is also part of the on-site controller 144. In the present example, the method 1700 illustrates a more detailed example of steps 1602-1606 of FIG. 16.

In step 1702, the average differential pressure is determined for a toolface update period (e.g., the length of time between toolface updates). The differential pressure may be acquired or calculated. The toolface update period may vary based on factors such as the speed at which the MWD component is set to run, the priority given to the toolface information in the MWD component, the overall bandwidth available to the MWD component, and/or other factors.

In step 1704, the average ROP is determined. For example, the differential pressure determined in step 1702 may be used to assist in a database lookup. More specifically, the average ROP for the current formation using the current BHA at the average differential pressure may be acquired from the database.

In step 1706, the average ROP is applied over the toolface update period to determine the borehole distance increase since the last iteration. For example, if the ROP retrieved from the database indicates that the ROP is fifty feet per hour and the toolface update period is thirty seconds, then the distance increase should be approximately five inches.

In steps 1708 and 1710, the new toolface sample is used to derive a plane of arc to use in a curvature projection. In the current example, applying observations from the previously described minimum curvature method may be useful when developing a method for estimating borehole position and trajectory from toolface measurements between survey measurements. Certain parameters used in the minimum curvature method may be estimated instead of directly measured.

Figure 18:
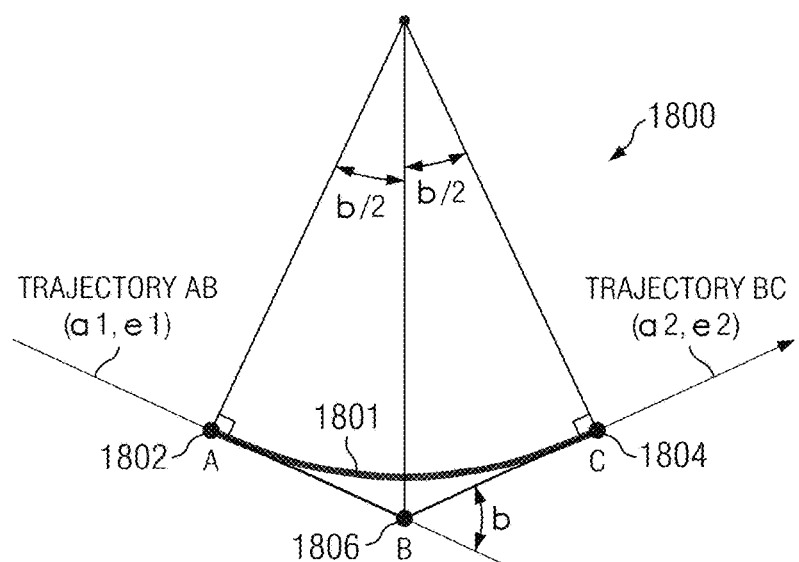
FIG. 18 illustrates one embodiment of a two-dimensional borehole space.

With additional reference to FIG. 18, one embodiment of a two-dimensional borehole space 1800 illustrates the minimum curvature path 1801 in the plane of the curvature arc. The space 1800 is illustrated with two measured survey points 1802 (also labeled as "A") and 1804 (also labeled as "C").

As illustrated in FIG. 18, the angle β can be seen intuitively as the arc angle along which the minimum curvature path is made and the change in trajectory between the two path points. Angle β would normally be calculated from survey trajectory angles using an additional formula. In the context of directional well steering where the angle β is deliberately controlled, it can also be considered an angle of desired or target build. In the case of projecting build in real time, an instantaneous β estimate may be needed. The complexity of such an estimate may vary. For example, a relatively simple approach may use a geometric formula of BHA dimensions. In other examples, more detailed approaches may account for factors from previous and instantaneous rig sensor data, formation data, etc., in order to provide an improved prediction of an instantaneous build rate while drilling. The build rate predictor 1102 of FIG. 11 may provide a functional component used to perform this task within the surface steerable system 201.

In the minimum curvature method, AMD may be directly obtained from the surface measurement of the difference in drill string lengths between surveys. When accounting for the position of the bit, this method of using surface changes in drill string lengths may be used in a relatively simple approach for an estimate. However, accounting for drill string tension, compression, buckling, and other factors that impact drill string length may provide a better estimate of the current drill bit position as it is drilling new borehole.

In the case of updating borehole trajectory over a given change in borehole depth, survey measurements may be used when available. In such cases, one goal of slide estimation may be to estimate trajectory along the bit path by using toolface history along the intervals ahead of where survey data is available to allow a real time or near real time estimate of bit location.

Figure 19:
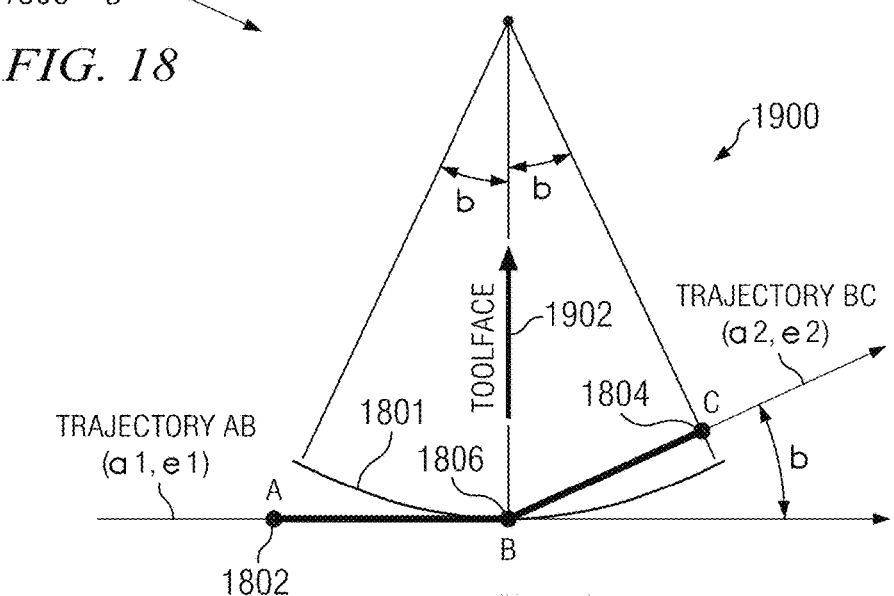
FIG. 19 illustrates another embodiment of a two-dimensional borehole space.

With additional reference to FIG. 19, one embodiment of a two-dimensional borehole space 1900 illustrates slide estimation by integration of a single toolface measurement using the minimum curvature path 1801 of FIG. 18. More specifically, the present example addresses the application of a toolface vector 1902 that is a direct linear projection of an individual toolface. This projection is overlaid against the minimum curvature path 1801 for purposes of illustration. It is understood that while the present example uses a gravity toolface frame of reference, magnetic references can also be used with variations in some formulas described below to account for the use of magnetic references.

In this case, the borehole is assumed to be moving in a straight path along the trajectory AB until encountering a measured toolface. Upon encountering the toolface at point 1806 (B), the toolface is applied directly to the trajectory BC as follows:

$$\alpha 2 = \alpha 1 + \cos TF \times \beta \quad \text{(Equation 5)}$$

$$\varepsilon 2 = \varepsilon 1 + \sin TF \times \beta \quad \text{(Equation 6)}$$

where TF is the toolface vector angle presented relative to the gravity "up" vector. The position estimates for the path between AC may be given by:

$$\Delta V = \Delta BD \times \cos \alpha 1 \quad \text{(Equation 7)}$$

$$\Delta N = \Delta BD \times [\sin \alpha 1 \times \cos \varepsilon 1] \quad \text{(Equation 8)}$$

$$\Delta E = \Delta BD \times [\sin \alpha 1 \times \sin \varepsilon 1] \quad \text{(Equation 9)}$$

The equations 7-9 represent the simple projection of the straight line AB in Cartesian space since the toolface would not be applied until point B. When overlaid on the curvature model, it is evident that this estimate is analogous to the balanced tangential method where the starting and finishing points A and C and the path ABC lie apart from the overlying smooth circular arc.

Figure 20:
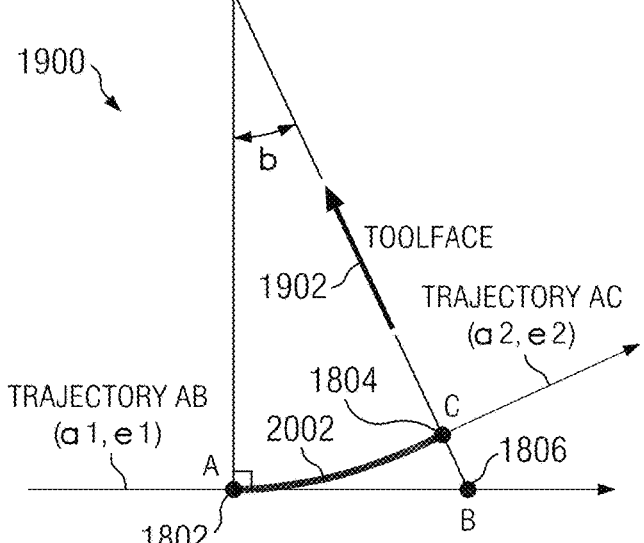
FIG. 20 illustrates another embodiment of the two-dimensional borehole space of FIG. 19.

With additional reference to FIG. 20, one embodiment of the two-dimensional borehole space 1900 of FIG. 19 is illustrated using the minimum curvature concept to yield a better estimate of actual borehole displacement by modeling the borehole as an arc rather than bending line segments. When framed as a single arc curve displacement 2002, the projection of the single toolface may appear as illustrated in FIG. 20.

In this case, the toolface influence on trajectory may be modeled to yield the same tangent trajectory from the toolface build vector 1902 as follows:

$$\alpha 2 = \alpha 1 + \cos TF \times \beta \quad \text{(Equation 10)}$$

$$\varepsilon 2 = \varepsilon 1 + \sin TF \times \beta \quad \text{(Equation 11)}$$

After deriving trajectory changes, the minimum curvature method equations are again applicable for determining the positional displacements over the interval as follows:

$$\Delta V = \frac{\Delta BD}{2}[\cos \alpha 1 + \cos \alpha 2] \times RF \quad \text{(Equation 12)}$$

$$\Delta N = \frac{\Delta BD}{2}[\sin \alpha 1 \times \cos \varepsilon 1 + \sin \alpha 2 \times \cos \varepsilon 2] \times RF \quad \text{(Equation 13)}$$

$$\Delta E = \frac{\Delta BD}{2}[\sin \alpha 1 \times \sin \varepsilon 1 + \sin \alpha 2 \times \sin \varepsilon 2] \times RF \quad \text{(Equation 14)}$$

In this case, the line path to arc relationship works out to be the same as the minimum curvature RF:

$$RF = \frac{2}{\beta}\tan\frac{\beta}{2} \quad \text{(Equation 15)}$$

While the preceding example illustrates slide estimation by integration of a single toolface measurement, it is understood that a range of toolface measurements may be used. As described above, the integration of individual toolface projections may provide a useful method of slide and borehole estimation on a near real time basis. However, like the use of minimum curvature on a smaller scale, this process may be subject to cumulative errors over longer intervals. Accordingly, a range of toolfaces may be used over an interval to address this issue. For example, the range of toolfaces may be used to provide a net effective toolface direction and a net effective build rate angle may also be estimated. In both cases, the benefit of larger data sets (e.g., toolface histories) may enable the application of more sophisticated statistical methods and filtering techniques. For example, over a path interval, a target toolface may be desired and attempted to be maintained. In practice, the ability to control the toolface over these intervals can be evaluated in statistical metrics, like a circular distribution. These metrics can then be used to refine the effective build rate and toolface direction over the evaluation interval.

Referring again specifically to FIG. 17, in step 1712, an updated spatial estimate of the borehole position may be estimated based on the preceding steps. The estimated spatial estimate may be provided to the display 250 of FIG. 2B (e.g., for display to the driller 310 of FIG. 3), provided as feedback to the convergence planner 1116 of FIG. 11, and/or otherwise used.

Referring to FIG. 21, a method 2100 illustrates one embodiment of a process that may be executed by the on-site controller 144 of FIG. 2A and/or another part of the surface steerable system 201. For example, software instructions needed to execute the method 2100 may be stored on a computer readable storage medium of the on-site controller 144 and then executed by the processor 412 that is coupled to the storage medium and is also part of the on-site controller 144. In the present example, the method 2100 may provide a more detailed example of steps 1602-1606 of FIG. 16.

In step 2102, the increase in measured depth is determined for the toolface update period. The increase may be acquired or calculated. For example, the measured depth may be acquired based on a surface measurement of the length of pipe inserted into the borehole between the last toolface update period and the current toolface update period. In other examples, the measured depth may be calculated based on measurements received from downhole sensors.

In step 2104, the method 2100 may account for deviations in the overall drillstring length due to issues such as compression, tension, and/or buckling. In some embodiments, step 2104 may be omitted and the measured depth determined in step 2102 may be used with accounting for such deviations. Steps 2106, 2108, and 2110 may similar or identical to steps 1708, 1710, and 1712, respectively, with the estimate using the information from steps 2102 and 2104.

Referring to FIG. 22, a method 2200 illustrates one embodiment of a process that may be executed by the on-site controller 144 of FIG. 2A and/or another part of the surface steerable system 201. For example, software instructions needed to execute the method 2200 may be stored on a computer readable storage medium of the on-site controller 144 and then executed by the processor 412 that is coupled to the storage medium and is also part of the on-site controller 144. In the present example, the method 2200 may provide a more detailed example of step 2104 of FIG. 21, although it is understood that the method 2200 may be used with the other methods described herein.

In step 2202, a hookload measurement is acquired and compared to the static weight of the drill string vertical section excluding the mass of the surface equipment. The static weight of the drill string vertical section excluding the mass of the surface equipment may be determined, for example, from information available from the local database 912 of FIG. 9 and/or regional database 128 of FIG. 1A.

In step 2204, the tensile elastic deformation of the drill string components in the vertical section is determined. This determination may use, for example, average cross-section and mechanical properties of the drill string components in the vertical section. The average cross-section and mechanical properties may be determined, for example, from information available from the local database 912 of FIG. 9 and/or regional database 128 of FIG. 1A.

In step 2206, a real time or near real time WOB value is determined. For example, the WOB value may be obtained using a downhole sensor. In another example, the WOB value may be approximated using differential pressure and mud motor properties.

In step 2208, the compressive elastic deformation of drill string components in the horizontal section of the borehole (if any) is determined. This determination may use, for example, average cross-section and mechanical properties of the drill string components in the vertical section. The average cross-section and mechanical properties may be determined, for example, from information available from the local database 912 of FIG. 9 and/or regional database 128 of FIG. 1A.

In step 2210, the total drill string length dynamic offset from the measured depth is determined. This total length dynamic offset accounts for variations between the measured depth and the actual drillstring length due to issues such as compression, tension, and/or buckling in the drillstring.

Figure 23:
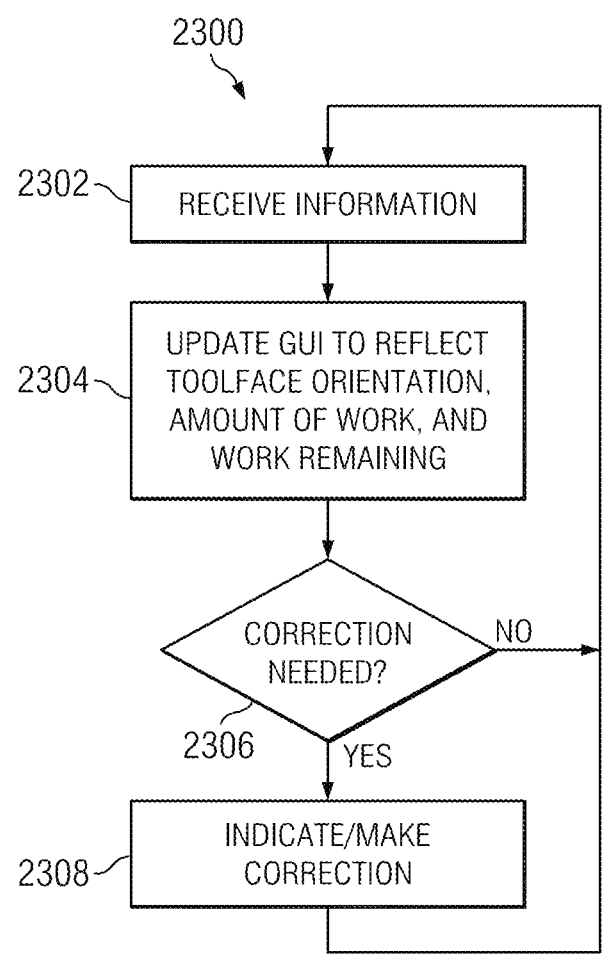
FIG. 23 illustrates one embodiment of a method that may be executed by the surface steerable system of FIG. 2A.
Figure 24:
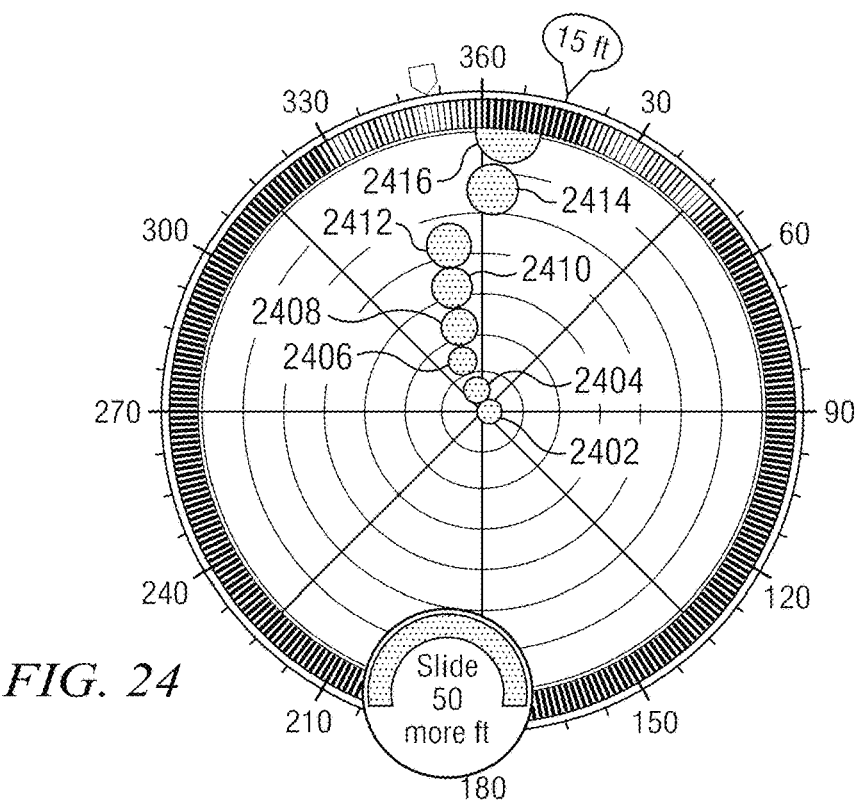
FIG. 24 illustrates another embodiment of the display of FIG. 2B.
Figure 25:
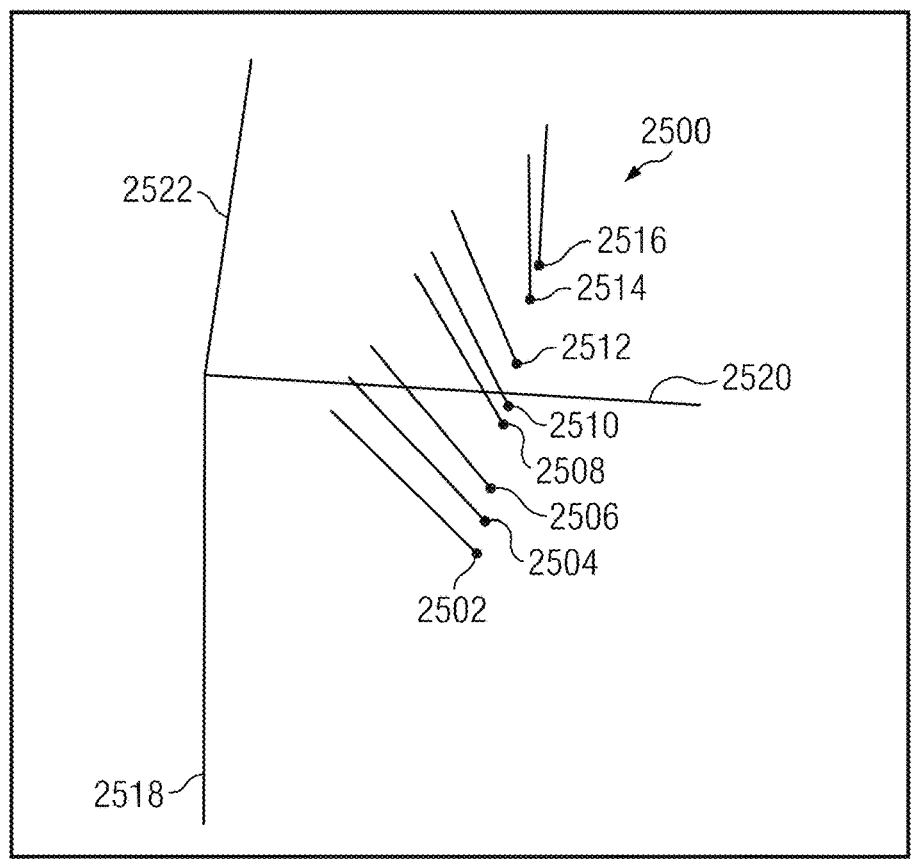
FIG. 25 illustrates one embodiment of a three-dimensional graph illustrating vectors representing information that may be displayed on the display of FIG. 24.

Referring to FIG. 23 and with additional reference to FIGS. 24 and 25, a method 2300 illustrates one embodiment of a process that may be executed by the on-site controller 144 of FIG. 2A and/or another part of the surface steerable system 201. For example, software instructions needed to execute the method 2300 may be stored on a computer readable storage medium of the on-site controller 144 and then executed by the processor 412 that is coupled to the storage medium and is also part of the on-site controller 144.

In step 2302, information is received by the surface steerable system 201. The information may be any type of information displayed by the display 250. For purposes of example, the information may include the orientation and progress estimate from FIG. 16.

In step 2304, the GUI (e.g., the circular chart 286) may be updated with the information representing the orientation and progress of the drill bit. Referring specifically to FIG. 24, an embodiment of the circular chart 286 of the display 250 (FIG. 2B) is illustrated with differently positioned circles than those shown in FIG. 2B and may be used to show the orientation and/or mechanical progress of the drill bit at survey points and/or between surveys. More specifically, FIG. 2B illustrates a particular positioning of the circles ranging from the largest circle 288 to the smallest circle 289. FIG. 24 illustrates a different positioning of circles labeled 2402 (the smallest circle), 2404, 2406, 2408, 2410, 2412, 2414, and 2416 (the largest circle). As described with respect to FIG. 2B, the series of circles may represent a timeline of toolface orientations, with the sizes of the circles indicating the temporal position of each circle. In the present example, the largest circle 2416 is the newest orientation and the smallest circle 2402 is the oldest orientation. The circular chart 286 may provide insight into what is happening in the borehole between surveys (e.g., using variations in size, color, shape, and/or other indicators). As described previously, the lack of knowledge about orientation and progress between surveys may affect various aspects of drilling, as well as the final efficiency of the well.

With additional reference to FIG. 25, a three-dimensional chart 2500 illustrates vectors 2502, 2504, 2506, 2508, 2510, 2512, 2514, and 2516 corresponding to circles 2402, 2404, 2406, 2408, 2410, 2412, 2414, and 2416, respectively. The vectors 2502, 2504, 2506, 2508, 2510, 2512, 2514, and 2516 are plotted against a TVD axis 2518 and compass directions indicated by an axis 2520 representing east-west and an axis 2522 representing north-south.

Each vector 2502, 2504, 2506, 2508, 2510, 2512, 2514, and 2516 provides a three dimensional representation of the orientation of the bit, as well as an amplitude that may be used to represent the mechanical progress (e.g., distance traveled) of the bit and/or one or more other indicators. The amplitude may represent a measurement such as MSE or WOB. In some embodiments, the amplitude may be a combination of measurements and/or may represent the results of calculations based on such measurements. Accordingly, the circular chart 286 may provide a graphical illustration of the vectors 2502, 2504, 2506, 2508, 2510, 2512, 2514, and 2516. Although not shown, each estimate of FIG. 16 may result in one of the vectors 2502, 2504, 2506, 2508, 2510, 2512, 2514, and 2516, which may be combined to provide an estimated path.

Referring again specifically to step 2304 of FIG. 23, for example, the circle 2416 may represent the latest toolface orientation information that is used to calculate the vector 2516 of FIG. 25 when the information used to calculate the previous vector 2514 was represented on the circular chart 286 by the circle 2414. In addition, the slide indicator 292 and/or colored bar 293 may be updated to provide a visual indication of the current status of an ongoing slide.

In step 2306, a determination may be made as to whether a correction is needed according to the information. For example, if the heading is off by five degrees, the surface steerable system 201 may identify this error. In step 2308, the GUI may be updated to reflect this error. For example, the error indicator 294 may be updated. In some embodiments, the surface steerable system 201 may correct the heading automatically, while in other embodiments the target toolface pointer 296 may change to indicate an updated correct heading. For example, as the actual toolface veers off course, the GUI may be repeatedly updated to indicate an offsetting correction that should be made in cases where the GUI is used to notify an individual for manual correction of the toolface. Although continuous or near continuous error calculations may be provided to the driller 310, the steerable system 201 may plan a solution that uses periodic corrections, rather than instantaneous corrections. Accordingly, the display 250 may provide the recommended corrections to the driller 310 so that controlled, gradual, incremental step changes are made. In cases where the solution has a helical or otherwise continuous correction path, instantaneous or periodic corrections may be displayed to the driller 310. For example, the incremental step correction may be a function of the tortuosity of the well, amount of friction, and/or the overall depth of the BHA. In another example, in cases where the toolface is automatically controlled (e.g., via Top Drive), the method 2300 may make the correction via instructions to the Top Drive controller, via another controller, or directly.

It will be appreciated by those skilled in the art having the benefit of this disclosure that this system and method for surface steerable drilling provides a way to plan a drilling process and to correct the drilling process when either the process deviates from the plan or the plan is modified. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A control system for controlling drilling operations during drilling of a wellbore, the system comprising:
 a processor;
 a memory coupled to the processor, wherein the memory comprises instructions executable by the processor for:

(a) determining a real-time location of a bottom hole assembly (BHA) in a wellbore during drilling and a target path for the wellbore;
(b) determining a plurality of toolface vectors associated with slide drilling of the BHA, each toolface vector comprising a direction of drilling and an amplitude comprising information representing a progress of a drill bit;
(c) calculating an estimated amount of formation drift, and generating a formation drift vector that compensates for the estimated amount of formation drift;
(d) adjusting each of the toolface vectors based on the formation drift vector to bring the BHA in line with the target path;
(e) generating, based on costs associated with each of the adjusted toolface vectors, a convergence path for drilling the wellbore from the real-time location of the BHA to the target path, wherein the convergence path comprises a slide drilling portion and a rotary drilling portion, and wherein the slide drilling portion of the convergence path compensates for the formation drift of a formation to be drilled with the rotary drilling portion;
(f) sending the adjusted toolface vector to a control system to implement a slide drilling operation for the slide drilling portion of the convergence path; and
(g) repeating steps (a)-(f) until the wellbore converges with the target path.

2. The system according to claim 1, wherein the instructions further comprise instructions for:
determining an estimated amount of formation drift for the rotary drilling portion, wherein the formation drift is the estimated amount of formation drift.

3. The system according to claim 2, wherein the instructions further comprise instructions for orienting the BHA for drilling the slide drilling portion.

4. The system according to claim 2, wherein the estimated amount of formation drift is determined responsive to drift information from a previously drilled well.

5. The system according to claim 2, wherein the estimated amount of formation drift is determined responsive to drift information from a previously drilled portion of the wellbore.

6. The system according to claim 1, wherein the slide drilling portion occurs prior to the rotary drilling portion.

7. The system according to claim 1, wherein the generation of the convergence path comprises:
determining a plurality of convergence paths from the real-time location of the BHA to the target path based on the plurality of adjusted toolface vectors;
selecting one of the plurality of convergence paths as an optimal path, the selected optimal path being assigned as the convergence path; and
sending one or more signals to control the BHA during drilling of the wellbore in accordance with the selected convergence path.

8. The system according to claim 7, wherein the selecting one of the plurality of convergence path comprises:
determining the cost associated with each of the plurality of convergence paths, wherein the determined cost is responsive to the slide drilling portion and the rotary drilling portion, and wherein the one of the plurality of convergence paths selected as optimal is associated with a lowest cost of the plurality of convergence paths.

9. The system according to claim 1, wherein the toolface vector is further associated with rotation drilling of the BHA.

10. A method for drilling a wellbore, the method comprising:
(a) determining, by a computer system, a real-time location of a bottom hole assembly (BHA) in a wellbore during drilling and a target path for the wellbore;
(b) determining a plurality of toolface vectors associated with slide drilling and rotary drilling of the BHA, each toolface vector comprising a direction of drilling and an amplitude information representing a progress toward a reference point along the target path;
(c) calculating, by the computer system, an estimated amount of expected geological drift, and generating, by the computer system, a geological drift vector that compensates for the estimated amount of geological drift;
(d) adjusting each of the toolface vectors based on the geological drift vector to bring the BHA in line with the target path;
(e) determining, by the computer system based on costs associated with each of the adjusted toolface vectors, a planned convergence path from the real-time location of the BHA to a target path for the wellbore, wherein the planned convergence path comprises a first portion comprising a slide drilling operation and a second portion comprising a rotary drilling operation, and wherein the planned convergence path compensates for the geological drift expected during drilling of the planned convergence path;
(f) orienting the BHA responsive to the adjusted tool factor associated with the convergence path; and
(g) drilling at least a portion of the planned convergence path; and
(h) repeating steps (a)-(g) until the wellbore converges with the target path.

11. The method according to claim 10, wherein
determining the estimated amount of expected geological drift is responsive to drift information obtained from at least one of a previously drilled offset well and a previously drilled portion of the wellbore, wherein the geological drift is the estimated amount of the expected geological drift.

12. The method according to claim 11, wherein the drift information comprises information from a rotary drilled portion of the previously drilled offset well or the previously drilled portion of the wellbore.

13. The method according to claim 10, wherein the first portion of the convergence path compensates for the geological drift expected during drilling of the second portion of the convergence path.

14. The method according to claim 13, wherein the first portion of the convergence path is drilled prior to the second portion of the convergence path.

15. The method according to claim 10, wherein generation of the convergence path comprises:
determining, by the computer system, a plurality of convergence paths from the real-time location of the BHA to the target path for the wellbore based on the plurality of adjusted toolface vectors; and
selecting, by the computer system, one of the plurality of convergence paths as an optimal path, the selected optimal path being assigned as the convergence path; and
drilling a part of the wellbore in accordance with the selected convergence path.

16. The method according to claim 15, wherein determining the cost associated with each of the plurality of convergence paths comprises determining, by the computer system, a first cost associated with the first portion and determining, by the computer system, a second cost associated with the second portion.

17. The method according to claim 10, wherein the convergence path further comprises a third portion, wherein the third portion comprises either a slide drilling operation or a rotary drilling operation.

18. The method according to claim 10, further comprising the steps of:
- determining, by the computer system, whether the wellbore has converged with the target path; and
- responsive to a determination that the wellbore has not converged with the target path, repeating, by the computer system, the steps of (a)-(h).

* * * * *